US006971881B2

(12) United States Patent
Reynolds

(10) Patent No.: US 6,971,881 B2
(45) Date of Patent: Dec. 6, 2005

(54) INTERACTIVE METHOD AND SYSTEM FOR TEACHING DECISION MAKING

(76) Inventor: Thomas J Reynolds, 2905 Teton Pine Dr., Wilson, WY (US) 83014

( * ) Notice: Subject to any disclaimer, the term of this patent is extended or adjusted under 35 U.S.C. 154(b) by 955 days.

(21) Appl. No.: 09/853,407

(22) Filed: May 11, 2001

(65) Prior Publication Data

US 2002/0146676 A1 Oct. 10, 2002

Related U.S. Application Data

(60) Provisional application No. 60/207,714, filed on May 26, 2000, provisional application No. 60/203,514, filed on May 11, 2000, provisional application No. 60/203,528, filed on May 11, 2000, provisional application No. 60/203,527, filed on May 11, 2000, provisional application No. 60/203,525, filed on May 11, 2000, provisional application No. 60/203,524, filed on May 11, 2000, and provisional application No. 60/203,526, filed on May 11, 2000.

(51) Int. Cl.$^7$ .............................................. G09B 19/00
(52) U.S. Cl. ...................... 434/236; 434/322; 434/323
(58) Field of Search ................................ 434/236, 237, 434/238, 322, 323

(56) References Cited

U.S. PATENT DOCUMENTS

| 5,312,114 A | 5/1994 | Lipson ........................ 273/434 |
| 5,372,507 A | 12/1994 | Goleh ......................... 434/118 |
| 5,722,418 A | 3/1998 | Bro ............................. 128/732 |
| 6,105,046 A | 8/2000 | Greenfield et al. ......... 707/530 |
| 6,125,358 A | 9/2000 | Hubbell et al. ............... 706/11 |
| 6,210,272 B1 | 4/2001 | Brown .......................... 463/1 |
| 6,227,862 B1 | 5/2001 | Harkness ..................... 434/65 |
| 6,296,487 B1 | 10/2001 | Lotecka ...................... 434/118 |
| 6,341,267 B1 | 1/2002 | Taub ........................... 705/11 |
| 6,361,326 B1 | 3/2002 | Fontana et al. ............. 434/322 |
| 6,368,111 B2 | 4/2002 | Legarda ...................... 434/236 |

FOREIGN PATENT DOCUMENTS

WO   PCT/US01/15394   5/2001

*Primary Examiner*—Bibhu Mohanty
(74) *Attorney, Agent, or Firm*—Sheridan Ross P.C.

(57) ABSTRACT

The present invention is directed to an interactive tool for teaching decision-making skills. The tool requires users to identify choice options and, for each choice option, relevant consequences, outcomes, goals, and/or driving forces. The tool further provides a methodology to evaluate the performance of the user.

45 Claims, 15 Drawing Sheets

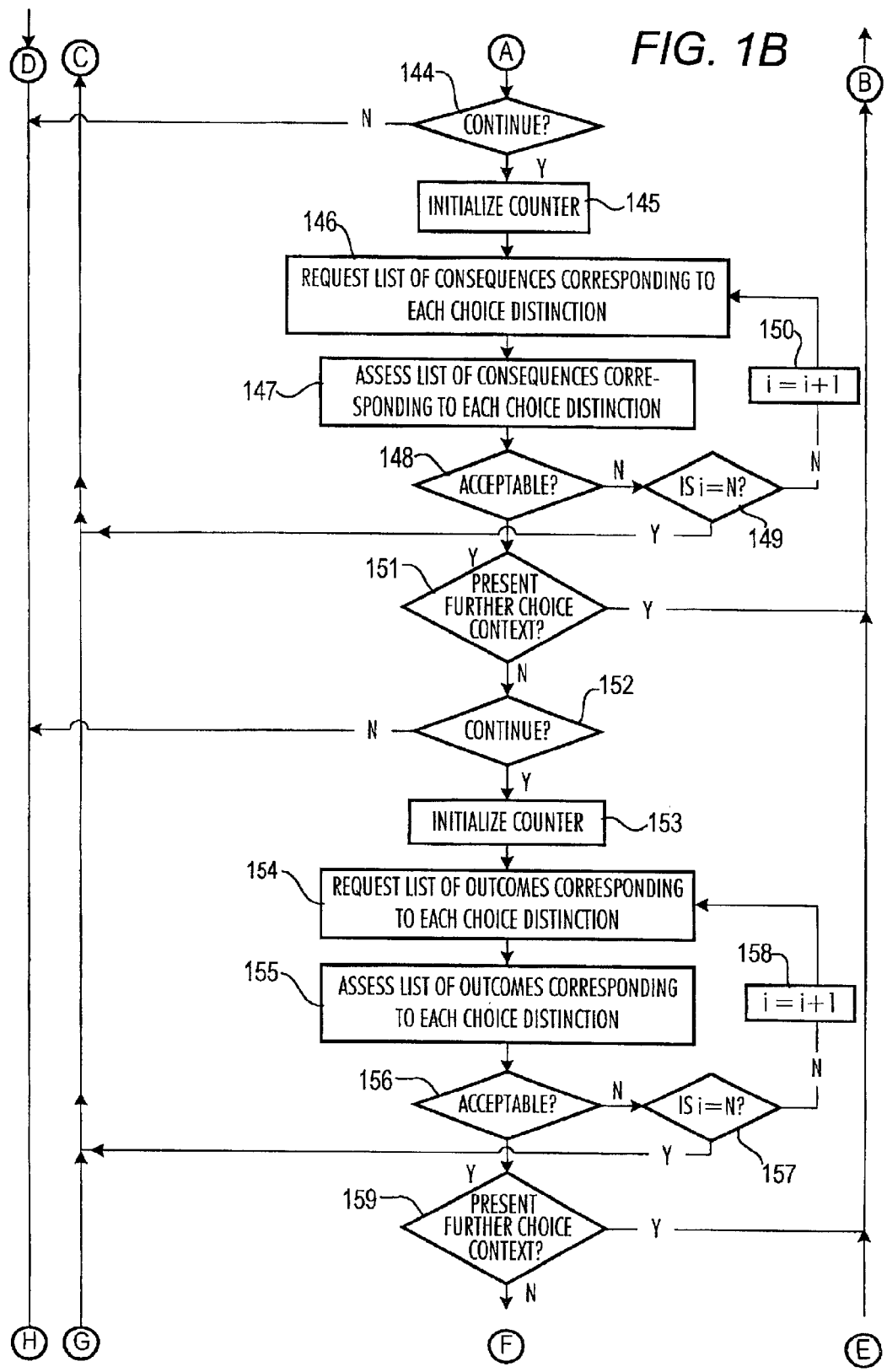

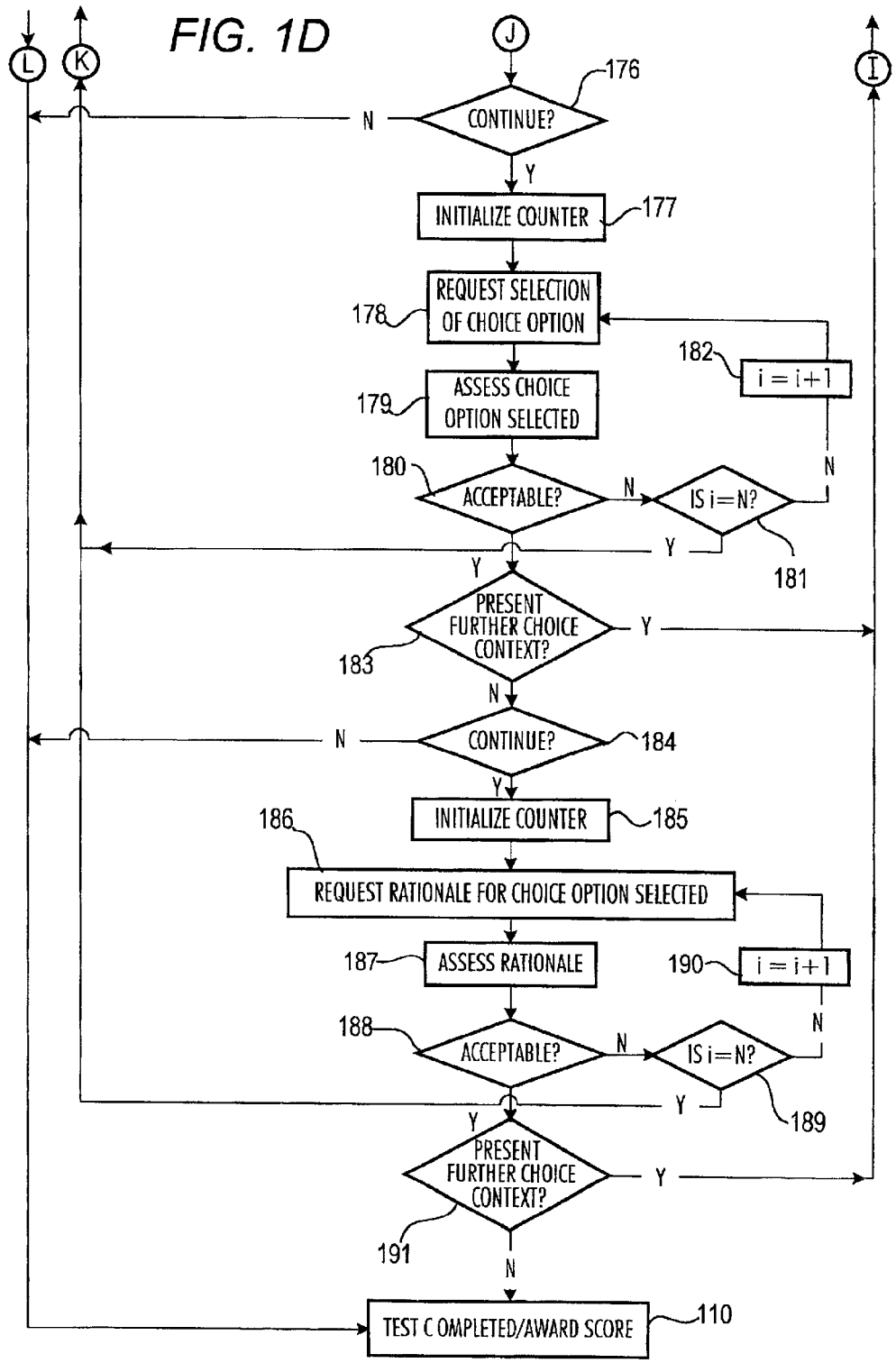

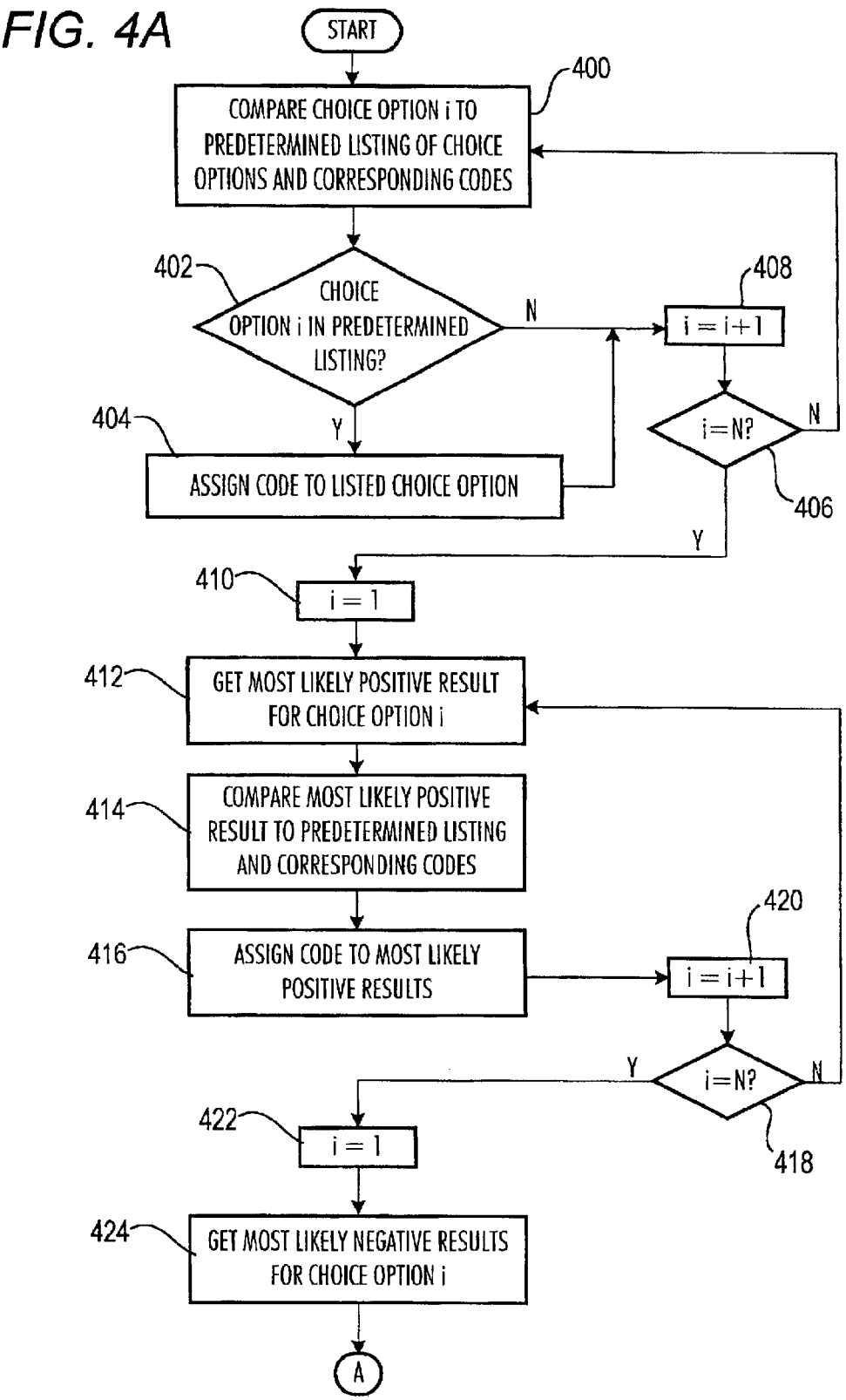

FIG. 6A

WHAT ARE THE CHOICE OPTIONS FOR ME IF I BROKE MY PARENTS' CHINA?
- (1) LIE
- (2) TELL THE TRUTH

FIG. 6B

WHAT ARE THE CHOICE DISTINCTIONS FOR LYING?
- (1) LIED TO PARENTS
- (2) PARENTS WILL NOT KNOW THAT I BROKE THE CHINA

WHAT ARE THE CHOICE DISTINCTIONS FOR TELLING THE TRUTH?
- (1) DID NOT LIE
- (2) PARENTS WILL KNOW THAT I BROKE THE CHINA

FIG. 6C

WHAT ARE THE CONSEQUENCES IF I LIE?
- (1) WORRY ABOUT GETTING CAUGHT
- (2) WILL BE ABLE TO GO PLAY
- (3) WILL FEEL GUILTY

⋮

WHAT ARE THE CONSEQUENCES IF PARENTS KNOW I BROKE THE CHINA?
- (1) GET PUNISHED
- (2) WON'T BE ABLE TO GO PLAY
- (3) WON'T FEEL GUILTY

WHAT ARE THE OUTCOMES IF I LIE?
    (1)    DID NOT DO THE RIGHT THING
    (2)    •
    (3)    •

WHAT ARE THE OUTCOMES IF PARENTS KNOW I BROKE THE CHINA?
    (1)    NOT ABLE TO DO THINGS
    (2)    •
    (3)    •

FIG. 6E

WHAT ARE MY GOALS THAT MAY BE IMPORTANT IN DECIDING WHETHER TO LIE?
    (1)    HONESTY
    (2)    •
    (3)    •

WHAT ARE MY GOALS THAT MAY BE IMPORTANT IN DECIDING WHETHER TO TELL MY PARENTS THAT I BROKE THE CHINA?
    (1)    AVOID PUNISHMENT
    (2)    •
    (3)    •

FIG. 6F

WHY IS EACH OF MY LISTED GOALS IMPORTANT?
    (1)    HONESTY
    (2)    AVOID PUNISHMENT

FIG. 6G

WHICH OPTION DO I CHOOSE?
   (1)   TELL THE TRUTH
   (2)
   (3)

FIG. 6H

WHAT ARE THE MAIN POSITIVE AND NEGATIVE REASONS THAT YOU WOULD CONSIDER IN TELLING THE TRUTH?
   +   OBEY MY PARENTS
   -   PUNISHMENT

WHAT ARE THE MAIN POSITIVE AND NEGATIVE REASONS THAT YOU WOULD CONSIDER IN LYING?
   +   AVOID PUNISHMENT
   -   DISHONESTY

FIG. 6I

WHAT IS THE LIKELY POSITIVE AND NEGATIVE RESULT FOR EACH OF MY CHOICE OPTIONS?
   (1)   LIE
          -   WORRY ABOUT GETTING CAUGHT
          +   PARENTS WILL NOT KNOW THAT I BROKE THE CHINA
   (2)   TELL TRUTH
          -   GET PUNISHED
          +   OBEYED MY PARENTS

FIG. 8A

WHAT ARE THE OPTIONS FOR ME IF I BROKE MY PARENTS' CHINA?
- A. "LIE, TELL THEM I KNOW NOTHING ABOUT IT"
- B. "TELL THE TRUTH AND ADMIT TO BREAKING IT ACCIDENTALLY"

FIG. 8B

WHAT ARE THE CHOICE DISTINCTIONS FOR THIS SITUATION (CHOICE CONTEXT)?
- A. "LIE TO PARENTS"
- B. "TELL THEM WHAT HAPPENED, AND SAY I'M SORRY"

FIG. 8C

WHAT ARE THE CONSEQUENCES IF (A) I "LIE TO PARENTS"?
- + WON'T GET IN TROUBLE
- − HAVE TO WORRY ABOUT GETTING CAUGHT LATER

WHAT ARE THE CONSEQUENCES IF (B) I "SAY I'M SORRY"?
- + WON'T HAVE TO WORRY ABOUT THEM FINDING OUT LATER
- − I'LL GET PUNISHED

FIG. 8D

WHAT ARE THE OUTCOMES IF (A) I "LIE TO PARENTS"?
- + I CAN GO OUTSIDE AND PLAY BALL NOW
- − MIGHT GET A MORE SEVERE PUNISHMENT LATER IF THEY FIND OUT

WHAT ARE THE OUTCOMES IF (B) I "SAY I'M SORRY"?
- + PARENTS WILL KNOW I AM HONEST
- − I WON'T BE ABLE TO GO PLAY TODAY

FIG. 8E

WHAT ARE MY GOALS THAT MAY BE IMPORTANT IN CHOOSING TO (A) "LIE TO PARENTS"?
- + SELF-ENJOYMENT (HAVING FUN)
- − (LOSE[-]) PARENTAL RESPECT/TRUST

WHAT ARE MY GOALS THAT MAY BE IMPORTANT IN CHOOSING TO (B) I "SAY I'M SORRY"?
- + PARENTAL RESPECT/TRUST
- − (LOSE[-]) SELF ENJOYMENT

FIG. 8F

WHICH TWO GOALS SHOULD BE CONTRASTED ("TRADE-OFF")?
- → (A)    "LIE TO PARENTS"    +    SELF ENJOYMENT
- (A)    "LIE TO PARENTS"    -    PARENTAL RESPECT/TRUST (-)
- → (B)    "SAY I'M SORRY"    +    PARENTAL RESPECT/TRUST
- (B)    "SAY I'M SORRY"    -    SELF ENJOYMENT (-)

[THE TWO POSITIVE (+) POLES +    (A) SELF ENJOYMENT]
                                              (B) PARENTAL RESPECT/TRUST

WHICH GOAL IS MOST IMPORTANT TO ME?
- (A)    SELF ENJOYMENT
- →(B)    PARENTAL RESPECT/TRUST

FIG. 8G

WHICH OPTION WOULD I CHOOSE?
- (A)    "LIE TO PARENTS"
- →(B)    "SAY I'M SORRY"

FIG. 8H

WHAT IS THE PRIMARY REASON THAT I WOULD DECIDE TO TELL THE TRUTH?
- (A)    IT IS MORE FUN TO GO OUTSIDE AND PLAY WITH MY FRIENDS
  [DOMINANT GOAL: SELF ENJOYMENT]
- →(B)    IT IS BETTER IN THE LONG RUN FOR ME TO BUILD A BETTER RELATIONSHIP WITH MY PARENTS SO THEY WILL LET ME HAVE MORE FREEDOM TO DO WHAT I WANT
  [DOMINANT GOAL: PARENTAL RESPECT/TRUST]

INTERACTIVE METHOD AND SYSTEM FOR TEACHING DECISION MAKING

CROSS REFERENCE TO RELATED APPLICATIONS

The present application claims the benefits under 35 U.S.C.'119(e) of U.S. Provisional Application Ser. Nos. 60/203,514, filed May 11, 2000; 60/203,528, filed May 11, 2000; 60/203,527, filed May 11, 2000; 60/203,525, filed May 11, 2000; 60/203,524, filed May 11, 2000; 60/203,526, filed May 11, 2000; and 60/207,714, filed May 26, 2000, all of which are incorporated herein by this reference.

FIELD OF THE INVENTION

The present invention is directed generally to decision making and specifically to interactive tools for teaching decision making.

BACKGROUND OF THE INVENTION

In all levels of society and across all age groups, people routinely use poor judgment in making decisions and consequently exhibit poor character. Although people are quick to see the freedom that choice brings, they all too often fail to see the corresponding responsibility that accompanies each and every choice they make. Most of their decisions are based either on a desire for instant gratification, convenience, peer approval, or avoidance of conflict. The increasing degree of mechanization and dehumanization of our lives—the disastrous byproduct of scientific and technical advancement—coupled with poor decision making have lead to a horrifying deterioration in the ethical conduct or character of people today.

A variety of interactive tools have been developed for character building. A common approach is to provide the reader/viewer with an abstract concept, such as a value, then present an ideational story with some factual content which: (a) is related to the abstract concept, and (b) is presumably relevant to developing decision-making skills relating the abstract concept. This factual context is often inapplicable to the real life situations confronted by the reader/viewer (also denoted user herein) and therefore provides little guidance and little decision-making skill development. Moreover, the abstract factual concepts, individually and/or combined fail to show a methodology for making decisions.

A variety of interactive tools have also been developed for teaching decision making. A common approach is to list advantages and disadvantages associated with a decision. These approaches often fail to link the choices with specific goals or values. Moreover, such approaches are often too complicated for many individuals.

SUMMARY OF THE INVENTION

These and other needs are addressed by the interactive tool(s) and method(s) of the present invention. The present invention provides a logical, structured approach to teaching users critical decision-making skills. The tool(s) and method (s) reinforce and/or develop developmental intelligence particularly in the areas of logico-mathematical thought, self understanding and the understanding of others. The tool(s) and method(s) are particularly useful in automated systems, such as computational systems.

In one embodiment, an interactive teaching method is provided that includes the steps of:

(a) referencing at least one factual context to a user;

(b) requiring the user to provide a listing of choice options corresponding to the factual context(s);

(c) requiring the user to provide a listing of potential future results corresponding to each choice option;

(d) requiring the user to provide a listing of goals that are relevant to each choice option;

(e) requiring the user to identify one or more driving forces relevant to one or more of the listed choice options; and (f) evaluating at least one of the listing of choice options, the listing of results, the listing of goals, and the identified driving force(s).

In one configuration, the method further includes the steps of:

(g) requiring selection of a choice option; and (h) requiring a rationale for the selected choice option; and wherein the evaluating step includes the substep of assessing the rationale.

The factual (or choice) context can be any suitable set of facts that require a choice to be made. For example, the set of facts may have personal relevance to the user, such as a real life situation in which the user has made or will make a choice; though having no personal relevance to the user, may have application or relevance to the user's surroundings and/or environment; or though having no personal relevance to the user or application to the user's environment, is useful in teaching the user decision making skills.

As will be appreciated, the "user" can be any individual or group of individuals, including computer users, students (whether at the primary, secondary, or pre- or post-educational levels), job skills trainees, participants in adult education, "at risk" juveniles, those incarcerated in detention facilities, and military personnel. The user can be of any age, with ages between 5 and 50 years being typical.

The listing of choice options is simply a listing of alternatives or possibilities generated, either internally or externally, by the choice context. The listing can include one or more choice options, depending upon the choice context.

The listing of results includes one or more results associated with each choice option in the listing of choice options. Results commonly include both long term results (or outcomes) or short term and/or immediate results (or consequences). Outcomes and consequences typically include both positive (as viewed by the user) and negative (as viewed by the user) results.

The listing of goals includes one or more goals that are relevant to each choice option. As will be appreciated, certain goals may be shared by a number of choice options. "Goals" refer to objectives of the user, such as to things the user wants to do or become (e.g., the desired end-states toward which effort is directed). Goals are the reasons outcomes derive their importance.

The driving force(s) of the user defines a hierarchy of the listed goals. As in the case of goals, one driving force may be shared by a number of goals and choice options. A "driving force" typically refers to the user's perceived identity; that is, the user's unique way of visualizing him- or herself. A driving force thus determines the relevant importance of each of the listed goals.

One or more of the listings is evaluated by any suitable technique to determine a level of performance of the user. In one configuration, the evaluating step can include the step of determining a test score for the user's performance in one or more of steps (b), (c), (d), and (e). For example, the number of choice options, results, goals, and/or driving forces can be counted, and the resulting number(s) compared to a predetermined ordering of numbers or grade scale for the corresponding list to determine a level of performance or test score. The evaluating step can also be performed using a more sophisticated approach such as by considering the number of choice options in the choice option listing, a level of sophistication of a choice option in the listing, and/or a number of choice options considered for selecting a most important choice option.

In one configuration, the evaluating step is performed by building and analyzing a decision tree or chain. The chain is formed by the following steps:

comparing the listing of choice options to a predetermined listing of choice options and corresponding codes to identify at least one listed choice option on the predetermined listing of choice options and a code corresponding thereto;

assigning the code to the at least one listed choice option;

comparing the rationale with the listings of results, goals, and driving forces to identify which of the listed results, goals and/or driving forces are in the rationale;

comparing the results, goals and driving forces in the rationale with a predetermined listing of results, goals, and/or driving forces and corresponding codes to identify the codes corresponding to the results, goals and/or driving forces in the rationale; and determining the highest code level and the number of code levels in the rationale to form the decision chain.

When one or more of the listings is unacceptable, the user may be required to repeat one or more of the steps, depending on the level of sophistication of the user.

A counter can be used to monitor the number of iterations through the steps by a user whose listing(s) is found unacceptable. Thus, the method would include the steps of:

initializing a counter:

comparing the counter to a predetermined number of iterations;

when the counter at least one of equals and exceeds the predetermined number, then the user is failed; and when the counter is less than the predetermined number, repeating the desired step(s).

To reinforce the decision model concepts in the mind of the user, the various steps can be repeated for a variety of choice contexts over the same or varying periods of time. In an illustrative configuration, only steps (a), (b), and (f) are repeated for a first time period, only steps (a) through (c) and (f) are repeated for a second time period, and only steps (a) through (d) and (f) are repeated for a third time period. The first time period precedes the second time period and the second time period precedes the third time period.

The interactive teaching method can include additional steps. In one configuration, the method includes the additional steps of:

requiring a list of choice distinctions for each listed choice; and optionally evaluating the list of choice distinctions for each listed choice. A choice distinction is a defining characteristic or label for a corresponding choice option.

The invention has a number of advantages compared to existing decision-making tools. First, the present invention can provide a critical thinking curriculum that will help educators and parents develop citizens of better character by imbuing children with a decision-making framework that will provide them with an understanding of the decision-making process in their lives and the ability to make rational decisions directed toward achieving their personal goals. Second, the present invention can expand student awareness of the number of choices that are made, explicitly or implicitly, every day of their lives and of the range of choices available to them with regard to any significant decision. Third, the invention can increase student understanding of the critical determining characteristics of each choice option within the decision context and their relation to the likely short- and long term results of that choice. Fourth, the invention can help students identify and evaluate the causal relationships between their personal goals and the choices that they make across an array of decisions that range from simple everyday decisions to more complex types of risk- or reward-creating decisions. Fifth, the invention can develop students' abilities (and recognition of the need to take the time) to graphically map out the choice options with regard to any decision or problem context, including drawing of inferences with regard to their goals. Sixth, the invention can increase three important types of intelligence that can significantly accelerate a person's self-growth, namely logico-mathematical growth, self-understanding, and the understanding of others. Understanding the decisions of others and their behavior can lead to compassion for others. Seventh, the invention can address the decision-making defect from which many people suffer. Specifically, many people make poor decisions because such people focus on a shorter-term time horizon and/or mistakenly contrast two different defining elements of their choice options, namely a positive distinction of one choice option with a negative distinction of the other choice option, creating a biased contrast. The invention can use a bottom up (situation-based) approach employing real life scenarios with a decision making model, requiring the definition of causal implications of choice options. This is the most effective way in which this flaw in such thinking can be addressed. Conventional top down value or virtue approaches are too abstract for many users and are therefore not very effective. Eighth, the invention progressively introduces the user to the various pieces of the decision-making model, which reinforce the model in the mind of the user. Ninth, the invention uses the concept of "trade-off" in the decision-making model. Trade-off requires the user to compare and contrast higher order personal motivations or objectives (e.g., comparing positive elements with positive elements or negative elements with negative elements) in making a decision. Tenth, the invention permits an assessment of each lesson with regard to its effectiveness in changing an a priori or initial decision the individual or a group would make without the use of the invention. Eleventh, the invention permits the assessment of a variety of key facets of the depth of thinking of individuals with regard to their decision-making processes. For example, the present invention requires users to focus on a positive element, such as an outcome or consequence, associated with a choice option and to link the element to one or more relevant goals. This forces users to identify and apply driving forces to select a choice option.

BRIEF DESCRIPTION OF THE DRAWINGS

FIGS. 1A–D define a flowchart of a first embodiment of the present invention;

FIGS. 6A–I depict various displays in connection with FIGS. 1A-D;

FIGS. 8A through 8H depict yet another embodiment of the present invention.

DETAILED DESCRIPTION

Figure 1A:
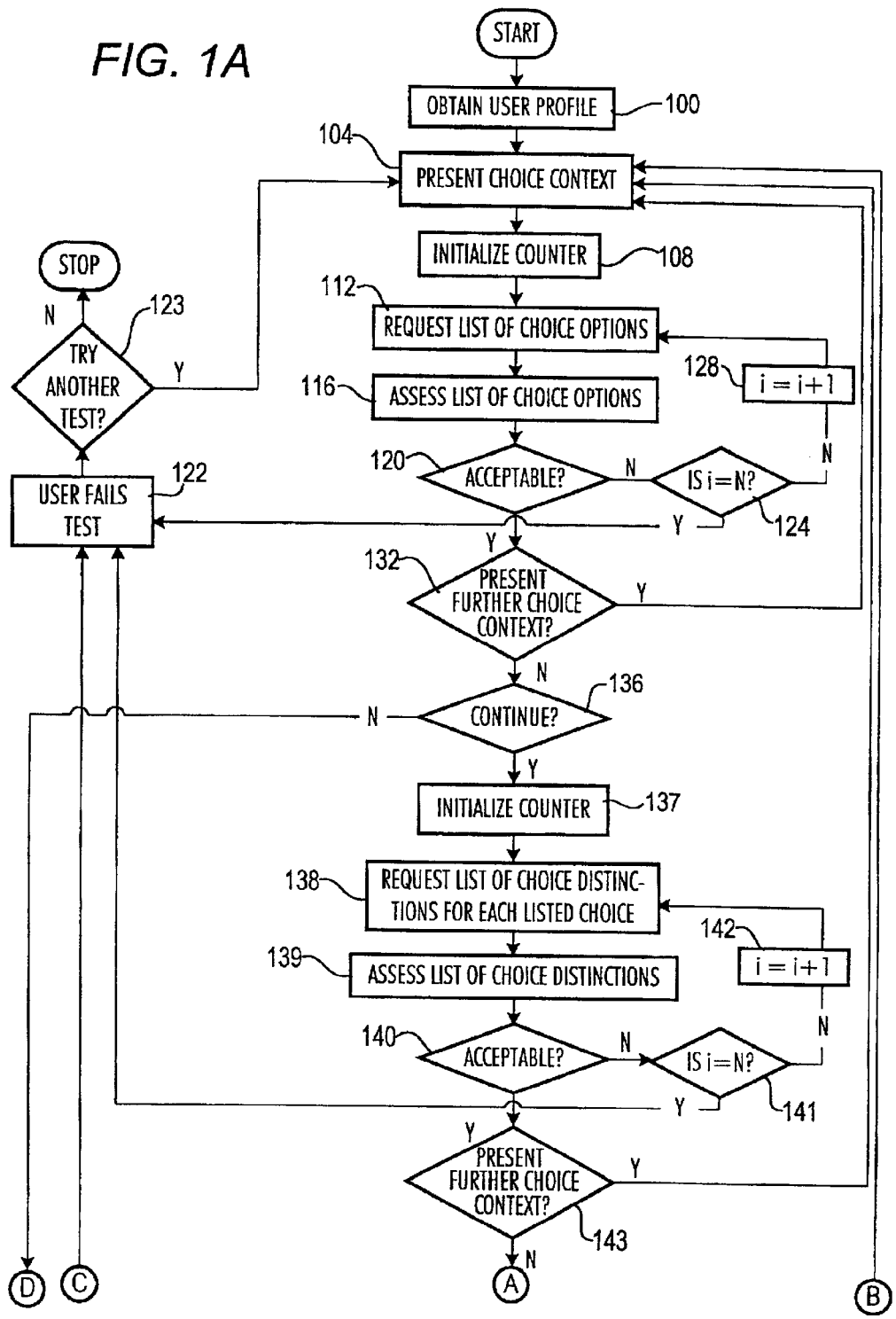
Figure 1C:
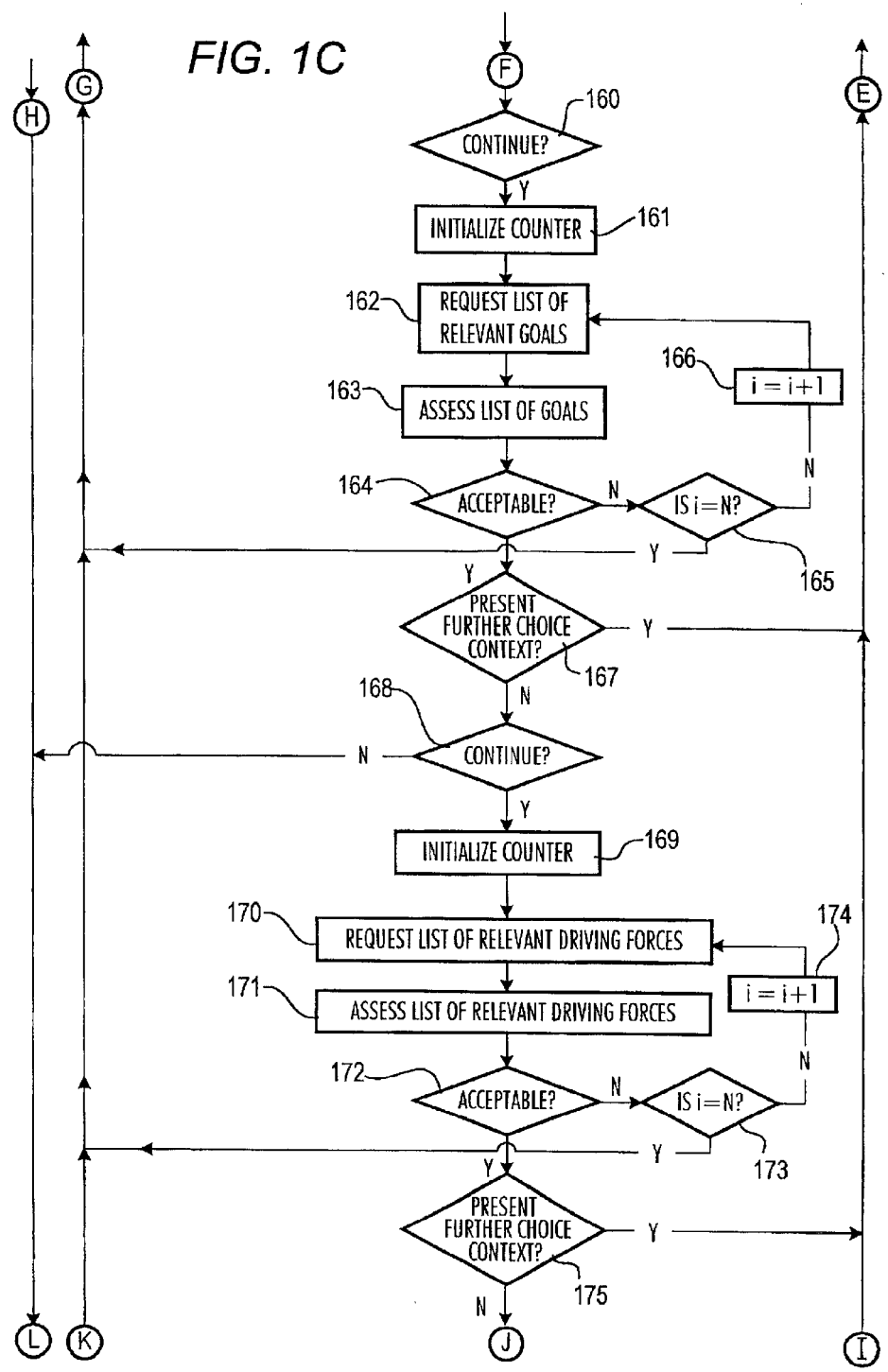
Figure 2:
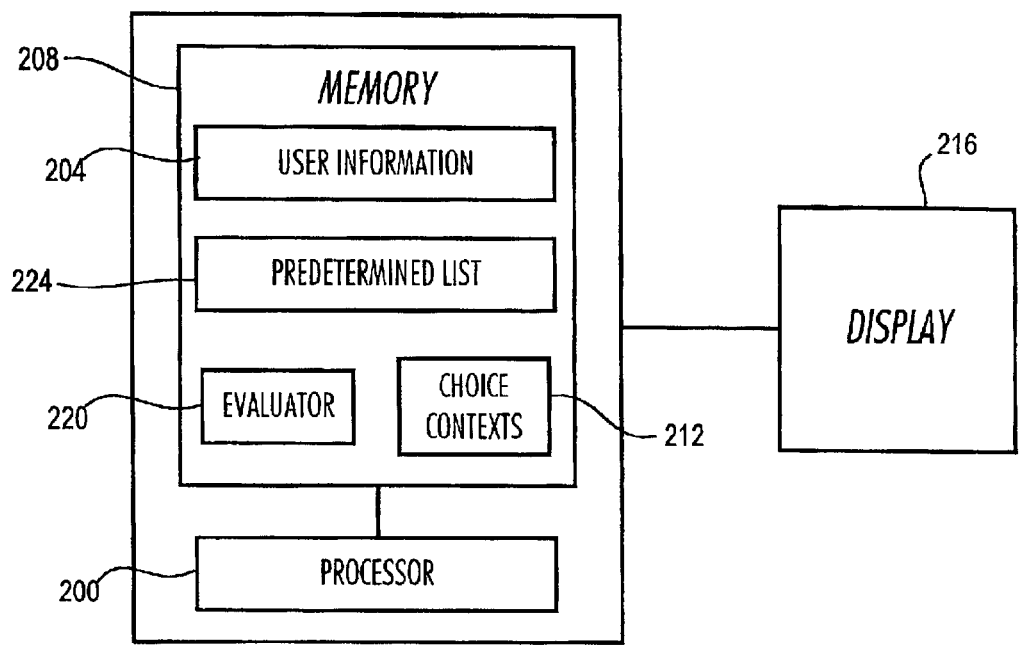
FIG. 2 is a block diagram showing a computation system that can be used with the flowchart of FIGS. 1A–D.

FIGS. 1A–D and 2 depict a first embodiment of an interactive algorithm according to the present invention. The processor 200 (FIG. 2) initially obtains a (via step 100, FIG. 1A) profile of the user from user information 204 (FIG. 2). The profile may be stored in memory 208 as shown and/or obtained from the user through a series of queries.

The user then is presented with a choice context (step 104 FIG. 1) from a plurality of choice contexts 212 in memory 208, and a counter "i" is initialized (step 108 FIG. 1A), e.g., set equal to one. The counter tracks the number of iterations through the loop defined by steps 112, 116, 120, 124 and 128.

The processor 200 can select which choice context to present using a random or pseudorandom number generator (in which event each of a plurality of choice contexts would be assigned a unique number or id) or a predetermined ordering of the choice contexts based on the user's profile information. The id can include a first field for setting, e.g. home, school and community, a second field for appropriate grade level, e.g. "45" means for grade levels four and five, and a third field for order of presentation of the context, e.g., 1, 2, 3, etc. The third field can be based on a number generator or a predefined ordering of presentation of the choice contexts. Simpler and/or more life relevant choice contexts are provided depending, for example, on the age or grade level of the user. The choice context can be presented to the user orally or visually using display 216 (FIG. 2) or a combination of the two. For example, the choice context can be a video presented on the display 216 with audio output. This approach is particularly useful for users that have a low level of reading skills.

The processor 200 then requests the user to input a list of choice options (step 112 FIG. 1A) corresponding to the choice context. The user inputs the list of choice options using any suitable techniques, including voice recognition techniques, a stylus or mouse with one or more screens displaying a list of possible choice options, a keyboard, and the like. The list may be entered by the user and identified by the processor 200 using key words and/or selected by the user from a list of possible choice options presented by the processor. An illustrative display when the list is entered manually by the user is shown in FIG. 6A. If the user selects the choice options from a list provided by the processor 200, the user may be asked to rank the selected choice options in order of importance and indicate the reason(s) why the user chose that option.

In one process configuration that is not shown in the figures, a timer could be set and the user given a predetermined amount of time in which to select the number of choice options arising from the choice context. The processor 200 would cease receiving new choice options when the predetermined amount of time had elapsed.

In the depicted process configuration, the user notifies the processor 200 when the list is completed, and an evaluator 220 (FIG. 2) assesses (in step 116 FIG. 1A) the list of choice options by any suitable technique. Particularly, where the user originates the choice options on the list, the evaluator 220 evaluates the list by the number of choice options on the list and compares the total number of choice options with a predetermined number or grading scale to determine a level of performance. Particularly, where the user selects the choice options on the list from a list provided by the processor 200, the evaluator 220 may evaluate the list by identifying one or more rankings associated with one or more of the selected choice options and determining the level of performance based on the one or more rankings.

As part of the assessing step 116 (FIG. 1A), the processor 200 can also sort the various choice options into predetermined categories. For example, the choice options could be sorted based on the place in which the choice situation occurs (e.g., school, home, or community) and/or the relationship with the primary individual in the choice context (e.g., self, friends, parents, siblings, kids (non-friends) or adults). Symbols can be used for choice options rather than words (e.g., teeth to represent tooth brushing, a fist to represent fighting, etc.) A matrix can be constructed using one or more of the above classification systems. For instance, "places" can be on one axis and "relationship" on the other, and each choice context is placed in one cell of the matrix.

The number(s) of choice options in each classification can be used to evaluate the breadth or sophistication of the identified choice options. For example, the number of choice options in "non-self" categories could be an additional measure of performance used in any of the assessment steps discussed below.

If in decision step 120 (FIG. 1A) the user's performance is not acceptable, the processor 200 determines in decision step 124 (FIG. 1A) if the counter i is equal to N, the predetermined maximum number of iterations through the loop of steps 112, 116, 120 and 128. If so, the processor 200 fails the user (step 122 FIG. 1A) and determines (step 123) whether to proceed with another test. If not, the processor 200 increments the counter i by one (step 128) and again requests the user to provide a list of choice options associated with the choice context previously presented in step 104.

If in decision step 120 the user's performance is acceptable, the processor 200 next determines in decision step 132 whether a further choice context should be presented. This determination may be made based on the user's level of performance, profile, and the like. If the user has not yet performed to a certain level of performance or is required to complete successfully a certain number of selected choice contexts before proceeding, the user returns to step 104 and repeats the above steps with a different choice context. If the user has performed to a certain level of performance or completed the requisite number of choice contexts, the processor 200 next determines in decision step 136 whether or not to continue to higher levels of decision making (via the steps commencing with step 137), or complete the test and award a score to the user in step 110 (FIG. 1D). This determination is typically made based on the user's user profile. In one configuration, users in the first grade do not continue while users beyond the first grade continue on.

Assuming the user continues, the counter i is again initialized (step 137), and the processor 200 requests a list of choice distinctions (step 138) for each of the listed choice options provided previously in step 112. This step 138 can be performed in any of the ways noted above in connection with step 112 with choice distinctions being substituted for choice options. An illustrative display, when the list of choice distinctions is entered manually by the user, is shown in FIG. 6B.

Each choice option typically has at least one corresponding distinction. As noted, the distinction is the key characteristic that serves to label the positive and negative aspect(s) of each choice option. Although distinctions and results are often the same, it is important to start teaching users to label their choice options prior to defining the results of each.

The list of choice distinctions is assessed in step 139 using any suitable technique including those described above in connection with step 116 with choice distinctions being substituted for choice options. For example as in the case of choice options, the evaluator 220 can evaluate the list by the number of choice distinctions on the list and compare the total number of choice distinctions with a predetermined number or grading scale to determine a level of performance, particularly when the user originates the choice distinctions on the list. The evaluator 220 can evaluate the list by identifying one or more rankings associated with one or more of the selected choice distinctions and determining the level of performance based on the one or more rankings, particularly when the user selects the choice distinctions on the list from a list provided by the processor 200.

Alternatively or in addition to the techniques described above, the evaluating step (step 139) can analyze the total number of choice distinctions. The number is compared to a predetermined grading scale and a performance level determined.

If in decision step 140 the user's performance is not acceptable, the processor in decision step 141 determines if the counter i is equal to N. If so, the processor 200 fails the user in step 122 and determines in decision step 123 whether the user is to proceed with another test. If not, the processor increments the counter i by one (step 142) and again requests the user in step 138 to provide a list of choice distinctions associated with the choice context.

If the user's performance is acceptable, the processor 200 next determines in decision step 143 whether a further choice context should be presented in step 104. This determination may be made as noted above in connection with decision step 132. If the same choice context is to be used, then, the processor 200 next determines in decision step 144 whether or not to continue to higher levels of decision making or complete the test and award a score to the user in step 110. This determination is typically made in a manner similar to that of decision step 136 above. In one configuration, users in the second grade do not continue while users beyond the second grade continue on.

When the user is to continue on, the counter i is again initialized (step 145), and the processor 200 requests a list of consequences for each of the listed choice options provided to the user in step 146. This step 146 can be performed, as noted above in connection with step 112 and/or 138 with consequences being substituted for choice contexts and choice distinctions, respectively. Each choice distinction (and therefore each choice option) typically includes a number of corresponding consequences, both positive and negative. An illustrative display for manual entry of the list by the user is shown in FIG. 6C.

The list of consequences is assessed in step 147 using any suitable technique, including any of the techniques set forth above in connection with steps 116 and 139, with consequences being substituted for choice options and choice distinctions, respectively. As in the case of choice options and choice distinctions, the evaluator 220 typically evaluates the list by the number of consequences on the list and compares the total number of consequences with a predetermined grading scale to determine a level of performance, particularly when the user originates the consequences on the list. This approach refrains from rendering any assessment or opinion whether the user's pathways are right or wrong. The approach causes users to think about choices and the meaning of choices to them personally in an open manner and not in a judgmental way. The evaluator 220 can evaluate the list by identifying one or more rankings associated with one or more of the selected consequences and determining the level of performance based on the one or more rankings, particularly when the user selects the consequences on the list from a list provided by the processor 200.

If in decision step 148 the user's performance is not acceptable, the processor 200 determines in decision step 149 if the counter i is equal to N. If so, the processor 200 fails the user in step 122 and determines in decision step 123 whether or not to try another test. If not, the processor 200 increments the counter i by one step 150, and again requests the user, in(step 146) to provide a list of consequences associated with the choice context presented in step 104.

If the user's performance is acceptable, the processor 200 next determines in decision step 151 whether a further choice context should be presented. This determination may be made as noted above in connection with decision step 132.

The processor 200 next determines in decision step 152 whether or not to continue to higher levels of decision-making strategies or complete the test and award a score to the user in step 110. This determination is typically made in a manner similar to that of decision step 136 above. In one configuration, users in the third grade do not continue while users beyond the third grade continue on.

When the user is to continue on, the counter i is again initialized (step 153), and the processor 200 requests (step 154) a list of outcomes for each of the listed choice options provided in response to step 112 and/or choice distinctions provided in response to step 138. As will be appreciated, each choice option typically corresponds to one choice distinction, and each choice distinction typically corresponds to more than one consequence and outcome. The step 156 can be performed using any of the techniques described above in connection with step 112 (with outcomes being substituted for choice options), step 138 (with outcomes being substituted for choice distinctions), and/or step 146 (with outcomes being substituted for consequences). An illustrative display when the list is manually input by the user is depicted in FIG. 6D.

The list of outcomes is assessed in step 155 using any suitable technique, including one or more of the techniques described above in connection with steps 116 (with outcomes being substituted for choice options), 139 (with outcomes being substituted for choice distinctions), and/or 147 (with outcomes being substituted for consequences). As in the case of choice options, the evaluator 220 typically evaluates the list by the number of outcomes on the list and compares the total number of outcomes with a predetermined number scale to determine a level of performance, particularly when the user originates the outcomes on the list. The evaluator 220 can evaluate the list by identifying one or more rankings associated with one or more of the selected outcomes and determining the level of performance based on the one or more rankings, particularly when the user selects the choice distinctions on the list from a list provided by the processor 200.

If the user's performance is not acceptable in decision step 156, the processor determines in decision step 157 if the counter i is equal to N. If so, the processor 200 fails the user in step 122 and determines in decision step 123 whether or not to try another test. If not, the processor 200 increments 158 the counter i by one and again requests the user to provide in step 154 a list of outcomes associated with the choice context.

If the user's performance is acceptable, the processor 200 next determines in decision step 159 whether a further choice context should be presented. This determination may be made as noted above in connection with decision diamond 132 with outcomes being substituted for choice options.

If the user has performed to a certain level of performance or completed the requisite number of selected choice contexts, the processor 200 next determines in decision step 160 whether or not to continue to higher levels of decision making or complete the text and award a score to the user in step 110. This determination is typically made in a manner similar to that of decision step 136 above with outcomes being substituted for choice options. In one configuration, users in the fourth grade do not continue while users beyond the fourth grade continue on.

When the user is to continue on, the counter i is again initialized (step 161), and the processor 200 requests (step 162) a list of goals relevant to each of the listed choice options provided in step 112. This step can be performed using any of the techniques noted above in connection with steps 112, 138, 146, and/or 154, with goals being substituted for choice options, choice distinctions, consequences, and outcomes, respectively. An illustrative display for manual entry of the list by the user is shown in FIG. 6E.

As will be appreciated, a selected goal can correspond to more than one choice and therefore to more than one choice distinction, consequence, and outcome. The results previously listed by the user are typically the bases for the identification of the relevant goals.

The users can be required to rank the goals for each choice option or among the goals listed for all of the choice options. The ranking can later be used in step 163 for evaluating the user's performance.

The list of goals is assessed in step 163 using any suitable technique, including one or more of the techniques described above in connection with steps 116 (with goals being substituted for choice options), 139 (with goals being substituted for choice distinctions), 147 (with goals being substituted for consequences), and/or 155 (with goals being substituted for outcomes). As in the case of choice options, the evaluator 220 typically evaluates the list by the number of goals on the list and compares the total number of goals with a predetermined number scale to determine a level of performance, particularly when the user originates the goals on the list. The evaluator 220 can evaluate the list by identifying one or more rankings associated with one or more of the selected goals and determining the level of performance based on the one or more rankings, particularly when the user selects the goals on the list from a list provided by the processor.

If in decision step 164 the user's performance is not acceptable, the processor determines in decision step 165 if the counter i is equal to N. If so, the processor 200 fails the user in step 123 and determines in decision step 123 whether or not to try another test. If not, the processor 200 increments the counter i by one in step 166 and again requests the user to provide a list of goals associated with the choice context.

If the user's performance is acceptable, the processor 200 next determines in decision step whether a further choice context should be presented. This determination may be made as noted above in connection with decision step 132 with goals being substituted for choice options.

The processor 200 next determines in decision step 168 whether or not to continue to higher levels of decision-making strategies or complete the test and award a score to the user in step 110. This determination is typically made in a manner similar to that of decision step 136 above with goals being substituted for choice options. In one configuration, users in the fifth grade do not continue to higher levels of decision-making instruction while users beyond the fifth grade do continue on.

When the user is to continue on, the counter i is again initialized (step 169), and the processor 200 requests or determines in step 170 a list of one or more driving forces relevant to each of the listed choice options provided in step 112. This step can be performed using any of the techniques noted above in connection with steps 112, 138, 146, 154, and/or 162, with driving forces being substituted for choice options, choice distinctions, consequences, outcomes, and goals, respectively. An illustrative display for manual entry of the list by the user is shown in FIG. 6F.

The driving forces drive the ranking of the goals. The user will trade-off (or compare) one set of goals against another set of goals depending upon which driving force(s) are most important to the user. For example, assuming two competing goals in the choice context are "be responsible" versus "in control", the associated driving force would be self esteem versus power, respectively. The user or the processor 200 would list the various driving forces linked to each of the goals in the listing of goals provided in step 162. As will be appreciated, the same driving force may be shared by multiple goals.

The users can be required to rank the driving forces for each choice option or among the driving forces listed for all of the choice options. The ranking can later be used in step 171 for evaluating the user's performance.

The list of driving forces is assessed in step 171 using any suitable technique, including one or more of the techniques described above in connection with step 116 (with driving forces being substituted for choice options), 139 (with driving forces being substituted for choice distinctions), 147 (with driving forces being substituted for consequences), 155 (with driving forces being substituted for outcomes), and/or 163 (with driving forces being substituted for goals). As in the case of choice options, the evaluator 220 typically evaluates the list by the number of driving forces on the list and compares the total number of driving forces with a predetermined number scale to determine a level of performance, particularly when the user originates the driving forces on the list. The evaluator 220 can evaluate the list by identifying one or more rankings associated with one or more of the selected driving forces and determining the level of performance based on the one or more rankings, particularly when the user selects the driving forces on the list from a list provided by the processor 200.

If in decision step 172 the user's performance is not acceptable, the processor determines in decision step 173 if the counter i is equal to N. If so, the processor 200 fails the user in step 122 and determines whether to proceed with another test. If not, the processor 200 increments the counter i by one in step 174 and again requests in step 170 the user to provide a list of driving forces associated with the choice context.

If the user's performance is acceptable, the processor 200 next determines in decision step 175 whether a further choice context should be presented. This determination may be made as noted above in connection with decision step 132 with driving forces being substituted for choice options.

If the user has performed to a certain level of performance or completed the requisite number of selected choice contexts, the processor 200 next determines in decision step 176 whether or not to continue to higher levels of decision-making strategies or complete the test and award a score to the user in step 110. This determination is typically made in a manner similar to that of decision step 136 above with driving forces being substituted for choice options. In one configuration, users in the second semester of the fifth grade do not continue while users beyond the second semester of the fifth grade continue on.

When the user is to continue on, the counter i is again initialized 177, and the processor 200 requests the user, in step 178 to select a choice option from among the listed choice options provided by the user in step 112. This step can be performed using any of the techniques noted above in connection with steps 112, 138, 146, 154, 162 and/or 170, with a selected choice option being substituted for choice options, choice distinctions, consequences, outcomes, goals, and driving forces, respectively. An illustrative display for this step is shown in FIG. 6G.

The choice option selected will typically be based on one or more driving forces as determined by the user. The driving forces cause the goals to be ranked in an order as determined by the user.

The users can be required to rank the various choice options in order of importance or attractiveness to the user. The ranking can later be used in step 179 for evaluating the user's performance.

The selected choice option is assessed in step 179 using any suitable technique. Typically, the criteria used in the assessment include a level of sophistication of the selected choice option, a level of judgment associated with the selected choice option, whether it is primarily defined by a positive or negative distinction and the degree to which the choice option is driven by self interest versus concern for others.

If in decision step 180 the user's performance is not acceptable, the processor 200 determines in decision step 181 if the counter i is equal to N. If so, the processor 200 fails the user in step 122 and determines whether to proceed with another test. If not, the processor 200 increments the counter i by one in step 182 and again requests the user to select a choice option from among the listing of choice options.

If the user's performance is acceptable, the processor 200 next determines in decision step 183 whether a further choice context should be presented. This determination may be made as noted above in connection with decision step 132.

The processor 200 then determines whether or not to continue (step 184) to higher levels of decision-making strategies or complete the test and award a score to the user in step 110. This determination is typically made in a manner similar to that of decision step 136.

When the user is to continue on, the counter i is again initialized 185, and the processor 200 requests or determines a rationale for the selection of the choice option in step 186. This step can be performed using any of the techniques noted above in connection with steps 112, 138, 146, 154, 162, 170, and/or 178. Illustrative sequential displays for this step are shown in FIGS. 6H and 6I.

The rationale and/or listed driving force(s) are assessed in step 187 using any suitable technique, including one or more of the techniques described above in connection with steps 116, 139, 147, and/or 155.

Figure 3:
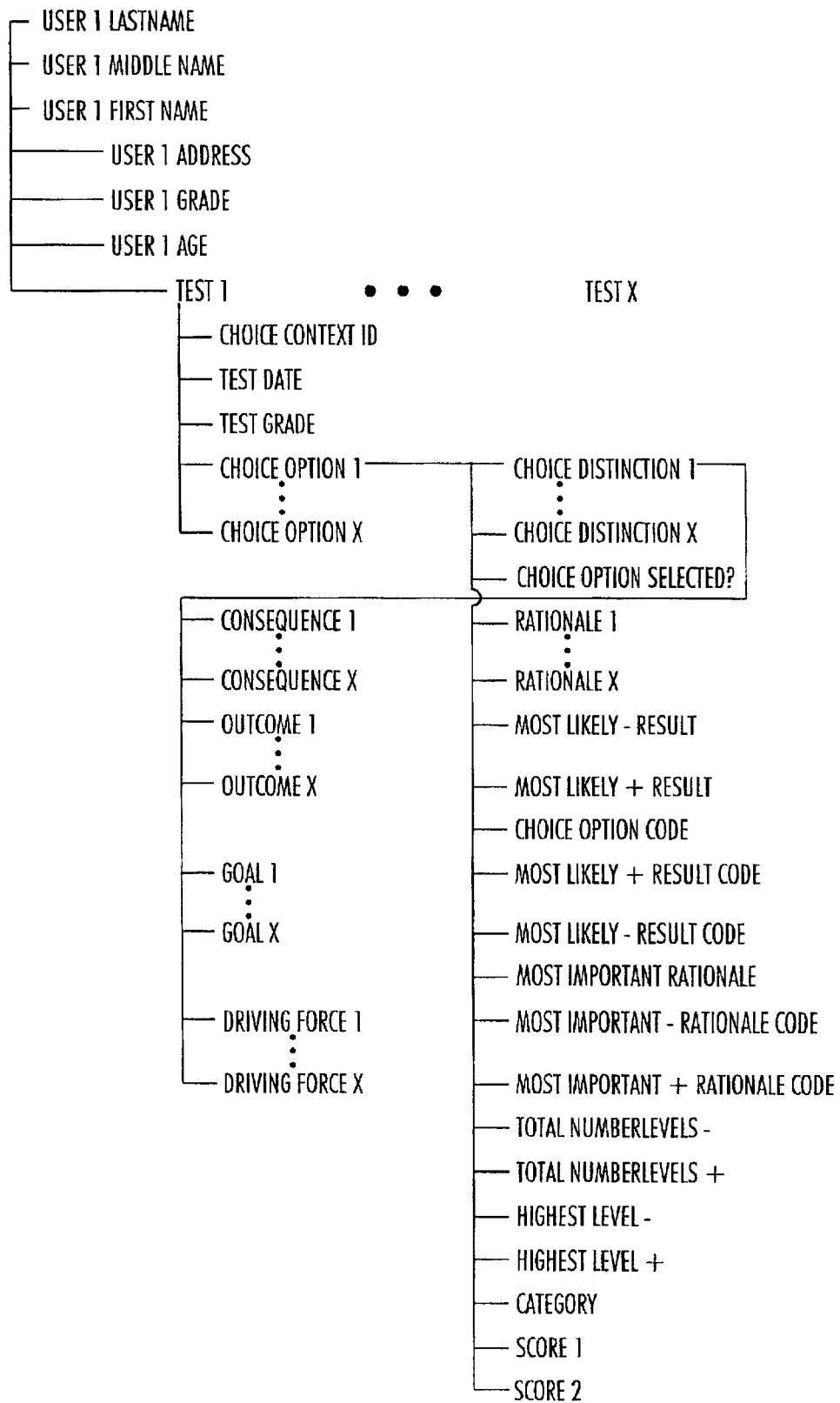
FIG. 3 depicts data structures associated with the methodology of the present invention.

A possible evaluation algorithm is shown in FIG. 3, which is discussed in detail below.

If in decision step 188 the user's performance is not acceptable, the processor 200 in decision step 189 determines if the counter i is equal to N. If so, the processor 200 fails the user in step 122 and determines if the user wishes to or is required to take another test (decision step 123). If not, the processor 200 increments the counter i by one in step 190 and again requests the user in step 186 to provide rationales for the choice options.

If the user's performance is acceptable, the processor 200 next determines in decision step 191 whether a further choice context should be presented. This determination may be made as noted above in connection with decision step 132.

If the user has not performed to a certain level of performance or completed the requisite number of selected choice contexts, the processor returns to step 104 and presents a new choice context to the user. Otherwise, the processor 200 determines a score and the test is completed in step 110.

Figure 4B:
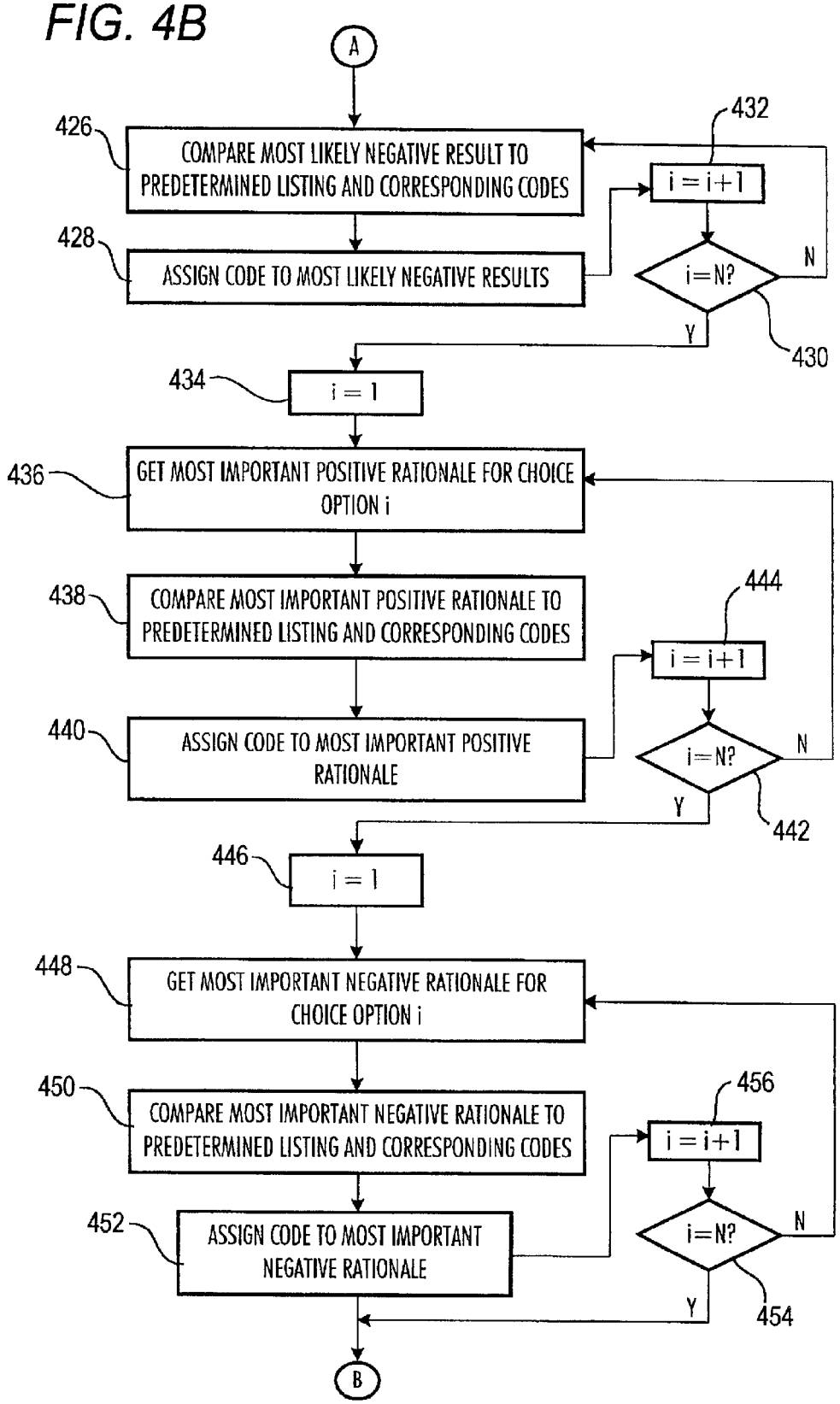
FIG. 4 depicts a process for forming a decision chain.
Figure 4C:
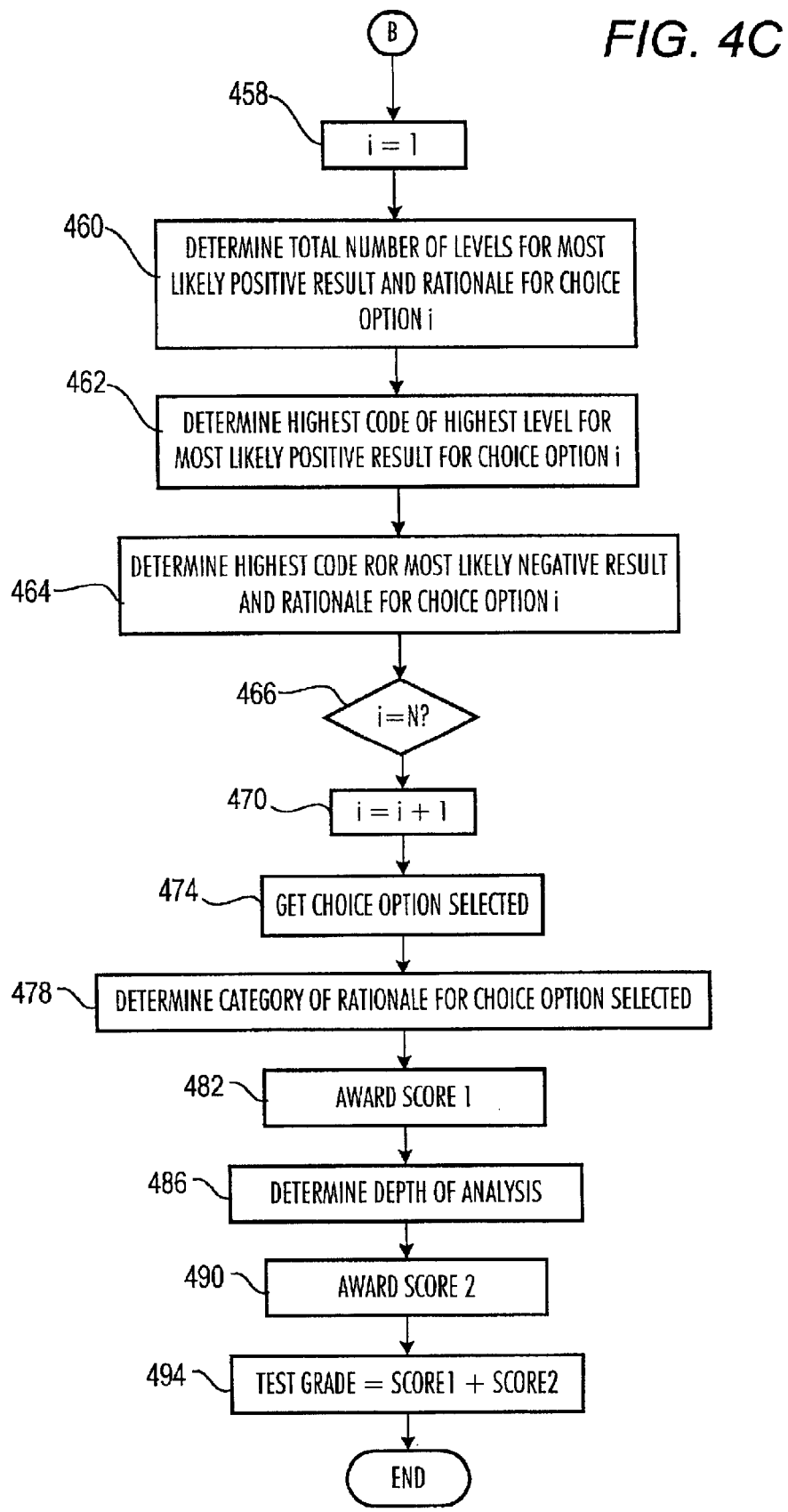

FIGS. 4A–C depict a possible evaluation technique for assessing the choice option selected. The technique forms a decision chain and uses the chain to analyze a depth of analysis of the user.

Referring to FIG. 4A, the processor 200 compares 400 choice to a predetermined listing of choice options and corresponding codes. If in decision step 402 choice is in the predetermined listing, the processor 200 in step 404 assigns the corresponding code to the choice option.

If choice is not in the list or after the code is assigned, the processor determines in decision step 406 if i is equal to N, the number of choice options identified by the user for the choice context presented in step 112 (FIG. 1A).

If not, the processor increments i by one in step 408 and returns to step 400.

If so, the processor reinitializes i, or sets i equal to one in step 410, and gets (in step 412) the most likely positive result for choice according to the rationale input by the user that was identified by the user when the rationale was requested in step 186 of FIG. 1D (see FIG. 6I). The processor in step 414 then compares the most likely positive result to a predetermined listing 224 (FIG. 2) and corresponding codes.

The predetermined listing includes not only results, namely consequences and outcomes, but also distinctions, goals, and driving forces with corresponding codes. In one configuration, the code for a consequence is "CX", for an outcome is "OX", for a goal is "GYX". and for a driving force is "DZX", where "X" is the numerical identifier of a particular variable, Y is the type of goal, namely "S" for social, "F" for family, "T" for trait, "P" for physical, and "E"for enjoyment, and "Z" is the orientation of driving force, namely "E" for externally oriented and "I" for internally oriented. The predetermined listing can also include a category variable ("S" or "M") as discussed below and/or an indicator of which items in the list are positive or negative. The indicator can simply be a "+" for positive or "−" for negative.

The appropriate code is assigned in step 416 to each of the most likely positive results wherein the code corresponds to pertinent code(s) referred to above.

In decision step 418, the processor 200 determines if i is equal to "N". If i is not equal to "N", the processor increments i by one in step 420 and returns to step 412. If i is equal to "N" then each choice option selected by the user has had a code assigned thereto. Subsequently, the processor initializes i (in step 422) and proceeds to step 424.

In step 424, the processor 200 gets the most likely negative result for choice option i, which was provided in step 186 of FIG. 1D (see FIG. 6I). The processor 200 compares in step 426 the most likely negative result to the predetermined listing and identifies the corresponding code wherein the code corresponds to pertinent code(s) referred to above. The appropriate code is assigned in step 428 to the most likely negative result.

As noted, the processor 200 determines in decision step 430, whether i is equal to N. If not, the processor increments 432 i by one and returns to step 426 and, if so, initializes i (in step 434) and proceeds to step 436.

In step 436, the processor 200 gets the most important positive rationale for choice option i, which was provided by the user in step 186 of FIG. 1D (see FIG. 6H). The processor 200 compares (in step 438) the most important positive rationale to the predetermined listing and identifies the corresponding code. The code is assigned 440 to the most important positive rationale.

The processor 200 determines in decision step 442 whether i is equal to N. If not, the processor increments i by one (step 444) and returns to step 436 and, if so, initializes i in step 446 and proceeds to step 448.

step 448, the processor 200 gets the most important negative rationale for choice option i, which was provided by the user in step 186 of FIG. 1D. The processor 200 compares in In step 450 the most important negative rationale with the predetermined listing and identifies the corresponding code. The code is assigned in step 452 to the most important negative rationale.

The processor 200 increments i by one in step 456 and determines in decision step 454 whether i is equal to N. If not, the processor returns to step 448 and, if so, initializes i in step 458 and proceeds to step 460.

In step 460, the processor determines the total number of levels for choice option i. This is done by first determining a numerical level equivalent to each of the assigned codes. Namely, the numerical equivalent of "C" is one, of "O" is two, of "G" is 3, and of "D" is four. Using these numbers, the processor can, for each choice option i, sum the numerical equivalents for the codes representing the most likely positive result, the most likely negative result, the most important positive rationale, and the most important negative rationale. Alternatively, the processor can count the number of different levels considered by the user. This is done by determining how many different numbers are represented for each choice in the variables, most likely positive result, the most likely negative result, the most important positive rationale, and the most important negative rationale.

In step 462, the highest code of the highest positive level for choice is determined. This is done, using the numerical equivalents noted above, by determining the highest numerical equivalent among the variables, most likely positive result and the most important positive rationale.

In step 464, the highest code of the highest negative level for choice is determined. This is done, using the numerical equivalents noted above, by determining the highest numerical equivalent among the variables, most likely negative result and the most likely negative rationale.

The processor 200 determines in decision step 466 whether i is equal to N. If not, the processor increments i by one in step 470 returns to step 460 and, if so, proceeds to step 474.

In step 474, the processor gets the choice option selected by the user in step 178 (FIG. 1D, see FIG. 6G).

In step 478, the processor then determines the category of the rationale for the choice option selected. In one configuration, this is done by including a category variable for each item in the predetermined list. The category variable is one of: "M" for moral or "S" for self. For grading purposes, an "S" is scored as a −1.0, and an "M" is scored as a 1.0 Based on the number, a score, score1, is determined in step 482.

A depth of analysis is determined in step 486. This may be done as described above. Alternatively, this may be done by comparing the rationales identified in step 186 of FIG. 1D. If a positive rationale selected by the user corresponds to a positive item associated with one of the choice options and another positive rationale selected by the user corresponds to a positive item associated with another choice option, the user is given only a score of "3". If the user did not select a positive item from each of the different choice options but identifies a negative item from one of the choice options, the user is given a score of "2". If the user selected positive and/or negative items from only one choice option and no items from the other choice option, the user is given a score of "1". This score is score2 in step 490.

The test grade is determined in step 494 as a function of score1 and score2. The reason for scoring comparisons of items from different choice options more highly is that it reflects the ability of the user to apply the "trade-off" method, which is a key to making good decisions. Contrasting higher-order personal motives is at the heart of the trade-off method. In short, the "trade-off" method is to focus on competing outcomes and linking them to their respective goals (for each choice option). Choice is driven by a contrasting or trading-off between competing goals or driving forces. The ability of the choice option to satisfy the most important goal held by the user is preferably the basis for selecting that respective choice option. The above algorithms teach users to employ the method of "trade-off". Score1 and score2 measure the aptitude of the user in identifying and contrasting the higher order elements (consequences to outcomes to goals to driving forces).

Figure 5:
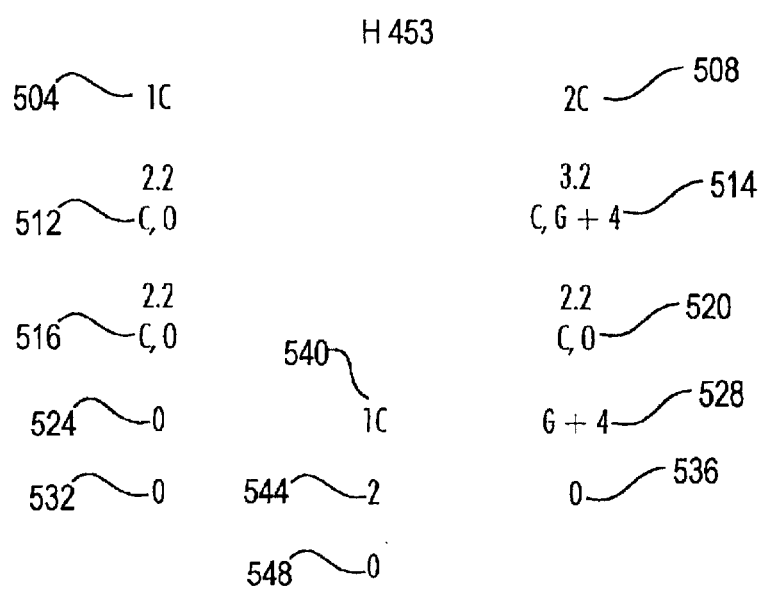
FIG. 5 depicts a decision chain assembled using the process of FIG. 4.

An example of a decision chain generated using the above technique is depicted in FIG. 5. "H453" is the code for the choice context. "H" representing home, "45" indicating that the context is applicable to users in the third and fourth grades, and the "3" being the unique identifier of the choice context. "1C" and "2C" are the codes for the two different choice options. The number to the left of the period (e.g. two, two, three, and two moving from left to right) refers to the highest level discussed at each stage. The number to the right of the period (e.g., two, two, two, and two moving from left to right) refers to the total number of levels discussed at each stage. The letters, "C" and "O" refer to consequence and outcome, respectively; in the phrase "Gt4", "G" refers to goal, "t" to trait, and "4" to the identifier of the particular goal.

With reference to FIGS. 4A–C, the symbols "1C" 504 and "2C" 508 were generated in step 404; the symbols "C" and "O" 512 and "C" and "Gt4" 514 in steps 416 and 438; the symbols "C" and "O" 516 and "C" and "O" 520 in steps 428 and 452; "O" and "Gt4" 524 and 528 in step 462; "O" and "O" 532 and 536 in step 464; "1C" 540 in step 474; "2" 544 in step 482; step 490.

FIG. 3 is a hierarchical chart of the data structures for the above algorithm(s). The various labels are self-explanatory with the following exceptions: "MOSTLIKELY-RESULT"

refers to the most likely negative result; "MOSTLIKELY+ RESULT" refers to the most likely positive result; "MOSTLIKELY−RESULTCODE" refers to the most likely negative result code; "MOSTLIKELY+RESULTCODE" refers to the most likely positive result code; "TOTALNUMBERLEVELS−" refers to the total number of levels determined in step 460; "TOTALNUMBERLEVELS+" refers to the total number of levels determined in step 460; "HIGHESTLEVEL−" refers to the highest level determined in step 464; and "HIGHESTLEVEL+" refers to the highest level determined in step 462.

Although the interactive teaching tool is discussed above in the context of an automated architecture, it is to be expressly understood that the invention includes the manual (nonautomated) use of the above techniques by an instructor or teacher. The above techniques readily lend themselves to the classroom where students can interact with an instructor. In some applications, the above techniques are in fact more effective in the classroom than in an automated architecture. For example, the instructor may use the Socratic method to teach decision making skills according to the present invention. Additionally, the combination of homework assignments and decision-making concepts discussed above offer a very consistent and comprehensive approach to assessing student progress in developing critical decision-making skills. First, the ability to involve all members of the educational community with a common framework for choice behavior discussion can be invaluable. Second, the ability to understand and assess the decision-making ability of individual students, where complex value-laden trade-offs are involved, offers a very unique assessment opportunity for teachers. Third, the ability to use the results of these assessments for early-warning purposes, working toward possible intervention work by teachers and social service professionals, offers another fruitful opportunity. Fourth, the classroom supports the use of cooperative teaching techniques, in which students use teamwork and pro-social behavior to accomplish assigned tasks. Such cooperative teaching combined with a graphical summation of the decision-making process at the end of every class can reiterate and reinforce the concepts discussed by the groups, yield a common framework the students can build upon from year to year, build a pictorial representation that is more easily remembered by the students, and offer a decision-making framework that can be used in the class when analyzing individual behavioral situations.

FIGS. 8A–H depict another embodiment of the present invention. The figures show different screen displays for a simpler algorithm than that discussed above. In FIGS. 8C and 8D, only two consequences and outcomes are identified for each choice option. Unlike the previous embodiment, a comprehensive listing of consequences and outcomes is not provided by the user. The two positive and negative consequences and outcomes listed for each choice option represent the most likely consequences and outcomes for each option. In FIG. 8E, only two goals are identified for each choice option. Unlike the previous embodiment, a comprehensive listing of goals is not provided by the user. The positive and negative goals listed for each option represent the most likely positive and negative goals for each option. In FIGS. 8F, the user contrasts the listed goals, or performs a trade-off between the goals which he or she feels are most important. The user is also asked to indicate which goal is the most important to the user. The selections are indicated by the pointers. In FIG. 8H, the user is asked to identify the primary reason (or rationale) that he or she would decide to tell the truth (the choice option selected in FIG. 8G). As indicated by the pointer, the user chose (b).

In another embodiment, the decision chain is constructed by the following steps:

(a) determine a code corresponding to the choice context;

(b) determine a code corresponding to each listed choice option i (where i is the number of each choice option);

(c) obtain a positive and negative response to the following question: A what is the most likely good (+) thing or result and bad (−) thing or result for each of the listed choice options?;

(d) obtain a positive and negative response to the following question: A What is the likely future end result and why is that important to you, for each of your good (+) and bad (−) results?;

(e) read positive (+) response to question in (c) for each choice option 1 and determine code corresponding thereto;

(f) read positive (+) response to question in (d) for each choice option 1 and determine code corresponding thereto;

(g) read negative (−) response to question in (c) for each choice option 1 and determine code corresponding thereto;

(f) read negative (−) response to question in (d) for each choice option 1 and determine code corresponding thereto;

(g) repeat steps (e) through (f) for each choice option$_{13}$ i;

(h) determine code corresponding to choice option selected;

(i) determine code corresponding to rationale for choice option selection; and (i) determine score as set forth above based on whether positive or negative items from each chain are contrasted by user.

Note that Exhibit A hereinbelow shows a representative embodiment of the instructional materials for assisting users in developing better critical thinking/reasoning skills related to choices they make. In particular, Exhibit A illustrates how the method of the present invention may be presented to children via specific factual contexts also provided therein.

Figure 7:
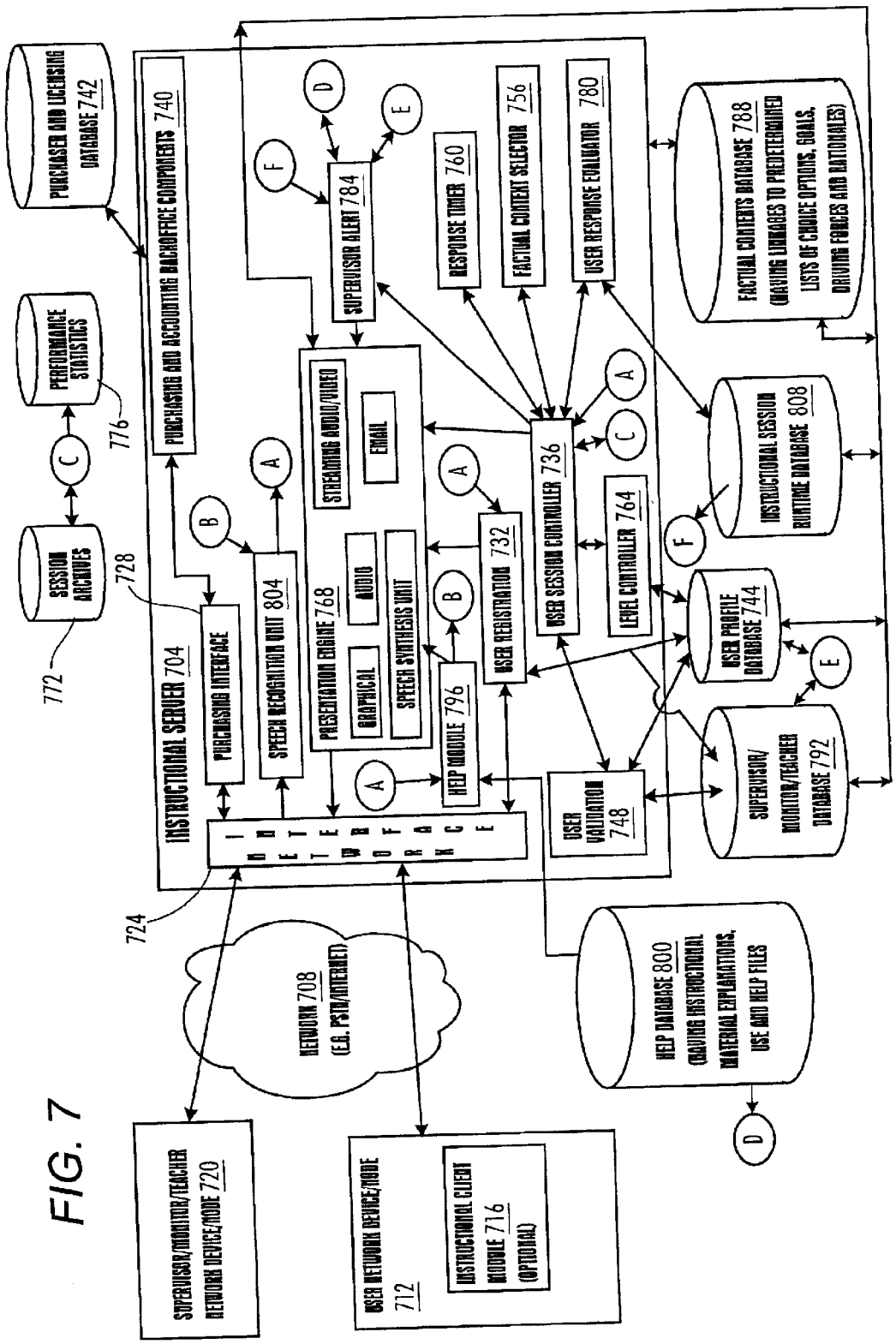
FIG. 7 is a block diagram illustrating the high level components of an embodiment of the present invention for presenting the critical thinking/reasoning instructional materials of the invention via a communications network such as the Internet.

An alternative embodiment of the present invention is shown in FIG. 7 wherein the invention is accessible through a communications network, and more particularly, the Internet and/or a public switched telephone network (PSTN). This figure shows only the high level components of this alternative embodiment along with arrows indicating the primary data and control flows between these components so that one of ordinary skill in the art will understand how to make and use the present embodiment of the invention. However, it is also worth noting that in order simplify FIG. 7, not all data and control flows between the illustrated components are shown. Additional data and/or control flows will be described hereinbelow. Accordingly, this embodiment of the invention includes an instructional server 704 (e.g., website) operatively connected to a communications network 708 (e.g., the Internet and/or a PSTN) for providing the critical thinking instructional materials corresponding to the method and system of the present invention. In particular, the instructional server 704 provides the following services:

a. Provides a network interactive embodiment of the present invention.

b. Allows a user to download instructional sessions and subsequently upload results therefrom the instructional materials and the method of the invention may be provided to network 708 users at corresponding user network device/nodes (e.g., a personal computer having an Internet browser) such as network device/node 712. Thus, in one embodiment, such users may access the instructional materials on line from the instructional server 704, wherein this server retains and controls access to substantially all of the instructional materials and the user responses therefrom. However, in another embodiment, at least some of the instructional materials and/or corresponding software therefor may be downloaded from the instructional server 704 for at least assisting the instructional server 704 in the presentation and processing of both the instructional materials as well as user responses thereto. Thus, in this latter embodiment, an instructional client module 716 may be downloaded (or otherwise provided) to facilitate user interaction with the present invention. In particular, certain components of: the presentation engine (described hereinbelow), the help module (described hereinbelow), the level control (described hereinbelow), the response timer (described hereinbelow), the user response evaluator (described hereinbelow) as well as versions of one or more of the instructional server 704 associated databases (described hereinbelow) may be incorporated into the instructional client modules 716.

In at least some contexts where the instruction server 704 is utilized, users may be students (e.g., grades 1 through 6), or others who desire (or require) supervision and/or additional instruction in making reasoned choices such as the present invention facilitates. In such circumstances, there may be a supervisor/monitor/teacher (also denoted herein as merely a supervisor) that review the performance of users for which they have such responsibility, and for receiving alerts when one of their users appear to be experiencing difficulties that warrant informing the supervisor. Accordingly, such supervisors may communicate with the instructional server 704 through a supervisor/monitor/teacher network device/node 720 also operatively connected to the instructional server 704 via the network 708.

Regarding the instructional server 704, it includes a network interface 724 for receiving and transmitting information related to the instructional material and responses thereto on the network 708. The network interface provides network input from the users and supervisors to various program elements (e.g., cgi scripts, as one skilled in the art will understand) such as a purchasing interface 728, a user registration 732, and a user session controller 736, these being described hereinbelow.

Thus, regarding the purchasing interface 728, this component allows for the purchasing the use of the instructional materials, the software for providing the instructional material interactively, and related support (e.g., storage of user performances, supervisor alerts, statistical comparisons of user performances with other users, etc.). The purchasing interface 728 has the following inputs and outputs:

Inputs:
 a. From supervisors/monitors/teachers: Requests to license the instructional materials of the present invention, requests to review license agreement
 b. From the purchasing and accounting back office component 742 (described hereinbelow): Verification of purchase, instructional materials access key code or other access identifier Outputs:
 a. To supervisors/monitors/teachers: Responses to requests for information about the instructional materials; license agreement information; instructional materials access key code or other access identifier
 b. To the purchasing and accounting back office component 742: Purchase information (e.g., credit card information etc), type of license requested, duration of license, etc.

Note that such a purchase is a licensing agreement wherein the licensee is allowed to use the instructional materials and utilize the related services provided by the instructional server 704 for a specified time period (e.g., one semester, one year, etc), for a specified maximum number of users (e.g., 20 students), a maximum number of computers, and/or for specified levels of critical thinking presentations and interactions (e.g., the higher levels of selecting choice options, providing rationales may be provided at different costs from the lower levels). Note that the purchasing interface 742 may be accessed by a user, a supervisor or other (e.g., school) administrator for purchasing a use license to the invention for one or more users. Moreover, as indicated above, the purchasing interface 728 communicates with the purchasing and accounting backoffice 740 for obtaining license payment and for providing access identification for accessing the services of the instructional server 704. Note that the assess identification is then output to the purchaser via the purchasing interface 728 and the network 708 to the purchaser. Moreover, the purchasing and accounting backoffice components 740 also generate validation information for use in validating each user access under such a license (as described hereinbelow). Furthermore, such validation information is stored in the purchasing and licensing database 742.

Regarding the user registration component 732, this component receives the assess information supplied to a purchaser for thereby registering one or more users so that these users can utilize the services of the instructional server 704. Accordingly, the user registration 732 communicates with the purchasing and accounting backoffice components 740 for verifying that the access identification supplied is valid and allows the number users (at their corresponding critical thinking levels) desired to be registered. Note that in one embodiment, a supervisor (e.g., a teacher) may register entire class. In addition to the names of the users provided to the user registration 732, this component may also be supplied with additional user information for thereby storing a data profile of the user(s) in the user profile database 744. In particular, the following additional information may be requested about a user and stored in the user profile database 744:

(a) age,
 (b) grade,
 (c) school type,
 (d) ethnicity,
 (e) grade point average,
 (f) history,
 (g) scores on standardized tests, and
 (h) parental status.

Regarding the user session controller 736, this component substantially controls and monitors an instructional session with a user. In particular, the user session controller 736 requests and receives user validation information that identifies at least the user requesting the instructional services of the server 704. Note that such user validation information may be a user specific password (input, e.g., by a teacher or the user), or the user's name together with a code that can be used to identify the purchased license which permits the user to access the instructional server 704. In either case, however, the controller 736 activates the user validation component 748 for determining the validity of the user's input identification, and whether the user is allowed to access the requested instructional materials. Note that the user validation 748 accesses at least one of the user profile database 744 and the supervisor/monitor/teacher database 752 to verify the user's identity, and in some embodiments, to verify that the user has access to the instructional materials requested. Additionally, the user session controller 736 provides the following functionality:

(a) Determines type of interaction (e.g., audio, video or streaming audio/video) to be supplied to a user.

(b) Performs the steps of FIGS. 1 by activating other server modules.

(c) Communicates with the factual context selector 756 for obtaining the identity of a (next) factual context to present to the user during an instructional session.

(d) Communicates with the response timer 760 to obtain one or more time intervals within which the user must give a response to an instructional session question.

(e) Communicates with the level controller 764 to determine the deepest level of critical thinking analysis to which it is desired that the user have presented thereto.

(f) Outputs the factual context identity, the deepest level of critical thinking and response time data to the presentation engine 768 so that this engine is able to provide an appropriate presentation to the user.

(g) Outputs incomplete sessions to the session archives database 772 (e.g., user terminates a session prematurely).

(h) Outputs user performance statistics to the performance statistics database 776 (described hereinbelow).

(i) Receives instructional material responses from the user and communicates with the user response evaluator 780 to determine whether the user provided an appropriate response which will allow the user to, e.g., progress through additional instructional materials at a deeper level.

(j) Determines, using the results from the user response evaluator 780, whether the user must continue with the current material, has completed the current session successfully, proceed to a deeper level, or has failed to properly analyze the current factual context. Note that FIG. 1 and its related descriptive text hereinabove is illustrative of the processing performed here.

(k) Communicates with the supervisor alert module 784 to alert a supervisor when a user (for which the supervisor has responsibility) appears to be having persistent difficulties; the alert may be real time during the user's session or after the user has terminated the session; moreover, such an alert may be by email and/or a graphical alert pushed to the supervisor/monitor/teacher's network node 720.

(l) Retrieves partially completed instructional materials from the session archives 772 using data identifying the user so that the partially completed materials can be continued substantially at the point where the materials was prematurely terminated.

Regarding the factual context selector 756, this component may include a random or psuedo-random number generator for identifying a next factual context for presentation to a user. However, in at least some embodiments, the factual context selector 756 accesses a table of factual contexts descriptors, wherein this table is stored in the factual contexts database 788, and the table describes the factual contexts also stored therein. In particular, since it is an aspect of the invention to present factual contexts in different environmental and relational settings (e.g., family, school, community, friends, strangers, vacations, fables, etc.), the descriptor for each stored factual context may categorize each factual context according to its environmental and relational settings. Accordingly, the factual context selector 756 may randomly (or psuedo-randomly) select a factual context from a particular category dependent upon a user's selection of factual context category, and/or a supervisor's selection of a factual context category. Moreover, such a selection of a factual context may be performed by specifying and/or determining the goals and/or the driving forces that are involved in the choice option trade-offs presented by the selected factual context. Additionally, note that in some embodiments the factual context selector 756 may access information identifying a predetermined order that certain factual contexts are to be presented to the user. In particular, such predetermined orders of factual contexts may be input to the instructional server 704 and stored in the supervisor/monitor/teacher database 792 (which is described hereinbelow). For example, a supervisor (e.g., a teacher) may input an ordered list identifying factual contexts, wherein the list ordering is the order in which the identified factual contexts are to be provided to each student for which the supervisor is responsible. Alternatively, such an ordered list may be referenced in the user profile data for each of the students.

Regarding further details of the factual contexts database 788, this database also includes, for each factual context stored therein, the corresponding choice options, goals, driving forces and rationales as described hereinabove.

Regarding further details of the supervisor/monitor/teacher database 792, this database also includes bidirectional associations between the stored data identifying each supervisor and the users for which the supervisor is responsible. Additionally, this database includes data for contacting each supervisor (e.g., network address, email address, and/or phone number), and under what conditions the supervisor should be alerted regarding user difficulties.

Regarding the level controller 764, in addition to determining the deepest level of critical thinking analysis for which it is desired that instructional material be presented to the user, this component determines an appropriate initial level at which a user commences an instructional session. Thus, the level controller 764 accesses the user's profile from the user profile database 744 for determining therefrom the levels at which the user has succeeded and the levels that the user has experienced difficulties. Additionally, the level controller 764 may access the session archives 772 to retrieve information about a previous unfinished instructional session (query information for performing the retrieval being stored in the user's profile). By gathering such information, the level controller 764 determines an appropriate level in the instructional material for the user to continue in a new session. In particular, the level controller 764 may start the user at a level lower than he/she has previously reached for thereby reinforcing previous levels and also providing initial successes for the user at beginning of an instructional session for thereby motivating the user to continue.

Regarding the presentation engine 768, this component provides the majority of the user output during an instructional session. In particular, the presentation engine 768 provides the following functionality:

(a) Presents instructional materials to users in a desired medium, the mediums include: (i) graphical (ii) audio, (iii) streaming audio/video.

(b) Outputs synthesized speech of substantially any text either on user demand (e.g., user clicks on text), or automatically with substantially all textual output. Note that for children having poor or no reading skills such synthesized speech may allow the instructional materials to be effectively presented to such children.

(c) Outputs email to users and/or supervisors regarding, e.g., user performance evaluations, passwords needed to access instructional materials, and notices of new instructional materials.

Note that the presentation engine 768 receives output requests from various components such as the user registration 732, the user session controller 736, the supervisor alert 784, and the help module 796. Accordingly, each input to the presentation engine 768 identifies or provides the data for outputting together with an indicator identifying one or more output mediums (as in (a) above) in which the output is to be presented to a user or supervisor. Note that the presentation engine 768 in general retrieves the output data and/or a template thereof from one of the databases accessible by the instructional server 704. In particular, the user session controller 736 provides the presentation engine 768 with an identifier for accessing the next portion of an instructional session related to a factual context. Thus, the presentation engine uses this identifier to retrieve factual context data from the factual contexts database 788 for outputting to a user. The presentation engine 768 also uses message identifiers from the supervisor alert 784 and the help module 796 to retrieve the corresponding messages from the supervisor/monitor/teacher database 792 and the help database 800 respectively, wherein the help database provides graphical, textual and animated help to users requesting such further assistance (as will be described further hereinbelow). Additionally, the presentation engine uses input from the user registration 732 to provide user registration presentations (e.g., visual and/or audio presentations) to a user or supervisor so that he/she may register with the instructional server 704. Further, the presentation engine 768 uses input from the user registration 732 for emailing information to a user or supervisor such as registration codes and/or passwords.

Regarding the help database 800, this database stores help and user instructional assistance information that is accessed by the help module 796 in response to a user request. In particular, the help module 796 provides the following functionality:

(a) Receives requests for assistance, e.g., such input may be data derived from the speech recognition unit 804 in response to speech input by a requester.

(b) Accesses the help database 800 for appropriate instructional materials and help files for appropriate responses to help requests (c) Outputs such appropriate responses to the presentation engine for presentation to the requester in the medium designated by the requester Note that the combination of the help database 800 and the help module 796 may provide context sensitive help to a user. For example, these components may provide the user with help information that is dependent upon the user's profile data (e.g., the reading level of the user), whether this is the first or successive request for help related to the same condition, and the level of critical thinking that the user has achieved.

Regarding the user response evaluator 780, this component evaluates user responses to the instructional materials, e.g., for determining whether users can appropriately perform critical reasoning at the level being presented. In particular, the user response evaluator 780 provides the following functionality:

(a) Receives input from the user session controller 736 indicative of a user response to the instructional materials.

(b) Evaluates user responses according to the steps of FIGS. 4A–4C; i.e., identifications of the user's choice options are obtained, and the corresponding user input results, and rationales are compared for consistency with predetermined lists results and rationales corresponding to the goals and driving forces also provided by the user.

(c) Stores and retrieves runtime session instructional information from the instructional session runtime database 808, wherein this database includes descriptions of instructional concepts, corrective messages for the user, the status and performance of each user while he/she is interacting with the instructional materials via the server 704.

(d) Performance data is output to the user session controller 736.

Regarding the supervisor alert 784, this component determines an appropriate message to send to a supervisor regarding difficulties a user is having with instructional materials, wherein the supervisor is responsible for monitoring the user's progress. More particularly, the supervisor alert 784 performs the following tasks:

(a) Receives input from the user session controller indicating that a user is having difficulties in a particular instructional session (b) Uses an identification of the user to obtain the user's supervisor/monitor/teacher's identification (e.g., network node address and/or email) from the database 792 and/or the user profile database 744.

(c) Uses an identification of the factual context, the level of critical thinking at which the user is having difficulties for retrieving an appropriate message from the instructional session runtime database 808 to sent to the identified supervisor. Note that such messages may include information specific to the particular factual context with which the user is having difficulty such as an identification of the factual context, its category as it relates to environmental and relational settings.

Additionally, note that more than one supervisor may be alerted regarding the difficulties a user is experiencing.

Regarding the statistics database 776, this database retains statistics on the effectiveness of the instructional materials of the present invention. For example, how many and/or how quickly do users progress through the critical thinking levels according age, background, ethnicity, and reading skills. Additionally, statistics may be retained on the effectiveness of individual factual contexts. For example, statistics may be determined as to whether the mastery of the critical thinking skills for a particular factual context is better or worst preparation for the mastery of critical thinking skills of a subsequent factual context.

Regarding the instructional session runtime database 808, this database stores various instructional session messages as well as the runtime status of each user instructional session.

Regarding the speech recognition unit 804, this component may be utilized with users that do not have sufficient computer skills to perform the instructional tasks otherwise. Moreover, user speech input may be particularly beneficial for users that are handicapped and unable to easily provide input by selection devices (e.g., a computer mouse) and/or a keyboard.

(a) Receives user input derived from speech input by the user; this input can come via various networks such the Internet and/or a public switched telephone network (PSTN). Such speech input may be the primary technique of input for users with impaired computer skills; e.g., children in grades 1 to 4.

(b) Outputs data corresponding to the speech; in one embodiment, it is contemplated that the recognized input does not require the speech recognition unit to identify words particular to a particular factual context. Accordingly, this unit may need to only recognize words that are common to substantially all factual contexts such as numbers and/or letters for identifying choices presented to the user. However, it is within the scope of the present invention that the speech recognition unit may also recognize words related to a particular factual context that has been presented to the user. Accordingly, a list of such words may be provided to the speech recognition unit to disambiguate user spoken responses.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. By way of example, one or more of the steps in FIGS. 1A–D and/or 4A–C may be omitted as desired. By way of illustration, the series of steps to obtain from the user a list of choice distinctions may be omitted. Alternatively, the ordering of the steps in the figures can be altered. A way of illustration, the request to the user for a list of driving forces can follow the request for the selection of a choice option. Depending upon the profile of the user, one or more of the assessment steps can be skipped. For example, for a user who will provide each of the listings requested in steps 112, 138, 146, 154, 162, 170, 178, and 186, assessment steps 116, 139, 147, 155, 163, 171, and 179 can be omitted. In other words, only one assessment step would be used in this alternative embodiment. Various other displays may be used in connection with the above-described process. For example, the display can be progressive as the various lists are entered by the user. In other words, the display at any one step will display the information entered by the user in prior steps. The embodiments described herein above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

EXHIBIT A

Introduction

The primary objective of parents and teachers is to systematically work with our children to enable them to be productive, responsible citizens. Children must be taught to make good decisions through understanding the consequences associated with the various choice options they encounter each day. This method of learning is far superior to rote memorization of what behaviors in which they should, or should not, engage. Because, it is beyond our ability to prepare a definitive set of rules that will deal with every type of situation, which our children will face, in their lives.

Our goal as educators should be to help students become better life-decision-makers, thus directly influencing their ability to become good citizens. Students need to develop the ability to define goals and assess the relative likelihood that each of their choices will not hinder their chances of ultimately achieving their own personal goals. Indeed, students need to develop the ability of ethical reflection and thoughtful choice analysis. The primary beneficiaries will be our children, our families and, ultimately, our society as a whole. We realize that this is by no means an easy task, but the rewards are clear, if not vital, to the very survival of our American society.

In order to develop good citizens, the fundamental building block must involve teaching our children to understand the decision-making process. Learning decision-making, like most things in life, must be done one step at a time. For example, a reasonable parallel may be found in mathematics. Students must first learn to add before they can learn to multiply, and they must learn to multiply before they learn to take square roots. Once these basic relationships between numbers are understood, the student is then ready to apply this knowledge to algebraic "word problem" derived equations. Similarly, the LifeGoals Critical Thinking Skills curriculum breaks down decision-making into basic operations which, when put together, can be utilized to solve the "choice problems" our children are faced with everyday.

The basic teaching objectives of the LifeGoals curriculum are:

- Expand student awareness of the number of choices that are made, explicitly and implicitly, every day of their lives;

- Create student awareness of the range of choices available to them with regard to any significant decision;

- Increase student understanding of the critical determining characteristics of each choice option within the decision context, and their relation to the likely short- and long-term consequences of that choice;

- Help students identify and evaluate the causal relationships between their personal goals and the choices they make across an array of decisions that range from simple everyday decisions to more complex types of risk-creating decisions.

- Develop students' ability (and recognition of the need to take the time) to graphically map out choice options with regard to any decision or problem context, including drawing of inferences with regard to their long-term goals.

LifeGoals is a curriculum that develops each component of the choice process, continually reinforcing the need to step back and analyze the options available before making a decision. Concepts are introduced as the students become capable of comprehending and integrating them. At each grade level, the concepts of choice are reinforced and practiced repeatedly.

The following is a brief overview of the six building blocks of the LifeGoals GOOD Decision Model that corresponds to the six elementary grades [1]-[6]:

[1] Children in the first grade focus primarily on the core idea of choice, specifically, understanding and *defining choice options* (which continues into the second grade and is reinforced at every grade level).

[2] In the second grade, students work on *developing labels for the distinctions* that best characterize their choice options.

[3] The third grade curriculum involves teaching the concept of *sequencing*, that is, *linking the defining distinctions to behavioral consequences*, both positive and negative, for each choice option.

[4] The fourth grade curriculum moves the time frame further into the future, *connecting (associating) the short-term consequences of a choice option to the longer-term outcomes*, for both positive and negative consequences.

[5] By the end of the fifth grade, the students are familiar with the concept of *defining their own personal goals*, and relating each choice option to their goals. Each student will understand the pathways which begin with the defining characteristics of choice options, lead to their likely positive and negative consequences, the corresponding long-term outcomes and, ultimately, to their own goals. This *comprehensive, holistic approach of being able to visualize and chart the entire decision process is known as chunking. Chunking simply refers to the ability of the student to treat the decision-making model as one complete process, without the need to break down into its component parts every time it is applied. For example, chunking applied to walking means the individual would not have to think about each aspect, like "pick up left foot" for every step they take. This obviously only is achieved with much repetition.*

[6] In grade six, the focus centers on the "why" underlying goal selection, with discussions as to the *acceptability of the differing ways to achieve and build one's confidence and self-identity*. These higher-level driving forces that determine which self-defining goals are important are value orientations. Discussions of these abstract concepts in class permit the students to both know themselves better as well as gain a better understanding of their classmates as well. Choice is ultimately seen as a result of a *trade-off* between competing value orientations. That is, each choice option can be linked to a goal. And, each goal is important to the individual because it "satisfies" a value orientation. Thus, choice really includes at the highest level a trade-off between value orientations. Clearly, understanding that different individuals have different value orientations that drive their choice behavior is key to developing acceptance of others.

In the second semester of the sixth grade, this understanding of choice and the reasons that drive it, made possible by the GOOD Decision framework, is used to analyze the decisions of others in more traditional academic coursework, like literature or social studies (figures from current events and history). The ability to analyze the decision processes of others builds self-confidence in the student, essentially empowering the student to move the focus outside of "self"

when analyzing a situation or a relationship. This concept is extended by a series of involving exercises using student-selected individuals to analyze, like a favorite movie character.

LifeGoals Critical Thinking Skills Curriculum Template

The following Curriculum Template summarizes the key components of the LifeGoals GOOD Decision Model by the grade in which they will be taught. Gaining a complete understanding of each of the curriculum building blocks that define the decision-making model is critical to developing effective teaching skills that are consistent from teacher to teacher, especially across grade levels.

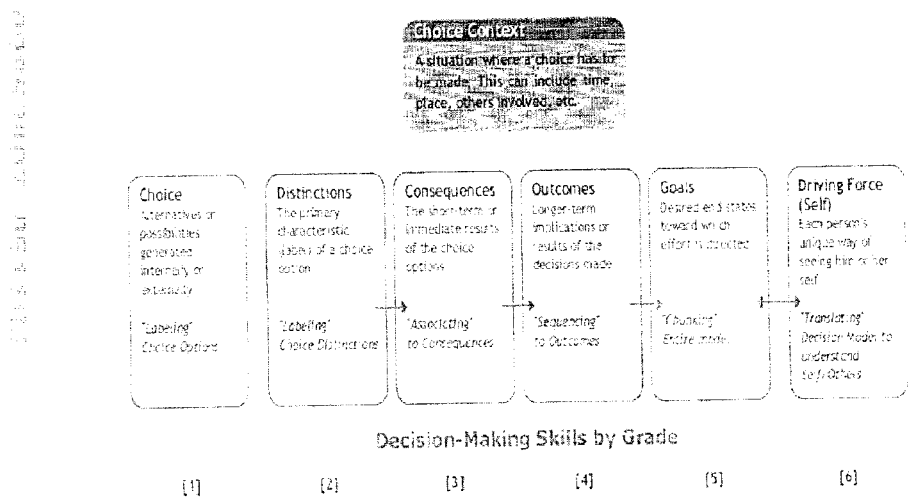

At the heart of the LifeGoals model is the belief that if our children will take a moment to step back and think before they act, they will make better decisions. By graphically showing them a method they can use to understand and analyze their own "thinking processes," we give our children a tool to learn and develop an updateable framework or model that will greatly minimize errors in their present and future decision-making. Clearly, *producing better citizens is our goal, and building character in our children is part of this process*. The LifeGoals curriculum provides us the ability to deliver this critically important part of our children's education, perhaps the most meaningful gift we can ever give our children.

Goal-Oriented Option Development: The GOOD Decision Model

There are four strategic imperatives that define the development of a choice model with regard to decision-making:

1. It is imperative that we teach children to think about their future. To this end, every module of the curriculum will focus on developing the concept of time, continually expanding upon it for every age group.

2. The second key imperative is to teach children how to develop, and ultimately assess, the causal linkages between choice options and the consequences of that choice. Ultimately, the child should be able to link the longer-term consequences or outcomes to personal goals (Goal-Oriented). Lessons used in the Critical Thinking Skills curriculum rely on the child making connections, or associations, across all of the component levels of the GOOD Decision Model. That is, as the curriculum advances, children learn and re-learn the definitions of each of the components involved with the decision-making model. From self-questioning, they learn how to identify the future implications of their choice options across each of the levels in an interactive fashion (Option Development).

*Goal-Oriented Option Development defines the GOOD Decision Model.*

3. The third imperative and the principal goal of the GOOD Decision Model is to provide the foundation for character development by enabling the child to construct a complete decision network for any choice situation that s/he may encounter. Once a child can work with the decision-making model as a unified whole, the GOOD Decision Model will reinforce in the child that it is in his/her best interest to select the choice option that helps him/her achieve his/her own personal goal. The exercises or lessons taught include how to deal with complex situations, like drug use or sexual behavior, or even to explain, after the fact, why a particular choice was not so good. Perhaps more importantly, the ability to "mentally rehearse" and prepare for potentially problematic life-situations is a significantly differentiating positive for this "choice understanding and elaboration" decision-making approach.

4. The fourth imperative involves the basic psychological and philosophical perspective of the GOOD Decision Model. Simply put, this model focuses solely on linking the right choice to one's own personal goal, and *not* on determining what the goal ought to be. Certainly, goal-related discussions will emerge in the classroom, but the philosophical belief of this model is that the most appropriate and beneficial discussions concerning a child's specific goals should take place at home with the child's parents.

In summary, the premise of the GOOD Decision Model is that a teaching framework for decision-making will enable students to discuss choice-goal conflicts in an open, constructive atmosphere. The express assumption of the GOOD Decision Model is that young people can learn to think clearly if they are taught a good, logical framework for assessing choice options, especially in the context of their own personal goals.

Teaching Approach

Cooperative Learning, Decision Mapping, and Trade-off Framing

Teaching the LifeGoals Critical Thinking Skills curriculum involves making decisions, starting with the teacher. This curriculum is intended to emphasize flexibility. Which lessons are selected, the order of lessons taught, and the teaching methods to be utilized are decisions to be made by the teacher, given his or her individual classroom situation. The common ground is the underlying decision-making theory, which can be (and should be) explained in a myriad of different ways. There are recommended teaching methods, primarily focusing on a combination of cooperative learning and developing a diagrammatic summary of the decision process. The cornerstone of the GOOD Decision Model is the development of the choice map and familiarizing students with its meaning.

The following sections overview these key conceptual areas. Importantly, a general description across all elementary grades is reviewed so that teachers can understand the entire process/model, and will thereby have the ability to adopt other ideas as well as alternative ways of explaining these concepts in their lessons.

Curriculum Overview

As will be seen in the individual grade lessons, the first two years of the LifeGoals curriculum is intended basically to provide a background for the concept of choice along with defining the concept of *choice options*. This is extended to both positive and negative defining implications or *distinctions* of the *choice options*. Stories and poems are used, along with shorter scenarios, to provide the contexts for discussion of the related concepts of choice and decision-making. Students are focused on developing an understanding that life is full of choices, and they must define what options are available for each choice situation. In addition, the consequences of these options are defined, both the positive and negative.

Starting in grade 3, the concept of *trade-off* (to be discussed in more detail later) between the longer-term definers of choice options, outcomes, will be integrated into the curriculum. It is this dual understanding of (i) the longer-term, higher-level definers of choice (both positive and negative), in combination with the (ii) appropriate trade-off to be assessed that is the theoretical basis upon which the curriculum is grounded. The translation of outcomes (grade 3), to personal goals (grade 4), and then to driving forces (grade 5), for both the positive and negative consequences, defines the higher levels at which the trade-off will be discussed and evaluated.

In the second semester of grade 6, the LifeGoals decision-making paradigm is extended outside of individual choice situations to those choices made by others, ranging from media characters to historical figures. Understanding the decision-making behavior of others is critical to developing self confidence and the ability to deal with peer pressure, which is often times the determining factor in difficult choice situations that our children face.

Teaching Orientation: Cooperative Learning

The primary teaching orientation of the LifeGoals curriculum involves "cooperative learning," which means:

- Students use teamwork and pro-social behavior to accomplish their common tasks or learning activities;

- Students are positively working together in small interdependent groups;

- Activities are structured so that students need each other to accomplish their common tasks or learning activities;

OR

- Students are working in small groups independently on the same activity.

This classroom "cooperative" teaching orientation combined with a graphical summation (GOOD Decision Model Graphical Summary) of the decision-making process at the end of every class serves to (a) reiterate and reinforce the concepts discussed by the various groups, (b) yield a common framework the students can build upon from year to year, (c) build a "pictorial" representation that is more easily remembered by the students, and (d) offer a decision-making framework that can be used in class when analyzing individual behavioral situations.

Teaching Orientation: Methods

The three forms of teaching LifeGoals detailed below are typically utilized during the same lesson with the younger students. That is, students are divided into small groups representing the different approaches to teaching the GOOD Decision Model. The teacher determines the groups, defines the task, appoints a leader and monitors their progress as the class progresses. The results of the group activity are reported back to the class for teacher-led discussion. The methods are identified for the different groups with a corresponding outline of the steps to be implemented.

Group 1: Role Playing

- Utilize situation concepts based on real-life scenarios

- Allow students time to quietly discuss what they will do to role play their situation

- Role play the situation using different choices

- Students explain each choice based on the GOOD Decision Model for their grade level Discussion: Ask part or all of the class which choice option they would choose, and why.

Group 2: Illustrations

- Use arts and crafts materials to illustrate each real life scenario theme

- Display students' creations on a bulletin board

Discussion: Have students explain their illustrations and give the reasons underlying their choice of subject matter.

Group 3: Story Web/GOOD Decision Model Mapping

- Repeating the "choice situation" and/or sharing another related real life scenario with the group

- Create a Choice Web based on the situation, effectively summarizing the output of the cooperative learning groups

- Use Choice Mapping - reinforcing the choice definitions (by interacting with students and continually questioning their ideas and understanding) and summarizing their responses in a graphical format on the board Discussion: Ask part or all of the class which choice option they would choose, and why.

Why Cooperative Learning?

As we know, cooperative learning is a generic term for various small group instructional procedures. Students work together on academic tasks in small groups to help themselves and their group mates learn together. And, by virtue of the fact that multiple approaches to cooperative learning can be incorporated into the same lesson, serves to greatly increase the likelihood that all members of the class will gain an understanding of the key learning objectives. This is achieved by:

- providing a shared cognitive set of information across students

- motivating students to learn the material

- ensuring that students construct their own knowledge

- providing formative feedback

- developing social and group skills necessary for success outside the classroom, including positive interaction across members of different cultural groups

Structured Learning Team Group Roles

When putting together groups, you may want to consider assigning (or having students select) their roles for the group. Students may also rotate group roles depending on the activity. Potential group roles and their functions include:

- Leader - The leader is responsible for keeping the group on the assigned task at hand. S/he also makes sure that all members of the group have an opportunity to participate, learn and have the respect of their team members. The leader may also want to check to make sure that all of the group members have mastered the learning points of a group exercise.

- Recorder - The recorder picks and maintains the group files and folders on a daily basis and keeps records of all group activities including the material contributed by each group member. The recorder writes out the solutions to problems for the group to use as notes or to submit to the instructor. The recorder may also prepare presentation materials when the group makes oral presentations to the class.

- Reporter - The reporter gives oral responses to the class about the group's activities or conclusions.

- Monitor - The monitor is responsible for making sure that the group's work area is left the way it was found and acts as a timekeeper for timed activities.

- Wildcard (in groups of five) - The wildcard acts as an assistant to the group leader and assumes the role of any member that may be missing.

Teaching Issues and Notes: The GOOD Decision Model

There are three fundamental issues or directions that must be reinforced in every lesson. First, the choice scenario must be both realistic and entertaining. We must capture the attention of the child. This is done by (a) tailoring the situation to the environment (rural vs. urban, etc.) and the ethnicity of the class, and (b) taking on your best story teller voice and embellishing the existing "choice situation" story where you feel you can add to the level of involvement on the part of the class.

Second, all choice-related terminology must be continually reinforced. For all grades, but primarily first and second, translate the concepts of the choice model in any way the students will best comprehend these ideas. It is in no way intended that the terms, which define the model, necessarily be used verbatim in the classroom. They are simply the common lexicon that teachers will use when learning or discussing the model. *Teachers know their students and are best qualified to find ways to best explain these concepts of choice.* Over time, the "best practices" of teachers defining the elements of the choice model will be compiled and summarized as part of the curriculum training.

In the initial assessment of the curriculum, the following teaching issues seemed to present themselves on a regular basis, and therefore represent the common core of developing a "child's teaching lexicon" for explaining the choice model.

- Students have a hard time distinguishing between a *distinction* and a *consequence*. A *distinction* is the defining words or labels that correspond to both poles (+ and -) of each choice option. Sometimes the *distinctions* are *consequences*, and they can be identified as such. This happens because the children are providing the label, and they will think of it at the consequence level. Trying to separate the labels for *choice options (distinctions)* from *consequences* is desirable whenever possible, however.

- Many children think that <u>consequences,</u> the effect or immediate result that will likely take place if a choice option is selected, are always negative. The teacher must redefine, emphasize and continually reinforce that *consequences* are both positive and negative.

- *Outcomes* are a conclusion or result reached through a process of thinking about what could happen in the future, as a logical result of the *consequences*. It may be described as

42 a longer term *consequence*. To illustrate,

> [*consequence*] "What will happen now?"
>
> [*outcome*] "Given (*consequence*), what will likely happen next (in the future time frame)?"

- A <u>goal</u> is the result or achievement toward which effort is directed. It is the desired personal end that drives decision-making, or, more specifically, it is the "*why?*" a *choice option* is seen as desirable.

> [*goal*] "What is your intent, why is that important?"
>
> "What is your aim...ambition...ideal?"

- <u>Driving force</u> is a term that is not likely to ever be used with students. As discussed, it is a theoretical component of the decision-making model. As such, it represents the- level drivers of choice. Said another way, <u>driving force</u> represents the personal reasons why we want to achieve our goals, or even the "why?" underlying the choice of our *goals*.

> [*driving force*] "Why is (*goal*) important to you?"
>
> "Why do you want to achieve this (*goal*)?"
>
> "What motivated you to choose this (*goal*)?"

Understanding the concept or notion of *trade-off* is the basis to understanding the fundamental reason underlying why children make the "not right," typically short-term-oriented decision. First, *trade-off* involves a contrast between two higher-order level elements (*consequences, outcomes, goals or driving forces*) depending upon their maturity level and/or age. This simple fact remains that it is not the *choice options* that are the real things we choose between or among. Rather, it is the higher-level *choice option-defining* elements that govern why we choose what we do.

For children, however, the skill of identifying these more abstract, in-the-future decision-driving elements is not fully developed. The initial focus of the LifeGoals curriculum is on identifying these higher-level elements and understanding how they drive the choice process.

Secondly, research using the GOOD Decision Model permits us to understand exactly *why* children make the *choices* they do, specifically why they make the not-so-good *choices* we see. Analysis of children's decision-making has uncovered two key facts. The most obvious is that children focus on the shorter-term horizon. LifeGoals addresses this, as mentioned above, by focusing upon and defining the higher-level definers and drivers of *choice*, and providing lessons that force the children to identify these higher-level elements.

The not-so-obvious fact involves the realization that children in their choice process mistakenly contrast two different defining elements of their *choice options*. That is, children compare a *positive distinction* (+) of one choice option to the *negative distinction* (-) of the other *choice option*. This is because no two *choice options* in reality are equally preferred *a priori*. That is, one *option* initially is more desired by the child. This results in defining the most preferred option in terms of its positive pole, or *consequence*. And the less preferred choice option is defined in terms of its negative pole, or *consequence*. This biased contrast between positive of one *option* and negative of the other means the positive one will virtually always win out. Put simply, this learning now provides the basis to construct and teach a decision-making curriculum that will effectively change the way children think, and ultimately behave.

This completely new understanding of the reason children err in their decision-making is the critical breakthrough that provides the basis for actually affecting the behavior of children. By understanding the reason children err, we can teach them a process to avoid making this "biased" evaluation. The LifeGoals Critical Thinking curriculum focuses on this task, and this is the primary reason it is effective in changing the way children think and behave. The bottom up approach of using real life scenarios with a decision making model, requiring the definition of causal implications of choice options, is the most effective way in which this flaw in our children's thinking can be addressed.

Through the lessons, the children will be shown that this contrast, representing the flaw, is unfair, and typically yields results that in the long-term will not help them achieve their desired goals. Obviously, the fairer contrast is the positive-to-positive *contrasting trade-off*, which becomes the end focus of each lesson. And, once this concept can be demonstrated and understood, children will realize that it is in their long-term interest to choose the option, that in all likelihood, they did not give adequate time to think through.

When we can focus on this concept of defining and examining the appropriate, "more-fair" trade-off, which is integrated in the curriculum in the third grade, we can change the decision-making process of our children, essentially giving them adult skills at a much earlier age. This conceptual realization of the nature of *trade-offs* within the entire real life decision-making model is at the very core of LifeGoals, and is what serves to make it uniquely grounded, both theoretically, to deliver *Critical Thinking Skills*.

1a Curriculum Overview

During the first semester of first grade, students will be introduced to the definition and concept of *choices*. This will be accomplished through stories and poems that are read aloud to the class, and then the *choices* made by the characters in these stories and poems will be discussed as a class.

By the end of the first semester, students should be able to recognize a situation where a decision has to be made and identify different *choice options* involved in that situation.

Definitions:

*Choice Context*: A situation where a *choice* has to be made.

*Choice Options*: Alternatives or possibilities generated internally or externally. *More simply put, the choice or choices that the student lists.*

Lesson Plans:

Teachers will read stories, many from classic literature, that involve the children. These highly entertaining and involving stories will enable students to see examples of *choices* being made by the different key characters.

Individual lesson plans for the stories that illustrate the concept of *choice* have been included as a guideline to help assist in-group discussions. The lesson plans represent examples of context situations and two of the positive *choice options* for that situation. There are a variety of different ways that these GOOD Decision Model pathways can be utilized when teaching students about making *choices*. Books, games, videos, role playing, and class speakers are just some of the methods that can assist in teaching students about decision-making and *choices. It has been found extremely useful to reinforce the concept of choice in the everyday classroom environment, in particular, when dealing with undesirable behavior. Asking the child what his or her choices are at the time the behavior is being exhibited does this.* Significant changes in classroom behavior have been attributed to using this simple technique.

Learning Activity: Example

Included is an example of a learning activity that is used to help facilitate teaching of the concept of *choices*.

Teachers talk to their students about the concept of *choice*. *Choice* is defined for them. Students are asked if they can think of a time when they have had to make a *choice*. *Choices* mentioned with the class are discussed and summarized on a bulletin board of *choices* that the students can identify with. At the end of the term, the list of *choices* is organized by where (school, home or community) the *choice situation* occurs. Further choice-type classifications could include the person one is with, or the time of day. A reward scheme to recognize the largest student contributors to the list is advised. This can be used as a group or class exercise.

By the end of the term, 100 choices is an expected number to have on the choice board. *Reviewing this list on a regular basis serves well to reinforce the large number of choices the child is faced with everyday.*

Curriculum 1a5 – Choice "Perseverance: The Rabbit and the Turtle"

Overview

This lesson will help students begin to understand the concept of choice and choice context while exploring the idea of "perseverance."

Objectives

- The students will discuss and learn what it means to make a choice.

- The students will begin to comprehend that everyone has choices as demonstrated by the characters in this story.

- The students will become aware that hard work pays off in the end.

Materials

Manila paper

Crayons/art supplies

Procedure - (A) Group Discussion

1. Teacher asks the following questions: "Can you think of a time when you may have made a bad choice? What happened? What do you think would have been a better choice? Why?"

2. Teacher reads Lesson story 1a5 "The Rabbit and the Turtle" to the class. Ask the children to listen very closely to what happens.

The Rabbit and the Turtle
*(An adaptation of Aesop's Fables as translated by George Fyler Townsend)*

It was a bright, sunny summer day in the forest. The birds were singing and happy. The grass was green and the trees were blowing in the wind. The animals were out enjoying the summer day. Up on the hill was a mother Fox, watching her children play.

Prancing happily down a path was a Rabbit. Coming very slowly along the same path, from the other direction, was a Turtle.

When they met, the Rabbit laughed at the Turtle. The Rabbit made fun of the short feet and slow pace of the Turtle.

The Turtle said, "I'm in no hurry, I'm just enjoying the day."

The Rabbit said, "It can't be any fun going that slow, you can't get anywhere at that slow speed."

The Turtle replied, "Though you may be swift as the wind, I will beat you in a race." The Rabbit laughed out loud, believing losing a race to the Turtle was impossible.

The Rabbit asked, "Are you serious about this race?"

"Yes," said the Turtle, "And, would you like to race for something, say, a bunch of carrots?"

"Sure" replied the Rabbit. He couldn't believe his luck! It would be easy to beat the Turtle, he thought, and he would be given fresh carrots to eat after his victory.

"Okay," said the Turtle, "I will meet you tomorrow and I will beat you in a race."

The Rabbit and the Turtle agreed that the mother Fox would choose the course for their race and determine the finish line. They agreed to both bring a bunch of carrots and meet the next morning to race.

That evening, both the Turtle and the Rabbit gathered up a big bunch of carrots to bring to the race. The Rabbit knew he would not need his, because he was certain to win, but he promised, so he collected them anyway. That evening, the Rabbit looked at the big bunch of carrots he collected, and began nibbling on them. He ate and ate, until they were all gone.

As they had agreed, the next morning both the Turtle and the Rabbit were ready to race. The mother Fox had marked a long racecourse, over three miles long. The Turtle brought his carrots, but the Rabbit did not, for he had eaten them all the night before. The Rabbit promised the mother Fox, that if he lost, he would go get a bunch of carrots for the Turtle the next day. They agreed, and the mother Fox started the race.

The Turtle started at his slow, steady pace. The Rabbit pranced down the path, showing off, ever increasing his speed, and laughing at how slow the Turtle was moving. The Rabbit ran ahead, but the more he ran, the sicker he became. The carrots he had eaten most of the night had made him sick. The Rabbit decided to lie down and rest a minute until he felt better. While lying down, he closed his eyes and fell asleep.

At last waking up, the Rabbit raced to the finish line, to find that the slow Turtle, who had never stopped, had won the race. And the Fox reminded all those who had watched, that "slow and steady wins the race."

3. Teacher asks if the children understand what this story is about. Additional questions might be as follows: "Who can tell me what happened to the Rabbit?" Raise your hand if you think the Rabbit was wise to race that day. How about the Turtle? Why? How many think it was a bad choice for the Rabbit to take a nap? Why?

4. Discuss choices and what it means to make a choice. (Teacher writes on the board in large letters - CHOICES. On the left under the word CHOICES write THIS and on the right under the word CHOICES write THAT.) The Rabbit and the Turtle each had choices to make. Should they race each other or not race? Should they eat the carrots before the race or save the carrots? Should they rest during the race or keep moving?

Procedure - (B) Situation Card: "Perseverance: The Rabbit and the Turtle"

Divide the class into three cooperative learning groups. Or, choose one activity for the entire class to participate in.

1. Group 1: Role Playing Situation Card "Perseverance: The Rabbit and the Turtle" Discuss and role play this scenario, including the results of each character's choice.

2. Group 2: Illustration Activity - "Slow and Steady Wins the Race" Course. Explain to the students that they will make a class "Slow and Steady Wins the Race!" Course. Display a racecourse on a bulletin board and label with the header "Slow and Steady Wins the Race!" Be sure to include a Rabbit napping on the side of the course. Hand out drawing paper cut out in the form of a Turtle. Ask students to illustrate a time when they were in a situation where they worked hard and chose to stick to it. How did the situation end? Did they make a good choice? Attach children's illustrations to the course. Label each student's illustration with the choice they made; i.e., learned to count to ten.

3. Group 3: Story Web/GOOD Model Mapping

Teacher leads this group to discuss the story using a web:

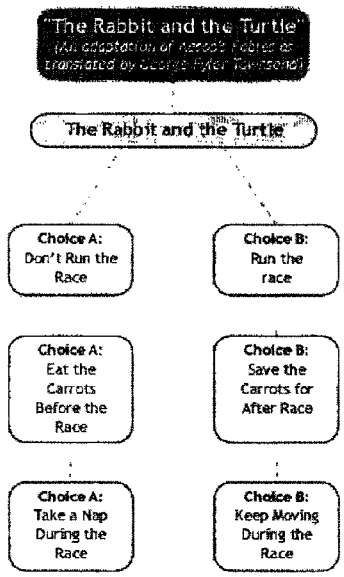
Reminder: The goal is to help children understand choice options, not what choice option to make.
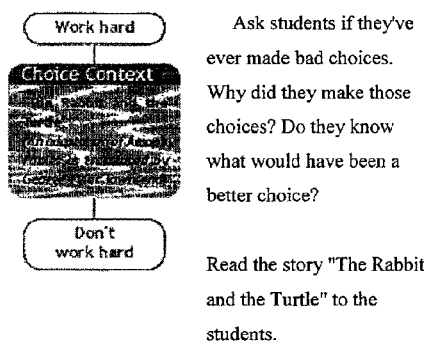
Ask students if they've ever made bad choices. Why did they make those choices? Do they know what would have been a better choice?
Read the story "The Rabbit and the Turtle" to the students.
Ask the students if they understood what the story was about.

Discuss the choices made by the rabbit and the turtle:

- The turtle's choice to race
- The rabbit's choice to stop and take a nap
- The turtle's choice to keep on running the race.

Discuss with students whether these were good or bad choices. If they were bad choices, ask students to come up with other choices that would have been better.

For example:
- Should the rabbit have stopped and taken a nap?
- Should the rabbit have taken the race more seriously?

1b2a Curriculum Overview

In the second semester of the first grade (1b) and the first semester of the second grade (2a), students will learn how *choices* play an important role in their own lives by giving them situations that they will likely experience themselves. Short stories are provided in the lessons, which may be added to or embellished by the teacher during story telling. Any additions that the teacher can add to make the stories more realistic for the individual class are encouraged.

Beginning the second semester of first grade, students should have a complete understanding of *choice* and be able to recognize when a *choice* has to be made. During this semester, students will be introduced to the concept of *choice distinctions*, the descriptive labels, both positive and negative, that best characterize the *choice options*. This concept should be reinforced in all of the lessons.

By the end of the second semester of first grade, students should be able to identify a situation where a decision is being made, the *choice options* involved in that decision-making, and the positive and negative *distinctions* that serve to define a *choice option*. These concepts are reinforced throughout the first semester of the second grade.

Definitions:

*Choice Context*: A situation where a *choice* has to be made.

*Choice Options*: Alternatives or possibilities generated internally or externally. *The actual choice or choices that the child lists.*

*Distinctions*: Key defining characteristics or verbal labels, both positive and negative, for the respective *choice options*. *The distinction, then, means defining or labeling each pole (+ and -) of the two most considered choice options in the students' own words.*

Lesson Plans:

The stories for each lesson represent the context situations (*choice context*), the *choices* involved and their *distinctions*. These examples show situation scenarios (*choice contexts*) that students may encounter in their own lives. Each example gives the *choice options* for the situation and two possible (most likely) pathways for each of the *options*. *If the students come up with another pathway they feel is more representative, this of course can be used at the discretion of the teacher.*

The step following the *choice options* on the decision-making pathway, again, is called *distinctions*. A *distinction*, then, *is* the key characteristic that serves to label the positive and negative aspect of each *choice option*. *Note: students often have a hard time distinguishing*

*between a distinction and a consequence. Sometimes they are, in fact, the same. It is critical to start with teaching students the positive and negative labels prior to consequences, however. If the labels (distinctions) are the same as consequences, you can deal with that at a later time. We are, in fact, trying to get children to think in these (implicative) terms, so the fact they label in consequences just means their "mental wiring" is already in place.*

The following is an example of a learning activity that will be used to help the teacher facilitate additional ideas for teaching about *choices*.

Learning Activity: Example

Review with the class the concept of *choice*. Introduce the *distinctions* "label" concept, meaning the students' words that best represent their description of the *choice* options. Students should be focused on the positive and negative implications of each *choice option*. Give the definition with examples of *distinctions*.

For example: *The choice is whether or not to obey your parent (or teacher). One distinction may be that you are (+) "following the rules" and another distinction would be that you (-) "don't get to do what you want" or "can't have fun."* Reinforce there is both a "+ and -" for every *choice option*.

Continue to talk with the class about some *choices* they might have made without realizing it. Add these to the ongoing *choice* list on the bulletin board. Continue to add to the class list from the first semester, or start a new list by types or kinds of *choices*. Examples of types may be grounded in the students relationships to others involved, such as parents, older siblings, younger siblings, authority figures, classmates, strangers, etc.

Have each student pick one *choice* and either a positive or negative *distinction* and draw a picture of it. Have some of the students talk about their pictures in front of the class. Hang them around the room (hopefully on a regular basis) to use as examples for later lessons.

Curriculum 2a1 - Choice Distinctions

"Should You Clean Your Room?"

Overview

In this lesson the students will continue to reinforce their concept of choice distinctions. Students will discuss and conduct activities around the "real life" scenario of making a choice between cleaning their room before company comes or talking on the phone about a friend's summer vacation plans.

Objectives

- The students will expand their concept of the meaning of responsibility.
- The students will explore the plus (good) and minus (not-so-good) side to the choices they make.
- The students will answer questions using critical thinking. Foster this by framing questions that ask the student to look more in depth at the underlying reasons that choice alternatives are "good or bad."

Materials

Chalkboard and chalk or Chart and markers

Procedure - (A) Group Discussion

1. Ask the students what responsibility means to them. Record their responses on the chalkboard or on a chart. Possible answers might include:

o Responsibility is being dependable and accountable for your words and actions.

o Responsibility is doing your best and never blaming others for your mistakes.

o Being responsible for a job means that you are the one who makes sure it is done correctly and on time.

2. Ask the students how people show responsibility and record their responses on the chalkboard or on a chart. Possible answers might include:

o By being dependable.

o When you tell someone you will do something, that person is "counting" on you to pull your weight. If you do a good job and finish on time, you are showing that you are responsible.

o You are also showing responsibility by the choices you make. Some decisions, such as the way you treat others and do your chores, affect other people. When you make appropriate choices, you are showing others you are responsible.

3. Teacher reads story to class

Work: Should You Clean Your Room?

Mary's room was a mess.

She had cleaned it on Saturday morning as part of her weekly chores, but today was Tuesday and sometime between Saturday and Tuesday all of her clothes and all of her toys seemed to have jumped out of the drawers and closets where they normally live and onto her floor.

Mary's mom usually didn't pay too close attention to how neat Mary's room was until Saturday morning, but this evening company was visiting and all the rooms in the house needed to be clean as can be before they arrived.

It was only four o'clock in the afternoon on a beautiful spring day. Mary was home from school only an hour and was energetically running around the backyard with her older brother Scott when she heard her mother call.

"Mary, come clean your room and get started on your homework," yelled mom from the back porch. "Company will be here by seven and you have to be all done."

So, with little enthusiasm, Mary headed upstairs to clean her room. Not only did Mary have to clean her room on a Tuesday, but after she was done cleaning, she had two big homework assignments to finish before company arrived.

Just as Mary was about to pick up the first toy, the phone rang. It was her best friend, Angela, and she wanted to talk about her summer vacation plans. Before Mary could interrupt, Angela was talking a mile a minute, excited about the summer.

While Angela talked, Mary began to get excited for summer as well. Mary couldn't wait to tell Angela what she had planned as well. But then Mary remembered what her mom had asked her to do.

Should Mary talk to Angela about summer vacation plans or should she finish cleaning her room? If you were Mary, what would be your choice?

Procedure - (B) Situation Card: "Should You Clean Your Room"
Divide the class into three cooperative learning groups.

1. Group 1: Role Playing Situation Card "Should You Clean Your Room?"
   Read the following real life scenario to the students.

*Mary's mom asked her to have her room cleaned before company comes, but Mary gets a call from a friend who wants to talk about summer vacation plans. What should she do?*

Have the students role play this scenario using both options.

After presentations are made, ask the class:

o  What responsibility did Mary's mom give her?
   o  How would you have handled this responsibility?
   o  Would Mary be showing responsibility if she chose to talk on the phone instead of cleaning her room?
   o  What is the plus side of cleaning her room?
   o  What are the consequences of having a clean room?
   o  How will it benefit you to clean your room?

2. Group 2: Illustration Activity Create Responsibility Bulletin Board.

Have the students create a Responsibility Bulletin Board with illustrations of responsible behavior.

3. Group 3: Story Web/GOOD Decision Model Mapping.

Teacher leads a discussion using the GOOD Model as a guide. On the chalkboard or a chart, write the pluses and minuses of Choice A and Choice B, connecting ideas with lines representing a connection or implication between ideas.

Reminder: The goal is to help children understand choice options, not what choice option to make.

Work: Should You Clean Your Room

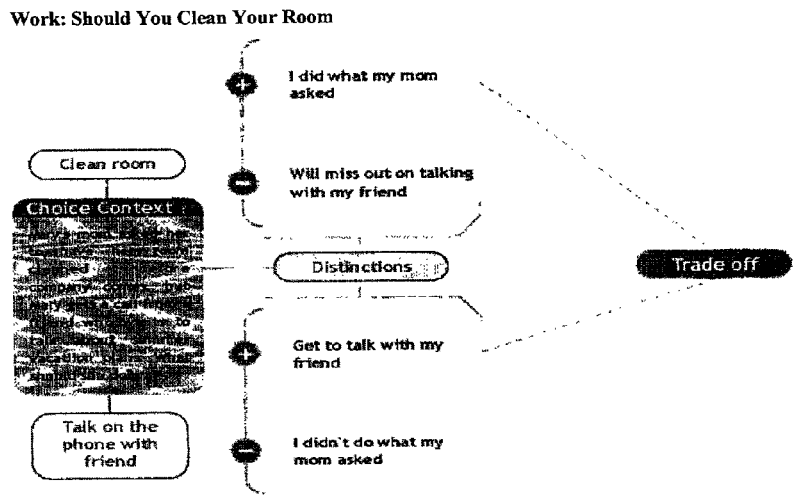

2b3a Curriculum Overview

5    Beginning in the second semester of second grade (2b) and the first semester of the third grade (3a), students will again review the concept of *choice options* and the *distinctions* of these *choice options* which lead to *consequences*, according to the situation (*choice context*).

By the end of these two semesters, students should have a complete understanding of a situation where a decision is being made, the *choices* involved with that decision, and the 10   *distinction labels* and direct *consequences* of the *choices* involved with the decision.

Definitions:

*Choice Context*: A situation where a *choice* has to be made.

*Choice Options*: Alternatives or possibilities generated either internally or externally.

*Distinctions*: Key defining characteristics, both positive and negative, for the respective 15   *choice options*.

*Consequences*: The short-term or immediate results of the *choice options, for both positive and negative distinctions*.

Lesson Plans:

The lessons contain examples of context situations, the *choice options* for each situation, and the *distinctions* labels and the *consequences* for those *choices*. These lessons represent scenarios (*choice contexts*) that students will likely encounter in their own lives. Each example gives the *choice options* for the situation and two possible pathways for each of the *options*.

The labels defining *choice options* are termed *distinctions*. *Distinctions*, again, represent both the positive and negative labels for defining characteristics of *choice options*. Associated with each of the *distinction labels* are *consequences*, which are defined as short-term or immediate results of the *choice options*. *Importantly, students must be taught to understand that consequences are both positive and negative depending on their relative basis.*

Teachers are encouraged to "draw out" new ideas from students, and work through their *distinctions* and *consequences*. Interacting in this way makes the lesson clearly more involving and meaningful for the students. *Teachers are instructed to refrain from dealing with "right" and "wrong" assessments or any type of judgmental comments when discussing student-developed decision pathways.* The goal is to get students thinking and talking about *choices* and their meaning to them personally in an open manner, not in a judgmental way.

Included is an example of a learning activity that can be used to help teachers facilitate ideas about teaching decision-making.

Learning Activity: Example

Introduce the class to the concept of *consequences*. Ask the class if anyone knows what the word means. Define *consequences* in terms of making a *choice*. *Ask about positive and negative connotations. Make it clear that consequences are both positive and negative by way of examples.*

*Idea:* Have a guest speaker come in and talk to the students about a *choice* that students might make everyday. For example: *a dentist talking about the importance of a clean mouth, a nutritionist discussing the importance of eating healthy, or a law enforcement officer telling students about the importance of being law abiding.*

Following the speaker's lecture, discuss some of the *choices* they learned from the speaker. What are the *distinctions* and the *consequences* of those *choices*? Use the GOOD Decision Model pathways to graph out the speaker's ideas.

*Idea:* Have students write a personal situation that is based on the speaker's presentation. Have them chart or graph the *choices*, *distinctions* and *consequences* based on their situation.

Have students present their situations to the class and discuss.

Curriculum 2b1 – Consequences "Loyalty: Should You Consider Others Feelings?"
Overview

Through the use of a "real life" scenario, students will study the concepts of compassion and loyalty and will be introduced to the concept of caring for others.

Objectives

- The students will learn there is a plus (good) and a minus (not-so-good) side to all choices followed with consequences.

- The students will learn the importance of compassion.

- The students will increase their feelings of being needed and appreciated.

Materials

Chalkboard and chalk or Chart and markers

Procedure - (A) Group Discussion

1. Teacher tells the students that the lesson today is about a child who is new on his bus at school. She asks, "Have any of you ever been the new kid? How did it make you feel and did anyone make you feel welcome by including you in their group? Did they choose to pretend you weren't there? What did that feel like?"

2. Teacher says: "Boys and girls, can you tell me what compassion means?" Possible answers might include:

Compassion is caring about how others feel.
    Compassion is doing kind and thoughtful deeds for people in need.
    Compassion often means putting other people's needs before your own.

Discuss with the class that compassion is something you show for others. When someone shows compassion, he shows that he cares about how others feel. Your kind and caring actions can not only help others and make them feel better, but can make you feel proud of your good deeds.

3. Our choice of action causes a consequence. Consequences are the immediate results of the choice options. Today, we are going to explore the consequences of being compassionate or choosing not to be compassionate to a new kid on the bus.

4. Teacher reads following story to class.

Lesson 2B1

Loyalty: Should You Consider Other's Feelings?

Vance and Bruce are best friends. Every day when the bus picks them up to go to school, Vance and Bruce get on the bus together at the first bus stop. The boys always like to sit in seats right across from each other. Even though two kids would fit in one seat, Vance and Bruce like to get their own seats so that they can spread out and relax on the way to school. Vance has other friends that sit near him on the bus, and the long bus ride goes by very quickly some mornings because the kids talk all the way to school.

One morning, at the last bus stop, a new kid gets onto the bus. Vance hears the boy introduce himself to the bus driver as Eddie. Eddie looks like he might be a little bit nervous. It must be his first day at Vance's school.

Vance looks Eddie over, and he figures that Eddie must be from a different school because of the way he is dressed. Eddie is wearing dress pants and a tie. Vance has only seen his own father wear a tie twice! Some of the other boys on the bus are looking at Eddie, too. They are snickering at Eddie's clothes, and Eddie looks really uncomfortable.

Eddie starts to walk towards the back of the bus. The bus driver asks Eddie to choose a seat so that the bus can get moving. There isn't one empty seat on the bus. Eddie looks at Bruce, but Bruce is laughing and whispering about Eddie, and he looks out of the window. Eddie looks over at Vance who is sitting by himself.

Should Vance make the new boy Eddie feel more welcome and comfortable by offering him a seat on the bus, or should Vance play along with his giggling friends and ignore Eddie? If you were Vance, what would be your choice?

Procedure - (B) Situation Card: "Loyalty: Should You Consider Other's Feelings?"
Divide the class into three cooperative learning groups.

1. Group 1: Role Playing Situation Card - "Loyalty: Should You Consider Other's Feelings?"

2. Group 2: Illustration Activity - Have each student in the group write his/her name at the top of a piece of chart paper. Each student writes one thing that s/he likes about that person on each student's "I Like You" Chart. i.e. I like _____ because _____.

Each student should sign his/her name after his statement on his classmate's chart. Giving compliments is an easy way for people to show that they care. This self-esteem building activity gives the students a chance to practice pointing out positive things about each other.

3. Group 3: Story Web/GOOD Decision Model Mapping.

Teacher instructs students to return to their seats and proceeds to write the words "This" and "That" on the board with subcategories of "Be friendly and ask new kid to sit together on bus" and "Ignore new kid."

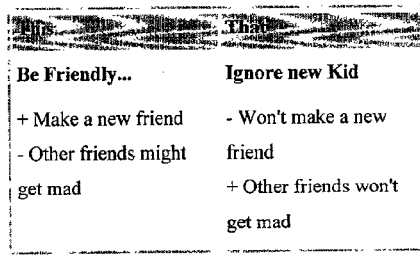

| Be Friendly... | Ignore new Kid |
|---|---|
| + Make a new friend | - Won't make a new friend |
| - Other friends might get mad | + Other friends won't get mad |

4. Ask students "what is good about making a new friend?" In this case, they will probably say that the new kid isn't alone. Then ask, "what is good about ignoring the new kid?" They might say that they won't lose their old friends.

Then ask, "what is not so good about ignoring the new friend?" They will probably say that the new kid will be alone.

Now rate all the choices and consequences listed on the board. Ask them to consider all the pluses and minuses and determine the best choice for them considering the consequences.

Reminder: The goal is to help children understand choice options, not what choice option to make.

Loyalty: Should You Consider Other's Feelings?

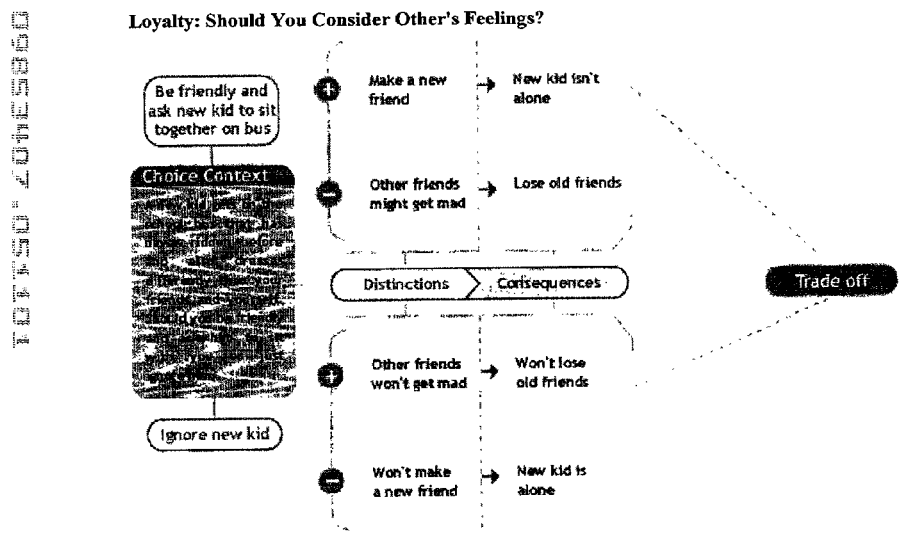

Trade-off Method

The LifeGoals Critical Thinking Skills curriculum views the educational process that we must teach our children as the ability to analyze a new situation and select a logical course of action grounded in a long-term perspective. These decision-making skills we hope to give to our children must also be put in a context that builds self-confidence, making him/her comfortable in acting upon the choice made. The GOOD Decision Model has two interrelated structural components that together make it effective delivering decision-making skills to elementary age children. The first is the GOOD Decision Model with its definitions and logical, graphical structure, identifying and connecting future implications to each of their respective *choice options*. The second component involves developing the students' evaluative skills in analyzing the trade-offs between the higher-level implications of the *choice options*. This section will focus on the second component, namely, the teaching methods required to get students comfortable with using the GOOD Decision Model to select the most appropriate course of action for them, individually.

A working knowledge of the elements of the GOOD Decision Model and how to define these elements in terms and concepts the students are familiar with is the first step to teaching decision-making. Significant effort, in terms of teaching directives and lesson development, has been made toward accommodating this fundamental need. The methods of teaching have been outlined, and example decision pathways are provided for each lesson. Once a familiarity is achieved with the GOOD Decision Model, teachers (and students) gain questioning (and answering) skills that will enable them to interactively generate the decision map for each lesson. The pathways provided as a part of each lesson are just meant to be examples the teacher can use when developing questions for the students in his/her class.

The teaching concepts addressed in the second component, trade-offs, of the GOOD Decision Model, however, are vastly different from the teaching approaches utilized for most core curricula in grades one to six. The teaching of trade-offs is, in fact, much like the case method of focused discussion utilized in law school. Underlying this approach is this simple statement: *Teaching is a social art*. The relationship between teacher and class must be a reciprocal one. This clearly differs from the lecture mode of facts being presented by the teacher who "knows all." Changing this role orientation is difficult, and requires modifying the learning environment combined with a fair amount of practice.

In teaching "trade-offs," teaching is not only the *art* of thinking and speaking, but it broadens the skill required by focusing on the *art of listening and understanding*. Listening means listening with an open mind, that is, without predetermined next steps or discussion questions. Using what the student says as the basis for the next question to be asked is key. The issue, then, is to determine what the next question will be, based upon what a student says, so as to lead the student/class to discovering ideas for themselves. It takes practice to really hear and understand a child's spoken or implied word or feelings. And it takes more practice to construct questions from the comments the students' make (creating a Socratic dialogue), given the constraints of an elementary vocabulary.

As is apparent, conducting a "trade-off" discussion is a complex activity, requiring considerable skill on the part of the teacher. Leading the discussion that provides an understanding of a student's actual decision-making process, and then being able to diagram the model for discussion and elaboration purposes for the class, is one of the most difficult of all teaching activities. However, being able to lead this discussion is the critical ingredient in making LifeGoals effective. The simple truth is that decision-making training and practice is the best way to produce good decision-makers, and this training in logical thinking is best accomplished in a questioning type of discussion.

Logical questioning provides insight, and the ability to logically question one's self with regard to making life-choices is a benchmark of maturity. This is what the LifeGoals Critical Thinking Skills curriculum can instill in our youth.

The Lesson Format

A common component of every LifeGoals lesson is the graphical depiction summarizing the choice options, with the positive and negative poles extended to the appropriate level for that grade of the GOOD Decision model. That is, in the earlier grades (first and second) when the alternative teaching approaches are utilized so as to make the material more involving, the conclusion of the lesson will always be a diagram constructed on the chalkboard. This will serve to reinforce the model and its' defining terms and relationships. In the later grades (third through sixth), the focus is more directed toward identifying and diagramming the components of the decision model. This is when the class develops both the positive and negative consequences, along with their corresponding outcomes, goals and driving forces of each choice option. This "trade-off" analysis between the two positive poles, will serve as the cornerstone of the interactive discussion, and, will become more and more of the teaching emphasis.

Trade-Off Method

To set apart this method of teaching (and content), a distinct and different class seating arrangement is recommended. A U-shaped class layout helps in providing an environment that fosters student participation and involvement. This seating arrangement also helps in setting the tone that the Critical Thinking curriculum is different than more typical lecture-type instruction.

In the earlier grades (first and second), when other teaching activities are the primary focus, this is not critical. However, in the later elementary grades this should be common practice.

As has been mentioned earlier, the real life situational context is a key defining component of the GOOD Decision Model. The bottom up approach (situation-based) provides many advantages over top down values or virtues approaches in preparing our children to meet the challenges they face daily in their lives. Clearly, analyzing a specific, real life situation forces the student to deal with the "as is" aspect, as opposed to the more abstract "might be" or "should be" artificial situation. But, the situation provides only the foundation for the learning process of developing and defining the implications of choice options. What is required to "bring the lesson to life," thereby making it involving and meaningful for the students, is a unique and complex combination of individual, overall class and teacher discussion.

A few general defining teaching directives:

1. The teacher serves primarily as the discussion leader. The teacher should serve as a sounding board for the class, but should not enter actively into the class discussion in terms of giving answers. The children should be the sole source of ideas.

2. Students must be led to uncovering the concepts that will build their decision-making skills as opposed to simply providing them a model and a few rote facts. The ability to ask questions in such a way so they are non-threatening, and yet force the child to think, is the key.

3. Teaching the decision trade-off method in LifeGoals requires understanding that learning requires student involvement in the process and ultimately self-teaching, which is gained primarily from listening to their classmates. Teachers must believe that the only answers that are meaningful are in the heads of their students. The teacher's challenge is to get these ideas out so they can be discussed. Once students become familiar with the idea that they are the basis of answers, and not the teacher, the students can begin to think for themselves.

4. Teaching trade-offs in LifeGoals is more like guiding a process of discovery. By providing a decision-making model and having the student "fill in the blanks," the teacher gains a more in-depth understanding of the student, and most importantly, the student gains a better understanding of him/her self. Students must be trained so they can be reflective, essentially doing their own internal questioning. This is the fundamental goal of LifeGoals and this is what the Critical Thinking curriculum is all about.

From an operational perspective, the teacher's goal is to encourage and draw out *participation by all students, using their emotions as well as their logic in defining their choice options*. This is accomplished by continually challenging an individual student's line of thinking in a positive manner (basically asking the "why?" or "what if?" question), while maintaining continuity by positioning their answers within the GOOD Decision model.

In sum, leading the discussion can be thought of as weaving together the fibers of a quilt whose design is already sketched out (in the lesson diagram). The process of weaving produces a pattern that all students recognize and, most importantly, feel a part of. The basic pattern is the diagram of decision pathways, which the students may alter as the verbal "weaving" process evolves.

Specific "Trade-Off" Teaching Techniques

- Start the class by clearly stating the purpose, namely, a focus on understanding the decision-making process with respect to solving everyday life-problems.

- Read the "story" aloud, and then summarize the problem situation as is presented in the lesson.

- Ask students to list major topics or issues for discussion at the beginning of class. This ensures that all ideas/issues can be covered and integrated where applicable. This list also serves as a basis to redirect the discussion when a blockage is reached.

- Every student should be called upon to make at least one comment per class. Keep track.

- Develop an exhaustive list of all *choice options*, calling upon the students until no others can be named. Write the options on the chalkboard.

- Have the students vote, by a show of hands, which options they would most likely consider. Write on the board the two *choice options* receiving the most votes. Note that most lessons are limited to two options the way the question is phrased, though some, especially the assessment and homework scenarios, can have many more possible options.

- Ask the students who voted for each of the respective options to raise their hands and initially call upon one that you think can articulate clearly both the positive and negative consequences for that option. As the class develops, ask other children to add in or to restate the discussion so as to provide them a basis "to gain confidence" in their classroom contribution, both in terms of style and substance.

- Ask questions that move the class across the levels, where appropriate, from *consequences* to *outcomes* to *goals* to *driving forces*. Be sure to ask for alternative opinions at each level. Write options presented at each level and, where necessary, seek consensus before moving to a higher level. Do this for all positive and negative poles.

- Redirect the conversation when a student pursues a sideline or unrelated story that is not relevant to the goal of the discussion.

- Give direct or indirect signals when the discussion is moving in the right direction. A nod or smile, as nonverbal cues, are examples. Avoid direct verbal agreement. Try to stay neutral in "word." You are a questioner trying to bring the "truth" to the surface (much like Socrates).

- Reinforce with the students at the end of the session that understanding the *process* of decision-making is the issue, <u>not</u> what is right or wrong. Look for secondary answers in the discussion, if a student says the higher order reason is "right" or "wrong" based. Go back and re-ask the question, looking for another answer.

- Be sure to summarize all choice options imagined in terms of both positive and negative poles, then ask the students which pole is more important in terms of their own decision. Do this for both choice options, and summarize the students' responses on the chalkboard.

Trade-Off Discussion "Focus"

The primary reasons children make what we would consider "not-so-good" decisions are twofold. First, they do not consider the long-term outcomes of their choice options and, secondly, when they compare the defining outcomes or higher-level elements of the GOOD Decision Model, they perform a biased contrast. That is to say, they typically contrast the positive pole of the short-term option with the negative pole, or undesirable downside, of the longer-term outcome.

Knowing this key fact, your discussion should focus upon querying students as to which poles they considered, and drawing out the realization that when a more appropriate contrast is done, namely, between both positive poles, not-so-good decisions are avoided. (Education theorists would describe this teaching method as a dynamic blending of cognitive and affective learning modes.)

Remember, the key trade-off to be focused upon is the positive pole of both options. However, during the class, asking students which pole is the more important or more representative in terms of each option often provides an excellent framework for students' gaining an understanding as to why the positive pole contrast is the most appropriate.

Result

One valuable result of the Critical Thinking Skills curriculum experience is that students learn to listen to the views of their classmates while learning how to express themselves. And perhaps, they may learn to persuade others to consider another point of view. Ultimately, these methods result in the opportunity to gain confidence in one's own judgment.

A student receiving decision-making training in this way will develop [1] sureness and self-confidence resulting from his or her ability to analyze situations, and, [2] the ability to deal with new situations in our ever-changing environment.

In sum, LifeGoals teaches self-discipline, which is grounded in the fact that it is in one's own self-interest to evaluate one's choice options with respect to a longer-term perspective. This may be considered a form of "enlightened self-interest."

3b4a Curriculum Overview

During the second semester of third grade (3b) and the first semester of the fourth grade (4a), students will be introduced to the concept of *outcomes* of a *choice*. In addition, the concept of *"trade-off"*, *focusing on the positive outcome from each choice option*, will be introduced. *Trade-off*, involving the contrast of + poles for choice options, is central to developing good decision-making skills.

Students will continue to gain a greater understanding of the decision-making process, including *choice options, distinctions, consequences,* and *outcomes* through the use of personal scenarios. By the end of these semesters, students should have a complete understanding of a situation where a decision is being made, the *choice options* involved with that decision, and the *distinctions, consequences,* and *outcomes* corresponding to each *choice option*. Both the positive and negative decision pathways (causal implications to the outcome level) will be developed for each *choice option*.

Definitions:

*Choice Context*: A situation where a *choice* has to be made.

*Choice Options*: Alternatives or possibilities generated either internally or externally.

*Distinctions*: Key defining characteristics for the respective *choice options,* both positive and negative.

*Consequences*: The short-term or immediate results of the *choice options,* for both positive and negative *distinctions*.

*Outcomes:* Longer-term causal implications or results of the decisions made for each *consequence*, both positive and negative.

Lesson Plans:

The lessons represent examples of context scenarios or situations, the *choice options* involved, and the *distinctions, consequences,* and the *outcomes* of those *options*. These examples show a scenario (*choice context*) that students will likely encounter in their own lives. Each example gives the *choice options* for the situation and two possible pathways for each of the *options (+ and -)*.

Again, the step following the *choice option* on the decision-making pathway in the GOOD Decision Model is called a *distinction*. *Distinctions* are simply the labels for the *choice options*. *Consequences* are defined as short-term or immediate results of the *choice options*, while the longer-term implications are termed *outcomes*.

Teachers should incorporate these example pathways in the lessons or have the class come up with their own pathways. Interacting with your students in a questioning mode (see Teaching Method) is the most effective method of involving the class and getting them to practice the principles incorporated in the GOOD Decision Model.

Included is an example of a learning activity that can be used to help you facilitate and develop additional instructional ideas about teaching decision-making.

Learning Activity: Example

Tell students you will be introducing another step into the decision-making process. Ask anyone if they have ever heard of the word *outcome*. Discuss with students what an *outcome* means when making a *choice*, working through the steps of the GOOD Decision Model.

To illustrate the concept, have students think of *choices* they have made in the past week. Have them draw the pathways, both positive and negative, using the GOOD Decision Model describing the *choice* they made. The pathways should include the *choices, distinctions*, and *consequences*. Have the students chart and talk about their choices and their pathways.

As a class, come up with possible *outcomes* to each of the student's pathways. (Not every student has to come up in front of the class, but every student should be able to complete his or her own pathways.)

Additionally, have the students go home and interview their parents about some *choices* they have to make. Have them create pathways for their parents' decisions. All scenarios should include the *choice options, distinctions, consequences* and *outcomes*. If possible, have this parent-developed map as a homework assignment that can be presented to the class for discussion.

Trade-Off:

Another critical aspect introduced in the third grade is the concept of *trade-off* (3b), which is overviewed in detail in the Teaching Method section. Trade-off refers to two fundamental teaching steps. First, the student must be aware that there are positive and negative *consequences* for both *choice options*, which lead to longer-term implications, *outcomes*. These represent the decision logic or implicative pathways that connect the choice option to more personal potential long-term results, like goals. And, secondly, the appropriate (*trade-off*) contrast that should be used to select which course of action to take requires basing the decision on the positive poles for each *choice option*.

As is noted in the Teaching Methods section, *the reason children make not-so-good decisions is fundamentally twofold. First, they do not consider the longer-term outcomes of their choice options and, secondly, when they compare the potential future consequences/outcomes/goals, they perform a biased contrast. That is, children typically contrast the positive pole of the short-term option with the negative pole, or undesirable downside, of the longer-term option.* Teaching "trade-offs," then, is the key to developing good decision-making skills.

Lesson Plans: Example

Introducing the concept of trade-off, which is central to improving decision-making skills, can be best accomplished by having students in a homework assignment focus on a not-so-good or bad decision they have made. (Work through examples of not-so-good decisions in class before making the assignment.) Have the students (a) chart the positive and negative implications to the *outcome* level for each choice option, and (b) discuss the appropriate trade-off (both positive outcomes) and (c) have them explain why they think they made the not-so-good choice. This should provide the necessary focus to understand exactly why the trade-off concept is so important to good decision-making.

Curriculum 3b2 – Outcomes "Should You Talk To Strangers?"

Overview

This lesson will expand the student's concept of choice from short-term "consequences" to longer-term results called "outcomes." The concept of trade-off, by focusing on the positive outcome from each choice option, is also introduced. In this lesson, students will talk about a simple, "real life" scenario showing that a choice results in a consequence, which in turn results in an outcome.

Objectives

- The students will role play a "real life" scenario imagining a situation where they are approached by a stranger. This should serve as a "rehearsal" or practice for thinking through such a future situation.

- The students will explore the consequences, or short term, immediate results of the respective choice options, for both the positive (+) and negative (-) distinctions. Students will also learn of outcomes, or longer-term implications or results, both positive (+) and negative (-), of the decisions made for each consequence.

- The students will begin to understand the concept of "trade-off," and how by evaluating the appropriate "+" contrast at the outcome level of the choice options, yields better decision-making skills.

Materials

Balloon

Spring clip

Procedure - (A) Group Discussion

1. Teacher asks: Does anyone know what a choice is? What is a consequence? Allow students to respond. (If student response is not clear, teacher can demonstrate choice and consequence by taking a blown-up balloon from the desk and releasing the spring clip from the nozzle. The release of the nozzle end allows air to escape and the balloon flies around the room until all the air is released. It then settles gradually to the floor.)

The teacher explains: My choice of action caused what you just saw happen. If I hadn't touched the balloon, it would still have air in it and be sitting on this desk round and full and shiny. As it is, it is laying on the floor limp and dull and helpless to become anything else unless we choose to blow it up again.

Explain: First we had a choice to make. That choice caused a consequence and the result (what happened) is the outcome. Something happens as a result of our choice and consequence. (An interesting secondary discussion could be that the air escaping from the balloon "causes" it to move.)

2. Four key teaching concepts need be reinforced. First, we have a choice to make in a given situation. Second, each choice option must be named or labeled by the student. (These labels are termed distinctions in the GOOD Decision Model.) Third, the immediate result, or what will (likely) happen as a result of any given choice option is termed a consequence. (Each choice option has both positive and negative consequences associated with it.) Fourth, the (likely) longer-term results that follow from the consequences are outcomes.

3. Teacher announces s/he is going to tell a story that could happen any place, at any time, to anyone. Today it is happening to an 8-year old girl named Chelsea.

Lesson 3b2

Should You Talk to a Stranger?

Chelsea begs her mother to go to the store with her and promises not to wander off.

When they get to the store, Chelsea does wander off for a moment. When Chelsea is out of sight of her mother, a man approaches her looking for his "lost" puppy.

The man asks Chelsea to help him look for his puppy in the parking lot.

If you were Chelsea, what would be your choice?

Procedure - (B) Situation "Should You Talk To Strangers?"

Divide the class into cooperative learning groups (as many as are appropriate for the class) and give the groups one of the following two basic types of instructions.

1. <u>Role Playing Choice</u> -"Go with the stranger/help find puppy". Have students imagine this situation where a stranger has approached them. Role play, choosing to go with the man and help him find his puppy with possible outcomes.

<u>Role Playing Choice</u> - "Not going with the stranger/don't help find puppy." Have the students imagine this situation where a stranger has approached them. Role play, choosing not to talk to the stranger and going to tell her mother, and its possible outcomes.

Instruct the students to think about the "why" (the motives) that underlie both of these choices and incorporate these ideas into their role playing.

2. Story Web/GOOD Decision Model Mapping.

Discuss specific choices and the results or consequences of those choices. On the chalkboard or chart, write the following pluses (+) and minuses (-) using the GOOD Decision Model as a guide.

| Go with Stranger | Don't Go |
|---|---|
| - I'm going with the stranger | + I'm not going with a stranger |
| + He seems like a nice man | - He could hurt me |
| + I'll only be gone for a minute | - No one will know I'm gone |
| + I can help find the puppy | - I could be kidnapped and never be found |
| + Puppy could be hurt | - I could be hurt |
| - Puppy could be lost forever | - I could be lost forever |
| + Puppy has a better chance of being found | + I'll be safe |

3. "I'll be safe" could be the outcome (what happens) or the result of our choice and consequence. Teacher asks students what we should choose in this situation. Teacher then asks what choice would give the best outcome.

Procedure - (C) Discussion Steps

Have each of the groups review their work. Summarize the key concepts on the board.

- Ask students which choice they would make and have them write down their answers on a sheet of paper (INITIAL CHOICE). Do not ask for oral answers.

- Draw out the decision-making map, questioning the students at each phase. Start with the choice options, move to distinctions and then to consequences. Explain the concept of outcome again, and then ask the students "what outcome is likely to happen?" given the specific consequence. Seek consensus at each level before moving on.

Procedure - (D) Trade-off Contrast

Explain that you are now going to deal with the concept of trade-off.

- Ask the students which outcome was the most important in terms of them making their own decision. Have them write it down.
From the GOOD Decision Model, the four outcomes appear as:

Don't help man find his puppy in the parking lot.
(+) "I'll be safe"
(-) "I feel bad for the puppy"

Help man find his puppy in the parking lot.
(+) "I feel I've helped the lost puppy"
(-) "I could be kidnapped and never found"

- Then ask the students which outcome from the non-chosen choice option was the most important, that is, which one did they consider most in "contrasting" the non-chosen choice option. Have the student write down this answer as well. Explain, if necessary, that the concept of trade-off, or contrast, is ultimately the basis of all decision-making.

- Review the possible outcomes, and how they give meaning to their respective consequences. Then, have students indicate for each choice option which outcome (+ or -) was most representative and influential in defining that choice option. Record the poles, + or -, for their selected choice option, or PRIMARY, and for their non-chosen choice, or SECONDARY, in the chart detailed below.

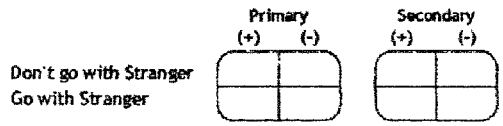

Note: Most students do not consider the long-term outcomes of their choice options, and secondly, when they compare the defining outcomes or higher level elements of the GOOD Decision model, they perform a biased contrast. That is to say, they typically contrast the positive pole (+) of the short term option, such as the puppy won't get hurt, with the negative pole (-), or undesirable downside, such as not helping the man and therefore the puppy could get into trouble. One of the fundamental goals of the LifeGoals curriculum is to teach students how to make this appropriate contrast.

- In the final part of the discussion, the focus should be on the positive (+) poles for each choice option, defining the appropriate contrast as the one between these poles.

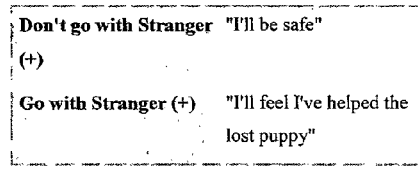

- After explaining the (+) outcome (Option A) vs. (+) outcome (from Option B) contrast, ask the students what choice they would make now.

Have them write their answer down (END CHOICE).

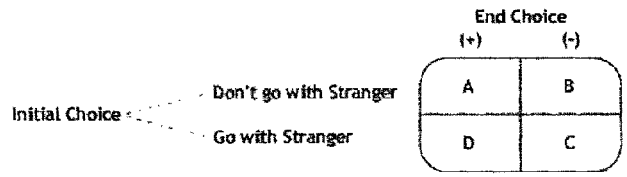

- The above chart allows the effect of the lesson to be assessed. For example, if the teacher first asks, "How many of you first wrote down your choice of DON'T GO?" then asks, "Now how many of you still choose DON'T GO?" it is possible to fill in the above number of students for cells a and b.

- If you then ask, "How many at the beginning of class chose GO WITH STRANGER, and now how many would still do that?" It is possible to fill in cell c, and then subtract to get the number in cell d.

- The number of children that the lesson positively affected is summarized in cell d. (Of course, cell b summarizes "reversals" which are extremely rare.)

Keeping track of these numbers and summarizing the lessons that have the most dramatic effect is of great interest. In particular, the reasons children give when you question them as to the "why?" they changed their minds is useful in terms of providing input for teacher training materials.

Reminder: The goal is to help children understand choice options, not what choice option to make.

Should You Talk to a Stranger?

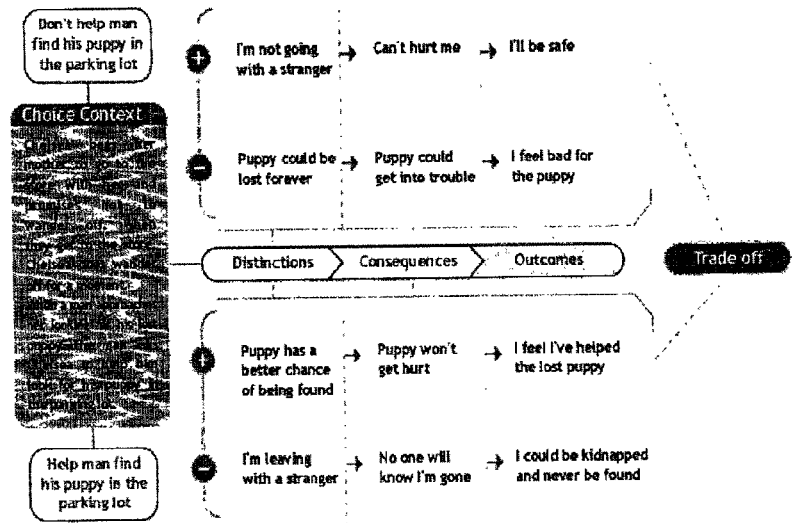

4b5a Curriculum Overview

During the second semester of the fourth grade (4b) and the first semester of fifth grade (5a), students will be introduced to the concept of *goals* with respect to the *choices* they make. They will understand that decisions should be based on achieving *goals*, or said another way, that *goals* drive decision-making.

Students will continue to gain a greater understanding of the decision-making process, including *choice options, distinctions, consequences* and *outcomes* through the use of personal scenarios. They will also learn how to link an *outcome* with a personal *goal*, which becomes the guiding element of the decision-making process.

By the end of these semesters, students should have a complete understanding of a situation where a decision is being made, the *choice options* involved with that decision, and the *distinctions, consequences, outcomes,* and the relevant *goals* with respect to the *options* involved with the decision.

Definitions:

*Choice Context*: A situation where a *choice* has to be made.

*Choice Options*: Alternatives or possibilities generated either internally or externally.

*Distinctions*: Key defining characteristics or labels for the respective *choice options*, that are both positive and negative.

*Consequences*: The short-term or immediate results of the *choice options*, that are both positive and negative.

*Outcomes:* Longer-term implications or results of the decisions made, following from the positive and negative *consequences*.

*Goals*: Things you want to do or become. Essentially, the desired end-states toward which effort is directed. *Goals* are the reasons *outcomes* derive their importance.

Lesson Plans:

The lessons continue to use context scenarios to setup the decision situation. Outlined in the decision map are the most common *choice options*, the defining *distinctions, consequences,* and the *outcomes* of those *options*, considering both the positive and negative implications of each, and the *goals* they link to.

A great majority of these lessons contain a scenario (*choice context*) that students may encounter in their own lives. These are situations for which "rehearsals" may provide significant, beneficial impact should the student be confronted with a similar situation in the future in which s/he has to make a quick decision. Other options can be developed in class, since these simply represent the most likely options children of this age would consider.

Of course, teachers can incorporate these examples of decision pathways in their lessons or have their class come up with their own pathways. Included is an example of a learning activity that can be used to help develop alternative instructional approaches for teaching decision-making.

Learning Activity: Example

Discuss what a *goal* is with the students. Ask if any of them have made any *goals* for themselves. What are they doing to achieve that *goal*? Define *goals* with respect to decision-making.

Give examples of some *goals* from a noted sports person or business person from your community. Try to arrange a talk to your class from one of these persons about *goals*. After the talk, draw the decision-making pathways your speaker discussed. Fill in the concepts that may be unclear or unsaid from a discussion with the class.

Explain to the class that they are to go home and talk about *goals* with their parent(s). Their assignment is to come up with a *goal* that they have discussed with their parent(s) that can be monitored over the semester. List the *goals* on the board (not necessarily with the student's name). At the end of term, have the students that succeeded in reaching their *goal* map out their reasoning and explain how they did it.

Curriculum 5a2 – Goals "Should You Be Truthful Or Tell A Lie?"

Overview

This lesson will expand the student's concept of choice from short-term "consequences" to longer-term results called "outcomes" to the reasons outcomes are important to the individual, personal "goals." The concept of trade-off by focusing on the positive outcome and linking it to its relevant goal (for each choice option) is also introduced. In this lesson, students will talk about a simple, "real life" scenario showing that a choice results in a consequence, which in turn results in an outcome, which can be evaluated in terms of its ability to satisfy the most important goal for the individual. The ability of the choice option to satisfy the most important goal held by the individual becomes the basis for selecting the choice option.

Objectives

- The students will role play a "real life" scenario imagining a situation where they have to decide whether or not to be truthful. This should serve as a "rehearsal" or practice for thinking through such a situation that may occur in the future.

- The students will explore the consequences, or short term, immediate results of the respective choice options, for both the positive (+) and negative (-) distinctions. Students will also learn of outcomes, or longer-term implications or results, both positive (+) and negative (-), of the decisions made for each consequence. Outcomes will be used as a basis to uncover the personal goals of the students, which in turn will be evaluated to determine which choice option is in their best interest to select.

The students will continue to expand the concept of "tradeoff" and how choosing the appropriate contrast of the positive outcomes (linked to goals) of the choice options yields better decision-making skills.

Procedure - (A) Group Discussion

1. 1. Teacher asks: Does anyone know what a goal is? Obtain a list on the board from the class, along with the name of the student that mentioned it. Go down (some of) the list and ask students what specifically they do to achieve their goal. Work through a series of these responses, focusing on the outcomes they mention and how they are associated with their goal.

For example, goal...win the 400 meter school
   race
   outcome...increased endurance
   consequence...get in great
   shape 2. The teacher explains: My choices of action should be consistent with my goals, the outcomes that lead to them, and the consequences that lead to the outcomes. Draw out on the board for one of the goals, the outcome and consequence like it is above.

Ask the students what are examples of choices that could be affected by this goal of wanting to win the 400-meter race at school. Examples could include: "eating healthy vs. junk food," "whether to stay up and watch TV vs. going to bed," "whether to run every day after school vs. playing video games," or "whether to smoke vs. not smoking."

To summarize, goals determine our choices. And, thinking about our goals is a good way to help us make everyday decisions.

3. Four key teaching concepts need be reinforced. First, we have a choice to make in a given situation. Second, each choice option must be named or labeled by the student. (These labels are termed distinctions in the GOOD Decision Model.) Third, the immediate result, or what will (likely) happen as a result of any given choice option is termed a consequence. (Each choice option has both positive and negative consequences associated with it.) Fourth, the (likely) longer-term results that follow from the consequences are outcomes.

4. Teacher reads the story.

5  Lesson 5a2

Honesty: Should You Be Truthful or Tell a Lie?

Amber was one of the first students on the bus after school because she was very excited to play at Nellie's house. When Nellie got on the bus, Amber moved her bookbag so Nellie could sit with her. But once the bus got moving, Nellie told Amber that she couldn't have her over that afternoon because she remembered that she had chores to do. Nellie apologized and asked Amber if she could come over the next afternoon.

Amber was disappointed, but before she got off the bus, another friend, Tammy, asked her to play at her house. Amber's parents didn't want her to play with Tammy, but Amber went anyway.

*If you were Amber, what would be your choice?*

Procedure - (B) Situation "Should You Be Truthful Or Tell A Lie?"

Divide the class into cooperative learning groups (as many as are appropriate for the class) and give the groups one of the following two basic types of instructions.

1. Role Playing Choice - Tell mom the truth.

Have students imagine this situation where they are forced to choose truthfulness or lying. Role play, choosing to tell mom the truth, with possible outcomes.

Role Playing Choice - Lie to mom.

Have the students imagine this situation where they lie to their mom. Role play, lie to mom, and its possible outcomes.

Instruct the students to think about the "why" (the motives) that underlies both of these choices and incorporate these ideas into their role playing.

2. Story Web/GOOD Decision Model Mapping

Discuss specific choices and the results or consequences of those choices. On the chalkboard or chart, write the following pluses (+) and minuses (-) using the GOOD Decision Model as a guide.

| Tell Truth | Lie |
    |---|---|
    | - Parents will know I disobeyed | + They won't know I went |
    | + Didn't lie to mom | - I'm lying |
    | + Won't have to worry about getting caught | - Have to worry about getting caught |
    | + Did the right thing | - Didn't do the right thing |
    | - Might get punished | |
    | + Honesty | - No honesty |

3. "Honesty" could be the goal or the result of our choice, consequence, and outcome. Teacher asks students which goal is more important. Then the teacher asks which choice would give the best chance of achieving their goal.

Procedure - (C) Discussion Steps

- Have each of the groups review their work. Summarize the key concepts on the board.

- Ask students which choice they would make and have them write down their answers on a sheet of paper (INITIAL CHOICE). Do not ask for oral answers.

5
- Draw out the decision map questioning the students at each phase. Start with the choice options, move to distinctions, then to consequences. Explain the concept of outcomes again, and then ask the students "what outcome is likely to happen?" given the specific consequence. Seek consensus at each level before moving on to goals.

Procedure - (D) Trade-off Contrast

10   Explain that you are now going to deal with the concept of trade-off.

- Ask the students which goal was the most important in terms of them making their own decision. Have them write it down.

From the GOOD Decision Model, the four goals appear as:

| Tell Mom the truth | Tell Mom a lie |
|---|---|
| (+) "Honesty" | (+) "Fun" |
| (-) "No Fun" | (-) "No Honesty" |

15
- Then ask the students which goal from the non-chosen choice option was the most important, that is, which one did they consider most in "contrasting" the non-chosen choice option. Have the student write down this answer as well. (Explain, if necessary, the concept of trade-off, or contrast, is the basis of all decision-making, and how two concepts are compared to reach a decision).

20
- Review the possible goals, and how they give meaning to the respective outcomes. Then, have students indicate for each choice option which goal (+ or -) was most representative and influential in defining that choice option. Record the poles, + and -, for their selected choice option, or PRIMARY, and for their non-chosen choice, or SECONDARY, in the chart detailed below.

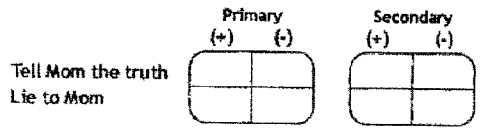

Note: Most students do not consider the long term outcomes of their choice options, and secondly, when they compare the defining outcomes or higher-level elements of the GOOD Decision Model, they perform a biased contrast. That is to say, they typically contrast the positive pole (+) of the short term option, such as, not getting punished, with the negative pole (-), or undesirable downside, such as, getting punished and losing privileges. One of the fundamental goals of the LifeGoals' curriculum is to teach students how to make this appropriate contrast.

- In the final part of the discussion, the focus should be on the positive (+) poles for each choice option, defining the appropriate contrast as the one between these poles.

Tell Mom the truth    (+)        "Honesty"
         Lie to Mome           (+)        "Fun"

- After explaining the (+) outcome (Option A) vs. (+) outcome (Option B) contrast with respect to the goals they satisfy, ask the students what choice they would make now. Have them write their answer down (END CHOICE). Now ask them how many changed, using the chart explained below. When completed, ask them to explain their answers, the reasons for their change or staying the same.

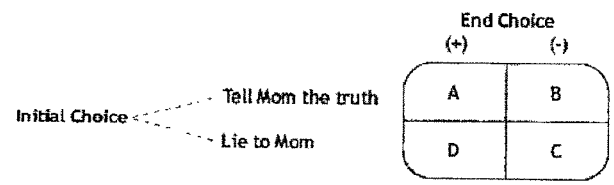

- The above chart allows the effects of the lesson to be assessed. For example, if the teacher first asks, "How many of you first wrote down your choice of TELL TRUTH?" then asks, "Now, how many of you still choose TELL TRUTH?" it is possible to fill in the above number of students for cells a and b.

- If you then ask, "How many at the beginning of class chose LIE, and now how many would still do that?" it is possible to fill in cell c, and then subtract to get the number in cell d.

The number of children that the lesson positively affected is summarized in cell d. (Of course, cell b summarizes "reversals" which are extremely rare.)

Keeping track of these numbers and summarizing the lessons that have the most dramatic effect is of great interest. In particular, the reasons children give when you question them as to the "why?" they changed their minds is useful in terms of providing input for teacher training materials.

Reminder: The goal is to help children understand choice options, not what choice option to make.

5b6a Curriculum Overview

During the second semester of fifth grade (5b) and the first semester of the sixth grade (6a), students will again be reviewing the entire GOOD Decision Model. They will begin with *choice options* and take it through *goals* up to *driving forces*, which are the reasons that *goals* are important.

Students will continue to gain a greater understanding of the decision-making process, including *choice options, distinctions, consequences, outcomes* and *goals*, through the use of personal scenarios. They will also learn how to link an *outcome* with a personal *goal*, which becomes the guiding element of the decision-making process. Then, they will learn the reasons underlying the selection of *goals*, namely, *driving forces*. As part of class discussion, students will explore their own *goals* and their own reasons as to why they have the *goals* they do.

Definitions:

*Choice Context*: A situation where a *choice* has to be made.

*Choice Options*: Alternatives or possibilities generated either internally or externally.

*Distinctions*: Key defining characteristics or labels for the respective *choice options*, both positive and negative.

*Consequences*: The short-term or immediate results of the *choice options*, for both positive and negative *distinctions*.

*Outcomes:* Longer-term causal implications or results of the decisions made for each consequence, both positive and negative.

*Goals*: The things people want to have or achieve. Essentially, *goals* are desired end-states toward which effort is directed. *Goals* are the reasons *outcomes* derive their importance.

*Driving Forces*: Each person's unique way of seeing him or her self that determines which *goals* are important to attain. (These *goals* are, of course, what drive the decision-making process).

Lesson Plans:

The lessons will continue to use context situations to setup each choice situation. Outlined in the decision map are the most common *choice options*, the defining *distinctions, consequences*, and the *outcomes* of those *options*. The decision pathways, both the positive and negative implication, are anchored by a personal *goal*.

A great majority of these lessons contain a scenario (*choice context*) that students may encounter in their own lives. These are situations for which "rehearsals" may provide significant, beneficial impact should the student be confronted with a similar situation in the future (in which they have to make a quick decision.) Each example lesson gives the *choice options* for the situation and two possible pathways for each of the *options*. Other options can be developed in class; these simply represent a more likely option children of this age would consider.

Of course, the teacher can incorporate these examples of decision pathways in their lessons or have their class come up with their own pathways. Included is an example of a learning activity that can be used to help the teacher facilitate ideas for their own methods of teaching about decision-making.

Learning Activity: Example

Review with the students the concept of making a choice. Talk with them about the definitions of *choice options, distinctions, consequences, outcomes, goals* and *driving forces*.

Ask students if they have ever written in a personal diary. Explain the idea of a diary and that it can be helpful, not only in expressing their feelings, but also for learning from the *choices* they make on a daily basis. Tell students that beginning today and for the rest of the semester, they will be keeping their own personal choices diary. The diary will consist of entries pertaining to personal experiences that involve decision-making. Each entry should tell about the situation and include all levels of the GOOD Decision Model, *choice options, distinctions, consequences, outcomes, goals* and *driving forces*.

Periodically, have students submit an entry from their diary. They should be graded on the thoroughness of the context and the completeness of GOOD Decision Model pathways. If the pathway does not go all the way to the *driving force* level, students should give a reason why the pathway ended where it did.

Curriculum 5b1 - Driving Force "Should You Respect the Privacy of Others?"
Overview

This lesson will continue to expand the student's concept of choice from short-term consequences to longer-term results called outcomes, to the reasons outcomes are important to the individual, called personal goals. The reasons underlying why individuals select or have the goals they do, namely, driving forces, are also explored.

The concept of trade-off, by focusing on competing outcomes and linking them to their respective goals (for each choice option), is also reviewed. In this lesson, students will talk about a simple, "real life" scenario showing that a choice results in a consequence, which in turn results in an outcome, which can be evaluated in terms of its ability to satisfy a personal goal of the individual. The ability of the choice option, then, to satisfy the most important goal held by the individual becomes the basis for selecting that respective choice option. Choice can be seen as driven by a contrasting or trading-off between competing goals.

Objectives

- The students will role play a "real life" scenario, imagining a situation where they have to decide whether or not to respect the privacy of others. This should serve as a "rehearsal" or practice for thinking through such a situation that may happen in their future.

- The students will again explore the consequences, or short-term, immediate results of the respective choice options, for both the positive (+) and negative (-) distinctions. Students will also continue to identify and reference outcomes, both positive (+) and negative (-), for each consequence. Outcomes will be used as a basis to uncover the personal goals of the individual, which in turn will be evaluated to determine which choice option, is in their best interest to select. Driving forces, the reasons goals have significance to each student, will also be explained to help the student understand the process of goal development and selection.

- The students will continue to expand the concept of "trade-off" and how choosing the appropriate contrast of the positive outcomes (linked to their respective goals) yields better decision-making skills.

Procedure - (A) Group Discussion

1. The concept of why goals are important is introduced.

What makes a goal important?

> Our goals define what is important to us, and goals give the prerequisite outcome its desirability / relative importance.

Why is achieving one goal over another more important to you?

> The goals that best help us achieve and/or define who we want to become (or be perceived as) are more important than other goals.

Do our goals define who we are?

Yes, because they determine what decisions we make, which directly determines who we become.

2. The four basic teaching concepts need be reinforced. First, we have a choice to make in a given situation. Second, each choice option has both positive and negative implications, termed distinctions. Third, the immediate result, or what will happen as a result of any given choice option is termed a consequence. Each choice option has both positive and negative consequences associated with it. Fourth, the likely longer-term results that follow from the consequences are outcomes.

3. Additionally, two more components of the GOOD Decision Model will be explained. First, outcomes derive their relative importance by their ability to satisfy higher-order goals. Secondly, there is a hierarchy of goals that is determined by their relative ability to provide the student the desired meaning to his/her life. These higher-order self-defining elements are termed driving forces.

For example, one can ask students what goal or goals are important to them, and then follow up their answer with the why question. That is, "why is that goal important to you?" To illustrate, if a student comes up with a primary goal "going to summer camp," the question is "why is that so important, or what does it mean for you?" "Fun" and "adventure" are certainly acceptable answers.

Another example may be the goal of becoming class president. Here the answers to the why question could range from "people will respect me" (i.e. status) to "I want to make a positive difference" (i.e. caring).

Having the goal of going to college may be driven by "opportunity" (i.e. achievement) or "wanting to take care of younger siblings" (i.e. caring).

These higher-order reasons or motives that make goals important are the driving forces. These can be seen to define who the student is, because it indirectly governs their decision-making processes.

4. Teacher reads the story.

Should You Respect The Privacy of Others?

Clint had been on the Internet for nearly an hour working on his science project. He had been to more than half a dozen web sites that offered pages and pages of information on volcanoes.

Clint was just about to log off from the Internet when he decided to check for any new e-mail messages. Clint had sent a few outgoing messages before digging into his research and he was curious if anyone had responded yet.

Sure enough, there was some new e-mail. But when Clint checked the sender's address, he saw that the message was for his big sister.

*If you were Clint, what would be your choice?*

Procedure - (B) Situation "Should You Respect The Privacy Of Others?"

Divide the class into cooperative learning groups (as many as are appropriate for the class) and give the groups one of the following two basic types of instructions.

5   1. Role Playing Choice - Open sister's e-mail.

Have students imagine this situation where they are faced with the situation of invading someone's privacy. Role play, choosing to invade your sister's privacy by opening the e-mail, with possible outcomes.

10

Role Playing Choice - Leave e-mail unopened.

Have the students imagine this situation where they respect their sister's privacy. Role play, choosing not to open the e-mail, and its possible outcomes.

Instruct the students to think about the "why" (the motives) that underlies both of these choices and incorporate these ideas into their role playing.

2. Story Web/GOOD Decision Model Mapping

Discuss specific choices and the results, or consequences, of those choices. On the chalkboard or chart, write the following pluses (+) and minuses (-) using the GOOD Decision Model as a guide.

| Leave e-mail alone | Open e-mail |
|---|---|
| - Can't find out sister's secret | + Find out sister's secret |
| + I respected her privacy | - Sister tells parents |
| + Did the right thing | - Get punished, grounded |
| - Can't hold it over her head | - No sibling trust |
| + Responsible (good person) | - No family relationship |
| + Self esteem | |

3. "Responsible (SELF ESTEEM)" could be the goal or the result of a choice, consequence and outcome. Teacher asks students which goal is more important, then the teacher asks which choice would give the best chance of achieving their goal.

Procedure - (C) Discussion Steps

Have each of the groups review their work. Summarize the key concepts on the board.

- Ask students which choice they would make and have them write down their answers on a sheet of paper (INITIAL CHOICE). Do not ask for oral answers.

- Draw out the decision map, questioning the students at each phase. Start with the choice options, move to distinctions, then to consequences. Ask the students "what outcome is likely to happen?" for the specific consequence. Again, seek consensus at each level before moving on to goals.

Procedure - (D) Trade-off Contrast

Explain that you are now going to deal with the concept of trade-off.

- Ask the students which goal was the most important in terms of them making their own decision. Have them write it down.

From the GOOD Decision Model diagram, the goals appear in lower case and the driving forces are encircled. To elaborate, "to act responsibly" is a goal that is important to the individual because of making one feel good about oneself, or, self esteem (driving force).

| Leave e-mail alone | Open e-mail |
|---|---|
| (+)"act responsible"..."SELF ESTEEM" | (+) "in control"..."POWER" |
| (-) "not in control"..."NO POWER" | (-) "no sibling trust"..."NO FAMILY RELATIONSHIP" |

- Then ask the students which goal from the non-chosen choice option was the most important. That is, which one did they consider most representative in "contrasting" their non-chosen choice option. Have the student write down this answer as well. (Explain, if necessary, that the concept of trade-off, or contrast, is the basis of all decision-making.)

- Review the possible goals, and how they give meaning to the respective outcomes. Then, have students indicate for each choice option which goal (+ or -) was most representative and influential in defining that choice option. Record the poles, + and -, for their selected choice option, or PRIMARY, and for their non-chosen choice, or SECONDARY, in the chart detailed below.

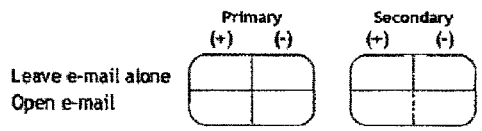

- In the final part of the discussion, the focus should be on the positive (+) poles for each choice option, defining the appropriate contrast as the one between these poles. Basically, students should first be focused on identifying the "+" aspects of each choice option, and then be asked, "which is better?".

Note: Most students do not consider the long-term outcomes or goals of their choice options, and secondly, when they compare the defining outcomes or higher-level elements of the GOOD Decision Model, they perform a biased contrast. That is to say, they typically contrast the positive pole (+) of the short-term option, such as being "find out secret," with the negative pole (-), or undesirable downside of their (initially) least preferred option, such as "can't hold a secret over my sister's head". One of the fundamental goals of the LifeGoals' curriculum is to teach students how to make the appropriate contrast.

The appropriate trade-off at the goal level is:

(be) "responsible" (+) vs. "in control" (+)

Discussion should be focused on this trade-off. Understanding the driving forces that serve to define these goals, seen below, may well be a major part of the discussion.

The corresponding driving forces are:

SELF ESTEEM (+) vs. POWER (+)

- After explaining the (+) outcome vs. (+) outcome contrast, with respect to the goals they satisfy, ask the students what choice they would make now. Have them write their answer down (END CHOICE).

- The previous chart allows the effect of the lesson to be assessed. For example, if the teacher first asks, "How many of you first wrote down your choice of LEAVE ALONE?" If the teacher then asks, "Now how many of you still choose LEAVE ALONE?" it is possible to fill in the above number of students for cells a and b.

- If I then ask, "How many at the beginning of class chose OPEN E-MAIL, and now how many would still do that?" it is possible to fill in cell c, and then subtract to get the number in cell d.

The number of children that the lesson positively affected is summarized in cell d. (Of course, cell b summarizes "reversals", which are extremely rare.)

Keeping track of these numbers and summarizing the lessons that have the most dramatic effect is of great interest. In particular, the reasons children give when questioned as to the "why?" they changed their minds is quite useful in terms of providing input for teacher training materials.

Reminder: The goal is to help children understand choice options, not what choice option to make.

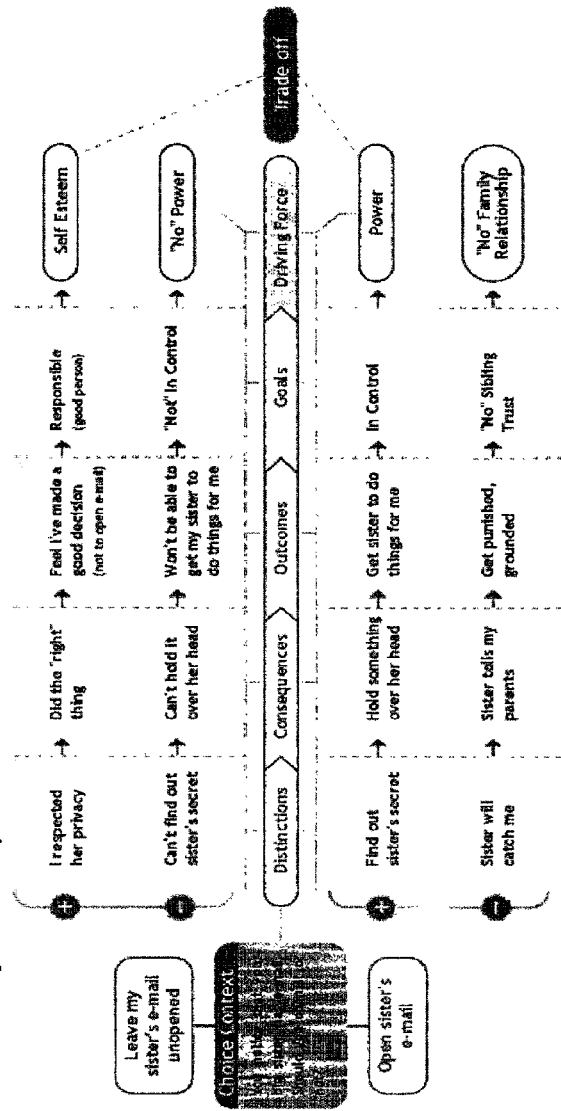

Assessment and Parental Involvement

(Grades 3 through 6)

Building a true educational community involves three parties: our children, their parents and the school. Involving the parents in the educational process means creating homework assignments that are a shared experience between the child and his/her parent(s). It also means creating a feedback loop from the school, represented by the teacher, directly to the parent(s) and the child. This principle of *"community"* must be at the heart of our efforts to develop productive, responsible citizens.

LifeGoals contains sets of homework assignments, appropriate by grade, which can be used to facilitate and foster decision-making skills in this three-party educational community. The assignments are constructed to present a relatively complex choice scenario, appropriate for the grade level, and the assignments ask the student three basic types of questions:

- What are the main *choice options* s/he would consider most?

- Specifically, what are the main *good* and *bad* things likely to result from each of his or her choice options?

- What option *would you choose* and, *why* would you make that choice (trying to get at the rationale underlying the decision-making process)?

Having the student review his or her homework "choice problem" with his or her parent(s) presents a unique opportunity to discuss relatively complex, real life decisions in a non-threatening, third person context, without direct emotional involvement that could alter the student's rational decision-making process. Not only does this present a very positive opportunity for the parent-child interaction; it also provides the opportunity for a meaningful dialogue, by working through *consequences* to longer-term *outcomes* to personal *goals*. Importantly, dealing with these real life choice scenarios offers the additional advantage of preparing the student for complex situations s/he will likely face at some future time.

In addition, the discussion of *goals* has proven to be an exceptionally valuable context in which to frame a discussion with one's children. Moreover, once *goals* are elicited, they present a further character-building opportunity, namely, to discuss the personal motivation or *driving*

*force* which underlie each *goal*. That is, asking the child "why?" the *goal* is important to them. Indeed, this type of decision-making homework exercise, resulting in the designation of the higher order *goals* and their *driving forces*, provides a sound basis for complementary teacher-parent discussion as well.

Assessing the thinking process, essentially focusing on the depth of thinking and reasoning ability, of individual students becomes the educational component of the homework exercise, and presents significant classroom opportunities for student discussion and learning.

Homework Assessment Overview.

Each semester, a student will have three homework assignments, one each from the Home, School and Community contexts. These homework assignments are not intended for letter grading indicative of simple right and wrong. These homework assignments, however, are intended to be assessed and commented upon by the teacher as if they were a writing assignment. The focus of these comments should be directed toward the depth (levels) of the thought process and the completeness of the "causal decision logic" exhibited. (Click here to view a completed assessment form)

Decision-Making Ability Assessment.

Parallel forms of the three choice scenarios (Home, School and Community) are to be administered at the end of each semester. The three in-class assessment scenarios will each require approximately 15 to 20 minutes for the class to complete. Identical to the homework assignments, evaluation of the in-class assessment will focus on the "decision-process" and not a simple right or wrong answer. Review and classroom discussion of each homework and assessment exercise offers a significant opportunity for student interaction and learning. Classroom time needs to be allocated for review and discussion in order to capitalize on this key group learning opportunity.

LifeGoals Assessment Review.

As detailed earlier, teachers will perform a general assessment of each student's decision-making performance with respect to each scenario using five straight forward summary measures. (The complete set of the 14 assessment measures is presented, but only a few are intended for the teacher to utilize. The remaining measures are intended to be used by measurement specialists and psychologists interested in gaining a more in-depth understanding of decision-making processes.)

Summary.

The combination of homework assignments and decision-making concepts used in the LifeGoals curriculum offers a very consistent and comprehensive approach to assessing student progress in developing critical decision-making skills. First, the ability *to involve all members of the educational community* with a common framework for choice behavior discussion is invaluable. Second, the *ability to understand and assess the decision-making ability of individual students*, where complex value-laden trade-offs are involved, offers a very unique assessment opportunity for teachers. And third, *the ability to use the results of these assessments for early-warning purposes*, working toward possible intervention work by teachers and social service professionals, offers another fruitful opportunity. Indeed, the implications of being able to assess the decision-making ability of children present significant opportunities. These opportunities translate into more refined methods of understanding the development of gender, socio-economic and race-sensitive approaches to teaching decision-making skills.

The Assessment Instrument (Grades 3-6)

Assessing the choice processes of children involves understanding the respective components and their interrelationships within the decision-making process. The following four directives define the fundamental basis of the LifeGoals decision-making assessment methodology.

1. Assessing the choice process that children go through must involve *real life situations* that the children can readily identify with. The three primary contextual environments are Home, School, and Community. The social context of each situation defines the *"relational basis"* to the participants within the real life context. For example, the participants could be parents, siblings, friends and/or peers. By using these meaningful relationships in the student's life and using a situation that pits one against another in some way, effectively offers a direct basis for tapping into and contrasting the higher order *goals* or *driving forces* that drive choice behavior.

2. Being able to *articulate the LifeGoals "decision-making process model"* for each *choice option*, from *consequence* to *outcome* to *goal* to *driving force*, is a second key component area of assessment. These are the Measures that will summarize each student's decision-making ability.

3. Understanding that the true basis of *choice is driven by the tradeoff, or "contrasting"* the higher-order personal motives. That is, the personal evaluation of *choice options* is in reality a function of the simple trade-off between conflicting *goals*. (This perspective stands in stark contrast to the fact that lower level, of-the-moment payoffs or rewards, including avoidance of short-term, negative consequences drive almost all choices for young children.) Assessing the ability of the student to identify these higher order elements (*consequences* to *outcomes* to *goals* to *driving forces*) is the key element to scoring the depth of thinking of a child.

4. It is seen as limiting to ask, "what *should* you do," in that knowledge of what is a correct action is seen as a necessary, but not sufficient, condition of character. The issue of the decision-making component of character development involves behavior, meaning the assessment component *must query the conative element of intent to act or behave*, namely, "what *would* you do" in this situation.

The Assessment Instrument: Key Process Areas

[0] Scenario - presents choice context in a three short paragraphs format.

[1] Options - asks the student for the two most likely choice options the scenario creates.

[2] Consequences - asks the student to discuss both the positive and negative results of each of his/her choice options.

[3] Outcomes/Goals - asks the student to discuss the longer-term implications of the consequences, which is where outcomes and goals should be discussed.

[4] Choice Option - determines what choice option s/he "would" select.

[5] Rationale - asks the student for the basis of his/her choice, by providing him/her the opportunity to discuss the "tradeoff" between competing goals or driving forces.

Basic Design Template
[0] Scenario

102

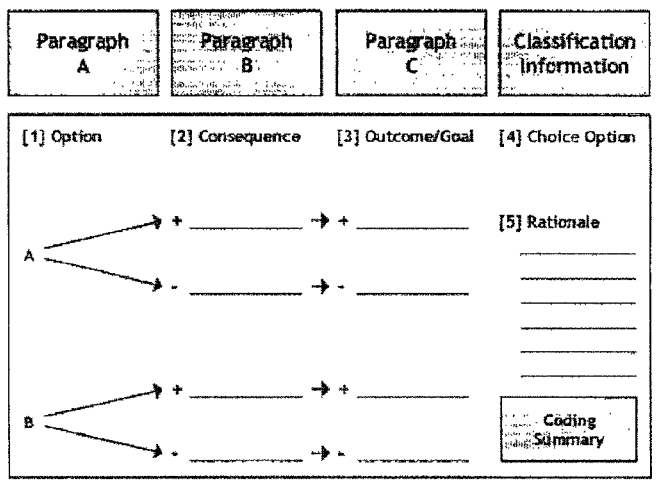

[0] Scenario Examples and Their Grade Appropriateness

The "scenarios" are context-coded "H" "S" and "C" (for Home, School and Community). Appropriate grade levels (34, 45, and 56) are also coded accordingly. For example, 34 corresponds to 3rd and 4th grade. Which scenarios are to be used for homework or for final assessment are to be determined by each teacher. Listed below are the scenarios by grade level.

Grades

| 34 | 45 | 56 |
|---|---|---|
| H | | |
| 1. Friends Bring Guns Over | 1. My Brother's Surprise | 1. Drinking at a Party |
| 2. Tell Truth About Bad Behavior? | 2. Getting Even with a Teacher | 2. Miss School to Complete Work |
| 3. Neighbor's Antenna | 3. The Short Loan | 3. Watch your Baby Sister |
| 4. Older Sister's Boyfriend | 4. Cousin Pat Visits | 4. Witness Parental Abuse |

|   |                              |                              |                              |
|---|------------------------------|------------------------------|------------------------------|
| S | 1. The Bully's Wallet        | 1. The "Open-Book" Situation | 1. Witness Plagiarism        |
|   | 2. One More Game             | 2. New Kid in School         | 2. Witness Stealing          |
|   | 3. Early Look at the Test    | 3. School Honor Code         | 3. Accused of Cheating       |
|   | 4. Birthday Party Invitation | 4. Locker Surprise           | 4. Vandalism: Punish a Few or All? |
| C | 1. Reject Mentally Challenged | 1. The "Short Lunch"        | 1. Witness Automobile Accident |
|   | 2. See Friend Who Causes Accident | 2. First "Birthday" Overnighter | 2. Witness Shoplifting  |
|   | 3. Overhear Conversation about Graffiti | 3. The Movie Theater | 3. Blamed for Stealing     |
|   | 4. Make Up Story About Someone | 4. Sheila is Missing School | 4. Opportunity to Steal    |

The Assessment Instrument: Key Process Areas (cont'd)

The following represents the assessment scenario "The Short Loan," with example responses and scoring. (Click here to view a completed assessment form)

[0] Situation: Scenario H-45-3

*Jean desperately wants to buy the latest CD by her favorite group, but she doesn't have enough money. She needs two more dollars.*

*She asks her parents for an advance on her allowance, but they say no. She will have to wait until the Saturday after next. Jean asks her sister for a loan until she receives her allowance, but her sister says, "no way."*

*Jean knows where her little sister has her money hidden in her room. Jean only needs the money for a little more than a week.*

5     If you were Jean...

Teacher Notes: Read the scenario aloud in class. Write on the board, *"What would you do if you were Jean?"* (use main character's name in each particular scenario). Discuss any questions the students may have regarding the story. Keep
10    in mind, it is hard for children to comprehend that there is not an automatic right answer.

[1] Options: What are the two main Choice Options (A and B) you would think of doing here? *(This measures the student's ability to determine and select "reasonable" options. This is not directly part of the process coding, but will serve as a key discussion and learning area for*
15   *the student. However, a summary analysis of the options students choose may well be key information for descriptive purposes.)*

Teacher Notes: Have the children think about what they would do if they were Jean (or the main character of a particular story). Ask them to write down two choices that they would most consider, in the areas marked Choice Option A and
20    Choice Option B.

[2] What is the most likely GOOD (+) thing or result and BAD (-) thing or result for each of your Choice Options? *(This is intended to reveal the relevant consequences for each choice option.* This two-part question is to be answered twice - once for each choice option created by the student*)*

25    Teacher Notes: Have the students read their first choice option (A) and think about what good result would come from that choice. Have them write their answer next to the [+] sign. Next, have them think about what bad result could or would come from that choice. Write that answer next to the [-] sign. Repeat this process for Choice Option B.

30   [3] What is the likely future end-result and why is that important to you, for each of your

GOOD (+) and BAD (-) results? *(This is intended to get at the outcomes and goals components of the model for each option. This two-part question is to be answered twice - once for each choice option created by the student)*

Teacher Notes: First, have them look at the good result from question [2] in Choice Option A. Ask them to think about what could happen later on or in the future from this result, and have the students write their answer under question (3) next to the (+) sign. Next, have your students read the bad result from question (2) in Choice Option A. Again, ask them to think about what could happen later on or in the future from this result. They should write their answer under question (3) next to the (-) sign. The idea here is to move the students toward thinking about the long-term, or their own personal goals. Repeat this process for Choice Option B.

[4] What would you do? Which Choice Option, A or B, would you do? *(The distinction here is the conative or behavioral intent component rather than the "should" phraseology. The question "should" simply asks if the student knows what is right. The "would" question factors in real life social situations, like peer pressure, which better reflects the real life decision-making environment.)*

Teacher Notes: Have the students write down their choice in the space provided.

[5] What did you consider most important [either GOOD (+) or BAD (-) ] for each of your two choice options? *(Circle either (+) or (-) for each choice option in question [3])* And, what was the main reason(s) behind your choice of A or B? *(This essay-type question is directed toward understanding to what degree the students can articulate the higher level driving forces that underlie their respective personal goals, and to assess if they can articulate the tradeoff concept between these re-defined "real" drivers of choice behavior.)*

Teacher Notes: Here is where you want to find out which answer, either positive (+) or negative (-), is most important to the student for each particular option. Make sure the student circles only one answer for each choice option. Next, have them explain in the spaces below question [5] why they chose one option over the other (i.e. A over B).

Instructions for Coding

There are a total of fourteen measures, as indicated on the following pages, which could be coded for every assessment scenario. However, as noted previously, only five are of interest to the teacher. These will be highlighted. (Click here to view a completed assessment form)

The following design template shows where each of the codes are located.

[0] Scenario (1S)

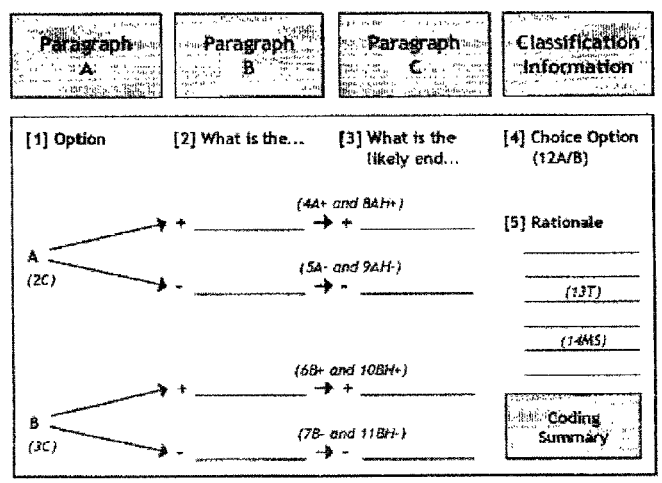

The "Coding Summary" section has places for the 14 codes.

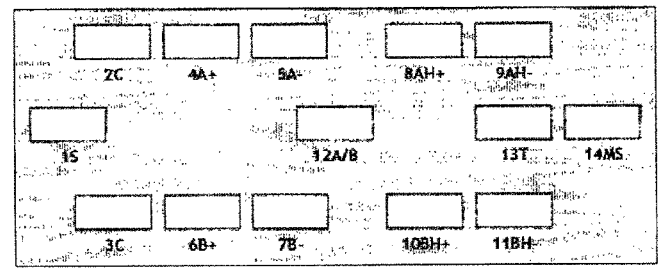

Instructions for Coding (cont'd)

Section: [0] - Measure: 1S

Step 1: Read the title of the sheet and find the number next to the title.

For the scenario "The Short Loan" the code is H-45-3. Go to the Coding Summary and fill in "H-45-3" on the line above 1S.

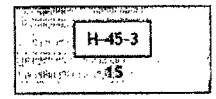

Section: [1] - Measures: 2C, 3C

| Home-45-3 : Choice Options | |
|---|---|
| Code | "The Short Loan" |
| 1 | Wait until I have the money |
| 2 | Take the money from my little sister / pay her back later. |
| 3 | Do something extra to raise money. |
| 4 | Sell something to raise money |
| 5 | Ask someone else for the money |
| 6 | Look in other stores and find the CD on sale so you can buy it immediately. |

Measures 2C and 3C are the codes for the two most relevant Choice Options (A and B) developed by the student. Codes will be obtained from a pre-determined list, which you will find for each assessment item, entitled "The Scenario Key."

Step 2: Read Choice Option A from the student's sheet and find which choice option it corresponds to from the Scenario Key.

On Andy's sheet, his Choice Option A is: "Take the money from his little sister." If you look below on the Scenario Key for "The Short Loan," you will see that Andy's response corresponds to Code # 2.

Thus, fill in "2" on the line above 2C. 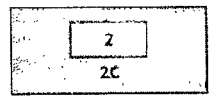

Step 3: Read Choice Option B from the student's sheet and find which choice option it corresponds to from the Scenario Key.

On Andy's sheet, his Choice Option B is: "Just wait for next Saturday after that." When you look on the Scenario Key, you will see that Andy's response corresponds to Code # 1.

Thus, fill in "1" on the line above 3C. 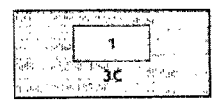

This is what your Coding Summary should look like thus far:

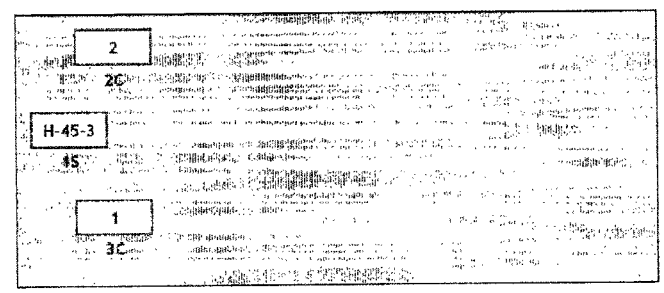

Note:

- There might be a time when you read a student's Choice Option and his/her response is not on the Scenario Key. When this happens, just add a new code - continue to the next number (in this case, the next number would be an "7") and fill in the choice option response.

Instructions for Coding (cont'd)

Sections: [2,3] - Measures: 4A+, 5A-, 6B+, 7B-, 8AH+, 9AH-, 10BH+, 11BH-

Measures 4A+, 5A-, 6B+, and 7B- represent codes of the decision chains for each respective option (A and B). These correspond to the positive and negative decision chains for each choice option. [*These are all the teacher requires to assess the depth of decision-making skills.*]

Measures 8AH+, 9AH-, 10BH+, and 11BH- refer to the codes for the highest level

109 reached for each decision chain. [*These are meaningful with respect to understanding the reasons underlying decision-making.*]

Note: the positive chains for Choice Option A are 4A+ and 8AH+, while the negative chains are 5A- and 9AH-. The positive chains for Choice Option B are 6B+ and 10BH+, and the negative chains are 7B- and 11BH-. Each of these measures, and their interrelationships, will be explained in detail as we go on.

A decision chain is formed from the answers given to questions (2) and (3) in the assessment.

2. What is the most likely GOOD (-) thing or result and BAD (-) thing or result for each of your Choice Options?

3. What is the likely future end-result and why is that important to you, for each of your GOOD (+) and BAD(-) results?

*Within the student's answers to each question, a decision chain can be formed and coded. A chain will show the highest level reached followed by the number of distinct levels discussed. Numbers corresponding to each distinct level are as follows:*

| | |
|---|---|
| 1="C" - consequences | 3="G" - goal |
| 2="O" - outcome | 4="D" - driving force |

[Highest level discussed: 1=consequence, 2=outcome, 3=goal, 4=driving force]. [# of levels mentioned]

*So, for example, a chain number of "3.2" would mean that the highest level discussed for that decision chain was level 3 (goal), and a total of 2 distinct concept levels were discussed. A "0", then, would reflect no explanation beyond the simple choice option. The range of scores for these Measures will be from 0.0 to 4.4.*

You will obtain codes from the following list:

| | |
|---|---|
| Gs1 social acceptance | De1 belonging |

110

|  |  |
|---|---|
|  | De2 power |
| Gs2 friendship |  |
|  | De3 parental relationship |
| Gs3 social status |  |
| Gf1 make parents proud | De4 family relationship |
| Gf2 sibling trust | Di1 self esteem |
| Gf3 parental trust | Di2 personal security |
| Gt1 responsible |  |
| Gt2 accomplishment | Di3 personal enjoyment |
| Gt3 confidence | Di4 quality of life |
| Gt4 self identity | Di5 peace of mind |
| Gt5 integrity | Di6 independence |
| Gt6 caring |  |
| Gt7 honesty/trust |  |
| Gt8 in control |  |
| Gp1 personal safety |  |
| Gp2 stay healthy |  |

111

> Gp3 avoid pain
> (physical)
>
> Ge1 fun/happy

Consequences and Outcomes levels will simply be coded as "C" and "O".

FYI: The goal codes are designated by two letters, the "G" for *goal* and either "s", "f", "t", "p", or "e" the sub-codes for social, family, trait, physical and enjoyment, respectively, and the number corresponding to the individual code within that group. For example, Gs1 represents the G or *goal* level, with s for the social sub-code, and the specific code of 1, which corresponds to "social acceptance."

"D" designates the driving force codes and either "e" or "i" corresponding to externally or internally oriented, respectively. For example, De1 represents D for *driving force*, e for externally oriented, and the specific code of 1 which corresponds to "belonging."

Now let's return to filling in the Coding Summary.

Step 4: Read the positive (+) response to question (2) for Choice Option A on the student's sheet.

On Andy's sheet, his (+) response is: "Getting the CD earlier." Since this is a consequence of his taking the money from his little sister, you would code this as "C".

Write "C" *underneath* 4A+ on your Coding Summary.

Step 5: Read the student's (+) response to question (3) "What is the most likely future end-result and why is that important to you?"

On Andy's sheet, his (+) response to the good result is: "If I were her I would already have the money." Since this is just Andy's personal opinion, and not another consequence of stealing his sister's money, or an outcome, goal or driving force, you cannot code this response!

Now, write "∅" underneath 4A+.

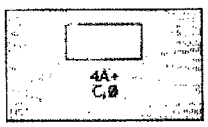

So, from the positive points of Choice Option A, Andy only has one consequence "C".

*When you create the chain to input over 4A+, you will code the highest level discussed in this chain (level 1 - consequence). Next, you will count the total number of distinct levels discussed. In this case, there was only one level discussed ("C"), so your chain code would be "1.1"*

*Write "1.1" over 4A+.*

Now, find the code of the highest level for the chain you just coded. In Andy's case, the highest level discussed was a consequence, so the code is "C."

Write "C" over 8AH+.

Your Coding Summary should now look like this:

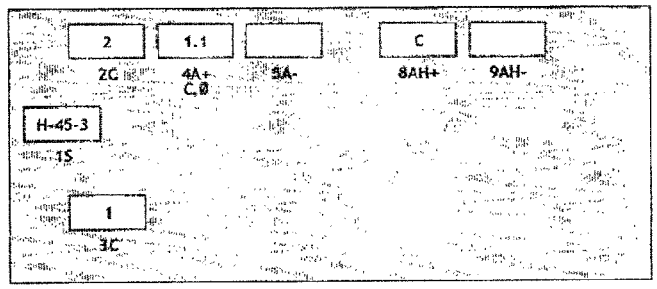

Step 6: Read the negative (-) response on the student's sheet for Choice Option A

On Andy's sheet, his (-) response is: "Being a thief to your family." Since this a negative consequence of his taking the money from his little sister, you would code this as a "C."

113

Write "C" *underneath* 5A- on your Coding Summary. 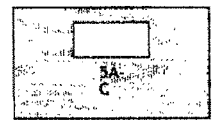

Step 7: Read the student's (-) response to "What is the most likely future end-result and why is that important to you?"

On Andy's sheet, his (-) response to the bad result is: "I would not want to get in trouble for stealing." Since this an outcome of being a thief and stealing from his sister, you would code this as an outcome "O".

Write "O" *underneath* 5A-. 

So, from the negative points of Choice Option A, Andy has one outcome "O" and one consequence "C".

*When you create your chain to input over 5A-, you will again code the highest level discussed in this chain (level 2 - outcome). Then, you will count the total number of distinct levels discussed. In this case, there were two levels discussed (O, C), so your chain code will be "2.2"*

*Write "2.2" over 5A-.* 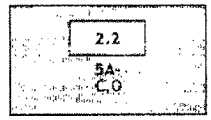

Now, find the highest code of the highest level for the chain you just coded. In Andy's case, the highest level discussed was an outcome, so the code is "O".

Write "O" over 9AH-. 

Your Coding Summary should now look like this:

Instructions for Coding (cont'd)

Now you will repeat the same steps for Choice Option B.

Step 8: Read the positive (+) response to question (2) for Choice Option B on the student's sheet.

On Andy's sheet, his positive (+) response is: "Not being a thief to your family." Since this is a positive consequence of waiting for next Saturday to get his allowance, you would code this as "C."

Write "C" *underneath* 6B+ on your Coding Summary.

Step 9: Read the student's (+) response to "What is the likely future end-result and why is that important to you?"

On Andy's sheet, his (+) response to the good result is: "I would be happy to not be a thief." At first glance, this could appear to be an outcome. However, Andy is saying that he would be happy with himself if he was not a thief. So, go find the list of codes for goals and driving forces. When you read down the list of goals, you will come upon Gt4, "self identity." "Self identity" corresponds to feeling good or feeling bad about oneself. Since Andy is feeling good about himself for not being a thief, you would code this response as "Gt4".

Write "Gt4" underneath 6B+.

So, from the positive points of Choice Option B, Andy has one goal (Gt4) and one consequence.

*When you create this chain to input over 6B+, you will code the highest level discussed in this chain (level 3 - goal). Then, you will count the total number of distinct levels discussed. In this case, there were two levels discussed (Gt4, C), so your chain code will be "3.2".*

*Write "3.2" over 6B+.* 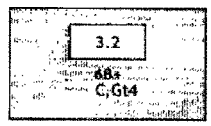

5  Now, find the code of the highest level for the chain you just coded. In Andy's case, the highest level discussed was the goal "self identity," so the code is Gt4.

Write "Gt4" over 10BH+. 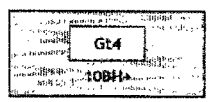

Your Coding Summary should now look like this:

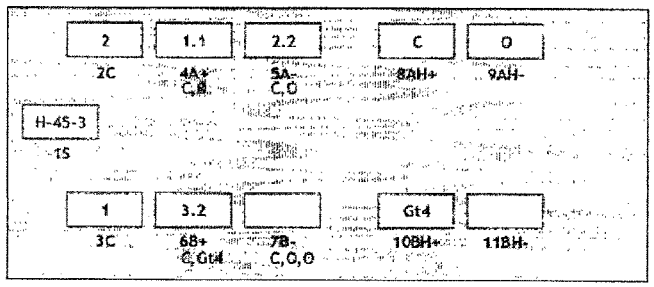

Step 10: Read the negative (-) response to Choice Option B on the student's sheet.

10  On Andy's sheet, his (-) response is: "Can't get the CD now. The store could be sold out by next week" His answer includes both a consequence "can't get CD now" and an outcome "store could be sold out next week". So, you would code "C" and "O."

Write "C" and "O" underneath 7B-. 

Step 11: Read the student's (-) response to "what is the likely future end-result and why is that important to you?"

On Andy's sheet, his (-) response to the bad result is: "Can't memorize my favorite song on CD". This response is an outcome of not being able to get the CD right away.

Write "O" underneath 7B-. 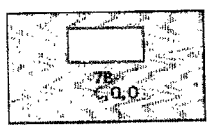

So, from the negative points of Choice Option B, Andy has one consequence, and two outcomes.

*In order to create your chain to input over 7B-, code the highest level discussed in this chain (level 2 - outcome). Then, count the total number of distinct levels discussed. Remember, even though there were two different outcomes mentioned, they are considered only one level. Therefore, in this case, there were two levels discussed (C and O), so your chain will be "2.2"*

Write "2.2" over 7B-. 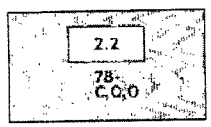

Now, find the highest code of the highest level for the chain you just coded. In Andy's case, the highest level discussed was an outcome.

Write "O" over 11BH-. 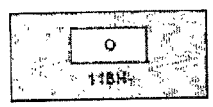

Your Coding Summary should now look like this:

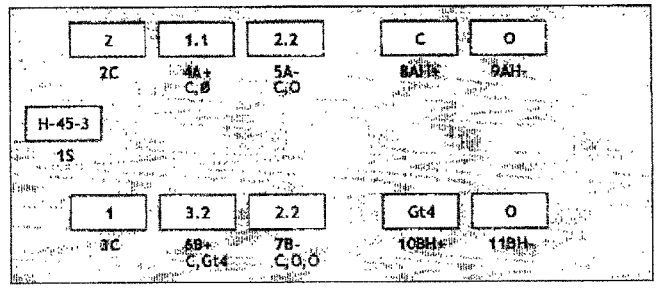

Okay, the coding is almost completed!

Instructions for Coding (cont'd)

Section: [4] - Measure 12A/B

Measure 12A/B refers to which Choice Option the student would choose, A or B. It will also include which response, either positive or negative, the student felt was most important for each choice option.

When coding, you first write down the Choice Option A or B picked by the student. Next, put down a (+) or (-), whichever response the student circled for that option. Finally, write down the response (+) or (-), the student circled for the option they did *not* choose.

Step 12: Go to Section [4] and read which Choice Option, A or B, the student chose.

In Andy's case, he picked Choice Option B. Next, look under question 3 to see which response (positive or negative) he chose for Choice Option B. In this case, he circled the positive response (+). For Choice Option A Andy circled the negative response (-).

Write "B+ -" above 12A/B. 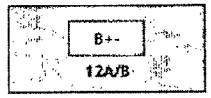

Section: [5] - Measures 13T and 14MS

Measure 14MS is an orientation index (Moral vs. "Self") as to the orientation of the student's choice. In other words, is the student basing his or her decision more about what is best for themselves, or what s/he believe the right and moral thing to do in this situation.

- Self is scored as a -1.0
- The "right thing to do" is +1.0.

- No reason is a 0.

Range of scores is from -1.0 to +1.0.

*Measure 13T refers to the "why" code of the Tradeoff. [This measure is important because it reflects the ability of the student to apply the "trade-off" method, which is key to making good decisions.]*

- *If the positive chains for both options are contrasted [(4A+, 8AH+) vs. (6B+, 10BH+)], then you will give the student a score of "3"*

- *If elements from both chains (not both positive) are discussed, then you will give the student a score of "2"*

- *If only one chain is discussed, then you will give the student a score of "1"*

- *When there is no comprehensive rationale for the choice expressed, you will give the student a "0"*

*The range of scores is 0-3.*

Notes:

- With regards to both Measures 14MS and 13T, you cannot give a student a ".5" or a "2.75". You may only score 14MS as -1.0, 0, or +1.0. You may only score 13T as 0, 1, 2, or 3.

- Although it appears that you should code 13T first and 14MS last, it is actually easier to code 14MS first.

Step 13: Read the student's answer to as why s/he chose that Choice Option.

In Andy's case, he chose Choice Option B because:

*"I would choose that option because I really don't believe in stealing from anyone. The main reason behind my choice was I don't really want to be a thief period / at all or even for the rest of my life!"*

Andy chose Choice Option B (to wait until next Saturday to get his allowance and then buy the CD) instead of Choice Option A (to steal his sister's money and get the CD earlier) because he doesn't believe in stealing and doesn't want to be a thief. In sum, Andy wants to "do the right thing". Thus, you would score Andy's response as "+1.0"

Write "+1.0" over 14MS.

Now, reread Andy's answer to why he chose Choice Option B.

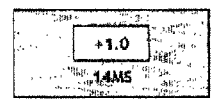

- Does he contrast the positive chains ("getting the CD earlier" vs. "not being a thief in your family")?

No, so you would not code 13T as a "3".

- Does he discuss elements from both chains ("getting the CD earlier" vs. "waiting to get the CD") OR ("being a thief to your family" vs. "not being a thief to your family")?

Yes - Andy says that, "I don't really want to be a thief period . . . for the rest of my life!" Since Andy did discuss elements from both chains (but not both positive), you will code 13T as a "2".

*Write "2" above 13T.*

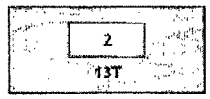

Notes:

- *If Andy had only said, "I would choose B because I don't believe in stealing from anyone, even though I could have gotten the CD earlier, I feel better not being a thief", he would have been discussing both positive chains. Then, you would have coded 13T as a "3".*

- *If Andy had only said, "I would choose B because I don't believe in stealing from anyone," that only discusses elements from one chain. Then, you would have coded 13T as a "1".*

- *If Andy had only said, "I would choose B because it's better," he really isn't discussing either of the chains, so you would have coded 13T as a "0".*

Your coding summary is now complete!
It should look like this:

[coding summary diagram showing boxes with values: 2, 1.1, 2.2, C, 0; 2C, 4A+, 5A-, 8AH+, 9AH-; C,0, C,0; H-45-3, B+-, 2, +1.0; 1S, 12A/B, 13T, 14MS; 1, 3.2, 2.2, Gt4, 0; 3C, 6B+, 7B-, 10BH+, 11BH-; C,Gt4, C,0,0]

Summary

As you can see, building a measurement model for assessing the depth of decision-making ability is a fairly involving task. The following framing questions have been answered.

- What are the main *choice options* s/he would consider most?

o This is simply done by asking the student for his/her two "most considered" options for a given scenario.

- Specifically, what are the main *good* and *bad* things likely to result from each of his or her choice options?

o This is obtained from a series of two questions focused on understanding the ability of the student to translate his/her individual choice option to *consequences* to *outcomes* to personal *goals*, for both the positive and negative aspects of each.

- What option *would you choose* and, *why* would you make that choice (trying to get at the rationale underlying the decision-making process).

o The student's selection must necessarily involve defining and contrasting elements of each choice option. Asking for their rationale for choosing one option over the other gets at this, as well as providing the basis to assess if the appropriate + poles for each option are the basis of the tradeoff contrast.

The good news is that for the teacher, the basic assessment issues are, for each decision chain, (a) how many levels did the student use and what was the highest level reached? and (b) how sophisticated was the student's "trade-off" rationale? Understanding how to score these involves a little practice. Once the scores are developed, however, they serve as the basis for the written evaluation given to the student.

Using this assessment system, the teacher can determine the level of thinking achieved by each student, and this can be compared to the level of the GOOD Decision Model that the teacher is focusing upon in his/her lessons. As such, the teacher has the ability to directly assess his/her own effectiveness in communicating the Model.

Worthy of note in passing is the fact that elementary age students without the LifeGoals curriculum, regardless of grade, do not usually go beyond the *consequence* level when thinking about which *choice option* to select. Moreover, they do not possess any skills with respect to thinking about how to perform a trade-off. Conversely, a significant number of third graders with as few as eight lessons can be seen to think at the *outcome* level, and begin to develop trade-off evaluation skills. Teaching the GOOD Decision Model changes the way that children think about decision-making, which, of course, is the necessary prerequisite to changing their behavior.

6b Curriculum Overview

During the second semester of the sixth grade (6b), students will be focusing on analyzing the decisions of others using the GOOD Decision Model. The decisions of "others" will include a biographical character, a character from literature or a poem, an actor in a movie, and a character from current events. The primary purpose of these assignments is to make sure the students have a working knowledge of the Model. A secondary, and perhaps even more meaningful purpose of these activities is to help students gain self-confidence by developing their ability to understand the reasons others, particularly their contemporaries, do what they do.

If students can implement for themselves a rational framework to analyze the behavior of others, they can minimize the number and magnitude of emotional reactions to situations. By doing so, they can avoid the situational dynamics (i.e. peer pressure) that often lead to not-so-good decisions. Causing the students to feel confident in their ability to stop, think, and analyze the situation before they act is the foundation of LifeGoals and one of the cornerstone benefits of learning the GOOD Decision Model.

Learning Activities: Example

Review with the students the concept of making a choice. Talk with them about the definitions of all components or levels of the GOOD Decision Model. Explain how they can analyze the choice process of others using this model of decision-making. Have them, by way of a homework assignment, present diagrams of decisions made by others (or what they think was the basis of their decision-making), making sure the scenario and the pathways are completely specified. Ask the students to share with the class their decision maps and have a discussion about the reasons underlying their decisions.

Make a list of all *personal goals* and *driving forces* discussed in class and put them on the board. As new ideas come up, add them to the list.

6b Curriculum Overview Movie Character

Assignment

*From a movie you like, select a key scene and explain the decision the character had to make (using the GOOD Decision Model), what choice she or he made AND explain what choice you would have made. Be sure to give the background information leading up to the decision.*

Movie: Rudy
Character: Rudy
Background:

Rudy, a poor high school student from a working class family with lots of kids, was at best an average high school football player. His goal was to go to Notre Dame, a college with one of the top football programs in the country, and play football.

After almost two years of academic preparation at a junior college, he was finally admitted to Notre Dame. Rudy then tried out for football and, because of his dedication and commitment, made the practice team.

The practice team never got to dress for games, so Rudy's parents and friends never got to see him be part of the team. Rudy always wanted to dress in his uniform for a game and be on the sidelines, so his parents could see him.

Situation:

123

When going to the last football practice his senior year, Rudy found out he was not going to dress for his final game. He was angry and left the locker room, saying he didn't care.

Choice Options:

5  [A] "Go back and attend the last practice."
[B] "Don't go to the last practice."

Good Model

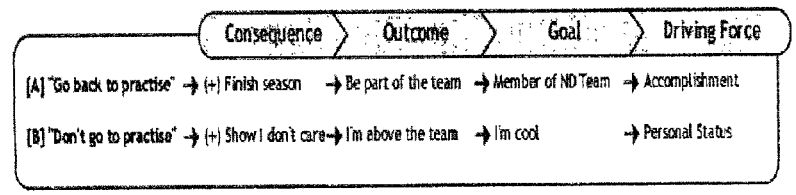

Decision

10  Rudy decided to "Go back and attend the last practice" [A]

My Decision

I would have chosen [A] because achieving the *goal* of being a "member of the ND team" was something that had been a dream for years, and I would have been just one day away from accomplishing it. And, compared to the alternative goal of just "being cool," there is no real 15  comparison.

The Short Loan - H-45-3

[0] Situation:

Jean desperately wants to buy the latest CD by her favorite group, but she doesn't have enough money. She needs two more dollars.

She asks her parents for an advance of her monthly allowance, and they say no. She will have to wait until Saturday after next. Jean asks her sister for a loan until she receives her allowance.

Jean knows where her little sister has her money hidden in her room. She only needs the money for a little more than a week. If you were Jean...

[1] Options: What are the two main Choice Options (A and B) you would think of doing here?

Choice Option A:
Take the money from my little sister

Choice Option B:
Just wait for next Saturday after that

[2] What is the main GOOD (+) thing or result and BAD (-) thing or result of this Choice Option?

→ (+) Getting the CD earlier
→ (-) Being a thief to your family
→ (-) Not being a thief to your family
→ (-) Can't get the CD now. The store could be sold out next week

[3] What is important to you, in your own view, about each GOOD (+) and BAD (-) result?

→ If I were her, I would already have money.
→ I would not want to get in trouble for stealing.
→ I would be happy to not be a thief.
→ Can't memorize my favorite song on CD.

Name: Andy T.  Date: May 4
Grade: 4  Teacher: James  School: Edison

[4] What would you do? Which Choice Option A or B, would you do?

Your Choice: B

[5] Why would you choose that Choice Option? What were the main reasons behind your choice?

I would choose that option because I really don't believe in stealing from anyone. The main reason behind my choice was that I don't really want to be a thief period - at all or even for rest of my life.

| H-45-3 | 2 | 1.1 | 2.2 | C | O |
| --- | --- | --- | --- | --- | --- |
| 1S | 3C | 4+ C,Ø | 5V C,O | B+ 12A/B | 8AH+ 9AH+ 14H5 |
|  | 1 | 3.2 | 2.2 | 2 | +1.0 |
|  | 3C | 6R C,614 | 7R C,O,O | 13T | 10BH+ 11BH+ |

What is claimed is:

1. An interactive teaching method, comprising:
   (a) referencing at least one factual context to a user;
   (b) requiring the user to provide a listing of choice options corresponding to the at least one factual context;
   (c) requiring the user to provide a listing of results corresponding to each choice option;
   (d) requiring the user to provide a listing of goals that are relevant to each choice option;
   (e) requiring the user to identify at least one driving force relevant to at least one of the listed choice options; and
   (f) evaluating at least one of: the listing of goals, the listing of results, the listing of goals, and the at least one driving force.

2. An interactive teaching method, according to claim 1, wherein the evaluating step is performed for each of the listings in steps (b) through (e).

3. An interactive teaching method, according to claim 1, wherein, when the at least one of the listings is unacceptable, requiring the user to repeat at least one of steps (b) through (g).

4. An interactive teaching method, according to claim 1, wherein, when the at least one of the listings is unacceptable, repeating steps (a) through (f) for a new factual context.

5. An interactive teaching method, according to claim 1, wherein steps (a), (b), and (f) are repeated for a plurality of factual contexts.

6. An interactive teaching method, according to claim 1, wherein step (a) includes the step of initializing a counter and further comprising, if the listing of choice options is unacceptable in step (f):
   comparing the counter to a predetermined number of iterations;
   when the counter at least one of equals and exceeds the predetermined number, failing the user; and
   when the counter is less than the predetermined number, repeating step (b).

7. An interactive teaching method, according to claim 1, wherein only steps (a), (b), and (f) are repeated for a first time period, only steps (a) through (c) and (f) are repeated for a second time period, and only steps (a) through (d) and (f) are repeated for a third time period and wherein the first time period precedes the second time period and the second time period precedes the third time period.

8. An interactive teaching method, according to claim 1, further comprising after step (c) and before step (e):
   if the listing of results is acceptable in step (f), requesting a list of choice distinctions for each listed choice; and
   assessing the list of choice distinctions for each listed choice option.

9. An interactive teaching method, according to claim 1, wherein steps (d) through (f) are repeated for a plurality of factual contexts.

10. An interactive teaching method, according to claim 1, wherein step (c) includes the step of initializing a counter and further comprising, if the listing of results is unacceptable:
    comparing the counter to a predetermined number of iterations;
    when the counter at least one of equals and exceeds the predetermined number, failing the user; and
    when the counter is less than the predetermined number, repeating step (c).

11. An interactive teaching method, according to claim 1, wherein the listing of results includes outcomes and consequences.

12. An interactive teaching method, according to claim 1, wherein steps (e) and (f) are repeated for a plurality of factual contexts.

13. An interactive teaching method, according to claim 1, wherein step (d) includes the step of initializing a counter and further comprising, if the listing of goals is unacceptable:
    comparing the counter to a predetermined number of iterations;
    when the counter at least one of equals and exceeds the predetermined number, failing the user; and
    when the counter is less than the predetermined number, repeating step (d).

14. An interactive teaching method, according to claim 13, further comprising:
    (g) requiring selection of a choice option; and
    (h) requiring a rationale for the selected choice option; and wherein the evaluating step includes the substep of assessing the rationale.

15. An interactive teaching method, according to claim 14, further comprising:
    (1) determining a test score for the user's performance in one or more of steps (b), (c), (d), and (e).

16. An interactive teaching method, according to claim 1, wherein in step (f) the number of choice options is counted and compared to a predetermined ordering of numbers to determine a level of performance.

17. An interactive teaching method, according to claim 1, wherein step (f) considers at least one of the number of choice options in the choice option listing, a level of sophistication of a choice option in the listing, and a number of choice options considered for selecting a most important choice option.

18. An interactive teaching method, according to claim 14, wherein step(f) includes the step of:
    forming a decision chain.

19. An interactive teaching method, according to claim 18, wherein the forming step includes the steps of:
    comparing the listing of choice options to a predetermined listing of choice options and corresponding code to identify at least one listed choice option on the predetermined listing of choice options and a code corresponding thereto;
    assigning the code to the listed choice option;
    comparing the rationale with the listings of results, goals, and driving forces to identify which of the listed results, goals and driving forces are in the rationale;
    comparing the results, goals and driving forces in the rationale with a predetermined listing of results, goals, and driving forces and corresponding codes to identify the codes corresponding to the results, goals and driving forces in the rationale; and
    determining the highest code level and the number of code levels in the rationale to form the decision chain.

20. An interactive teaching method, comprising:
    (a) presenting at least one factual context to a user, wherein said factual context provides a situation wherein one or more possible behaviors of a participant in said factual context is identified by the user;
    (b) first requesting the user to provide a listing of one or more choice options corresponding to the at least one factual context, wherein each of said choice options includes one of said possible behaviors;
    (c) second requesting the user to provide, for each of at least some of said choice options, a corresponding listing of results including both user perceived positive and negative results, wherein each result R is a response to identify a condition that the user believes has a likelihood of occurring if one of said choice options, for which said result R corresponds, occurs;

(d) third requesting the user to provide, for each of at least some of said choice options, a corresponding listing of goals that are relevant to said choice options, wherein each goal G is a response to identify an end state achieved by the participant when effort by the participant is directed toward having one of said choice options, for which said goal G corresponds, occur;

(e) fourth requesting the user to identify at least one driving force relevant to at least one choice option C of the choice options, wherein said driving force is a response to identify a ranking in said goals on said listing of goals corresponding to said choice option C, said ranking being according to a user perceived importance of the goals to the participant; and (f) evaluating one or more decision making related skills of the user, wherein an outcome from said evaluating step is dependent upon at least one of:

(i) a rationale provided by the user for choosing a preferred one of said choice options, wherein said step of evaluating includes a step of determining whether a positive result from at least two of said listings of results are identified in said rationale;

(ii) a step of encoding, for a response by the user to at least one of said steps of (c) through (e), at least one of: a highest level of decision making reasoning in said response, and a number of levels of decision making reasoning in said response, wherein said levels, in ascending order, include: (1) a results level corresponding to conditions that the user believes has a likelihood of occurring if one of said choice options occur; (2) a goal level corresponding to an end state achieved by the participant when effort by the participant is directed toward having one of said choice options occur; and (3) a driving force level corresponding to a ranking of goals of said choice options, said ranking being according to a user perceived importace of the goals to the participant.

21. An interactive teaching method, according to claim 20, wherein the encoding step is performed for each of the listings in steps (b) through (d).

22. An interactive teaching method, according to claim 20, wherein, when at least one of: (i) said listing of choice options, (ii) one of said listings of results, (iii) one of said listings of goals is determined to be unacceptable in said evaluating step, requiring the user to repeat at least one of steps (b) through (e).

23. An interactive teaching method, according to claim 22, wherein, said step of requiring includes repeating steps (a) through (f) for a different factual context.

24. An interactive teaching method, according to claim 2, wherein steps (a), (b), and (f) are repeated for a plurality of factual contexts.

25. An interactive teaching method, according to claim 20, wherein step (a) includes a step of initializing a counter and further comprising, if the listing of choice options results in said evaluating step determining a value indicative of a need for remediation in one of the decision making related skills:

comparing the counter to a predetermined number of iterations;

when the counter at least one of: equals and exceeds the predetermined number, recoding that the user has not demonstrated at least one of the decision making related skills; and when the counter is less than the predetermined number, repeating step (b).

26. An interactive teaching method, according to claim 20, wherein only steps (a), (b), and (f) are repeated for a first time period, only steps a) through (c) and (f) are repeated for a second time period, and only steps (a) through (d) and (f) are repeated for a third time period and wherein the first time period precedes the second time period and the second time period precedes the third time period.

27. An interactive teaching method, according to claim 20, further comprising after step (c) and before step (e):

if the listing of results is acceptable in step (f), requesting a list of choice distinctions for at least one listed choice option; and assessing the list of choice distinctions for said at least one choice option.

28. An interactive teaching method, according to claim 20, wherein steps (d) through (f) are repeated for a plurality of factual contexts.

29. An interactive teaching method, according to claim 20, wherein step (c) includes a step of initializing a counter and further comprising, if one of the lists of results in said evaluating step determining a value indicative of a need for remediation in at least one of the decision making related skills:

comparing the counter to a predetermined number of iterations;

when the counter at least one of equals and exceeds the predetermined number, recoding that the user has not demonstrated at least one of the decision making related skills; and when the counter is less than the predetermined number, repeating step (c).

30. An interactive teaching method, according to claim 20, wherein the listing of results includes outcomes and consequences.

31. An interactive teaching method, according to claim 20, wherein steps (e) and (f) are repeated for a plurality of factual contexts.

32. An interactive teaching method, according to claim 20, wherein step (d) includes the step of initializing a counter and further comprising, if the listing of goals results in said evaluating step determining a value indicative of a need for remediation in at least one of the decision making related skills:

comparing the counter to a predetermined number of iterations;

when the counter at least one of equals and exceeds the predetermined number, identifying that the user has not demonstrated at least one of the decision making related skills; and when the counter is less than the predetermined number, repeating step (d).

33. An interactive teaching method, according to claim 32, further comprising the following steps:

(g) requiring selection of a choice option; and (h) requiring a rationale for the selected choice option; and wherein the evaluating step includes the substep of assessing the rationale.

34. An interactive teaching method, according to claim 33, further comprising: (i) determining a test score for the user's performance in one or more of steps (b), (c), (d), and (e).

35. An interactive teaching method, according to claim 20, wherein in step (f) the number of choice options is counted and compared to a predetermined ordering of numbers to determine a level of performance.

36. An interactive teaching method, according to claim 20, wherein step (f) considers at least one of: a number indicative of choice options in the choice option listing, a level of sophistication of a choice option in the choice option listing, and a number of choice options considered for selecting a most important choice option in the choice option listing.

37. An interactive teaching method, according to claim 33, wherein step (f) includes the step of forming a decision chain.

38. An interactive teaching method, according to claim 37, wherein the forming step includes the steps of:
comparing the listing of choice options to a predetermined listing of choice options and corresponding code to identify at least one listed choice option on the predetermined listing of choice options and a code corresponding thereto;
assigning the code to the listed choice option;
comparing the rationale with the listing of results, the listing of goals, and the at least one driving force to identify which of the listed results, the listed goals and the at least one driving force are identified in the rationale;
comparing the identified ones of the results, goals and driving forces in the rationale with a predetermined listing of results, goals, and driving forces and corresponding codes to identify the codes corresponding to the results, goals and driving forces in the rationale; and
determining the highest code level and the number of code level in the rationale to form the decision chain.

39. An apparatus for teaching decision making skills, comprising:
(a) a display for presenting at least one factual context to a user, wherein said factual context provides a situation wherein one or more possible behaviors of a participant in said factual context is specified by the user;
(b) a first collection of one or more programmatic elements for presenting a first presentation, on said display, requesting the user to specify a collection of one or more choice options corresponding to the at least one factual context, wherein each of said choice options includes one of said possible behaviors;
(c) a second collection of one or more programmatic elements for presenting a second presentation, on said display, requesting the user to specify, for each of at least some of said choice options, a corresponding collection of results in including both user perceived positive and negative results, wherein each result R is for identifying a condition that the user believes has a likelihood of occurring if one of said choice options, for which said result R corresponds, occurs;
(d) a third collection of one or more programmatic element for presenting a third presentation, on said display, requesting the user to specify, for each of at least some of said choice options, a corresponding collection of goals that are relevant to said choice options, wherein each goal G is for identifying an end state achieved by the participant when effort by the participant is directed toward having one of said choice options, for which said goal G corresponds, occur;
(e) a fourth collection of one or more programmatic element for presenting a fourth presentation, on said display, requesting the user to specify at east one driving force relevant to at least one choice option C of the choice options, wherein said driving force is for identifying a ranking in said goals in said collection of goals corresponding to said choice option C, said ranking being according to a user perceived importance of the goals to the participant; and
(f) an evaluator for evaluating one or more decision making related skills of the user, wherein an output from said evaluator identifies whether or not there is a need for remediation in one of the decision making related skills of the user;
wherein said evaluator uses at least one of (i) and (ii) following in determining said output:
(i) a rationale specified by the user for choosing a preferred one of said choice options, wherein said evaluator determines whether a positive result from at least two of said collections of results are identified in said rationale;
(ii) an encoder for encoding a response by the user to at least one of said first, second, third and fourth presentations, wherein said evaluator determines, for a predetermined plurality of decision making reasoning levels, at least one of: a highest level of decision making reasoning in said response, and number of levels of decision making reasoning in said respons.

40. The apparatus of claim 39, wherein each of said programmatic elements in said first, second, third and fourth collections includes one of: an encoding of an executable statement, and data for supplying to an executable statement.

41. The apparatus of claim 39, wherein said predetermined plurality of decision making reasoning levels, in ascending order, include: (1) a results level corresponding to conditions that the user believes has a likelihood of occurring if one of said choice options occur; (2) a goal level corresponding to an end state achieved by the participant when effort by the participant is directed toward having one of said choice options occur; and (3) a driving force level corresponding to a ranking in of goals of said choice options, said ranking being according to a user perceived importance of the goals to the participant.

42. An apparatus for teaching decision making skills, comprising:
(a) a network server for transmitting at least one factual context to a user, wherein said factual context provides a situation wherein one or more possible behaviors of a participant in said factual context is specified by the user;
(b) a first collection of one or more programmatic elements or transmitting a first presentation, from said server, requesting the user to specify a collection of one or more choice options corresponding to the at least one factual context, wherein each of said choice options includes one of said possible behaviors;
(c) a second collection of one or more programmatic elements for transmitting a second presentation, from said server, requesting the user to specify, for each of at least some of said choice options, a corresponding collection of results including both user perceived positive and negative results, wherein each result R is or identifying a condition that the user believes has a likelihood of occurring if one of said choice options, for which said result R corresponds, occurs;
(d) a third collection of one or more programmatic elements or transmitting a third presentation, from said server, requesting the user to specify, for each of at least some of said choice options, a corresponding collection of goals that are relevant to said choice options, wherein each goal G is for identifying an end state achieved by the participant when effort by the participant is directed toward having one of said choice options, for which said goal G corresponds, occur;

(e) a fourth collection of one or more programmatic element for transmitting a fourth presentation, from said server, requesting the user to specify at least one driving force relevant to at least one choice option C of the choice options, wherein said driving force is for identifying a ranking in said goals in said collection of goal corresponding to said choice option C, said ranking being according to a user perceived importance of the goals to the participant; and (f) an evaluator for evaluating one or more decision making related skills of the user, wherein an output from said evaluator identifies whether or not there is a need for remediation in one of the decision making related skills of the user;

wherein said evaluator uses at least one of (i) and (ii) following in determining said output:

(i) a rationale specified by the user for choosing preferred one of said choice options, wherein said evaluator determines whether a positive result from at least two of said collections of results are identified in said rationale;

(ii) an encoder for encoding a response by the user to at least one of said first, second, third and fourth presentations, wherein said evaluator determines, for a predetermined plurality of decision making reasoning levels, at least one of: a highest level of decision making reasoning in said response, and a number of levels of decision making reasoning in said response.

43. The apparatus of claim 42, wherein each of said programmatic elements in said first, second, third and fourth collections includes one of: an encoding of an executable statement, and data for supplying to an executable statement.

44. The apparatus of claim 42, wherein said predetermined plurality of decision making reasoning levels, in ascending order, include: (1) a results level corresponding to conditions that the user believes has a likelihood of occurring if one of said choice options occur; (2) a goal level corresponding to an end state achieved by the participant when effort by the participant is directed toward having one of said choice options occur; and (3) a driving force level corresponding to a ranking in of goals of said choice options, said ranking being according to a user perceived importance of the goals to the participant.

45. The apparatus of claim 42, wherein said server transmits one or more of said factual context, said first collection, said second collection said third collection, and said fourth collection on the Internet.

* * * * *

UNITED STATES PATENT AND TRADEMARK OFFICE
CERTIFICATE OF CORRECTION

PATENT NO. : 6,971,881 B2  Page 1 of 1
APPLICATION NO. : 09/853407
DATED : December 6, 2005
INVENTOR(S) : Thomas J Reynolds It is certified that error appears in the above-identified patent and that said Letters Patent is hereby corrected as shown below:

Title Page: Item (56) References Cited, after WO PCT/US01/15394 5/2001, please insert the following:

--Gan; "Multimedia Environmental Education Courseware for Promoting Cooperative Learning and Higher-Order Thinking Skills"; Paper presented at the National Curriculum Seminar, Port Dickson, Malaysia; December 1995; pp. 1-7
"Instructional Strategies"; (Date unknown); pp. 1-36
"Taking Responsibility Grades K-6: Teaching Young Students to Take Responsibility for their Behavior"; Tom Snyder Productions; (Date Unknown); pp. 1-2
Woods; "The Giving Gift" (All We Really Need); Education for a Sustainable Future; June 26, 2000; pp. 1-14--

Signed and Sealed this

Thirtieth Day of December, 2008

JON W. DUDAS
*Director of the United States Patent and Trademark Office*